US010078345B2

(12) United States Patent
Rolus Borgward

(10) Patent No.: US 10,078,345 B2
(45) Date of Patent: *Sep. 18, 2018

(54) DIGITAL BOOK

(71) Applicant: Glenn Rolus Borgward, München (DE)

(72) Inventor: Glenn Rolus Borgward, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/175,411

(22) Filed: Feb. 7, 2014

(65) Prior Publication Data

US 2017/0205848 A1 Jul. 20, 2017

Related U.S. Application Data

(63) Continuation of application No. 09/508,794, filed as application No. PCT/EP98/06008 on Sep. 21, 1998, now Pat. No. 8,654,082.

(30) Foreign Application Priority Data

Sep. 19, 1997 (DE) .................................. 197 41 453

(51) Int. Cl.
*G06F 3/041* (2006.01)
*G06F 1/16* (2006.01)
(Continued)

(52) U.S. Cl.
CPC ............ *G06F 1/1616* (2013.01); *G06F 1/169* (2013.01); *G06F 1/1626* (2013.01);
(Continued)

(58) Field of Classification Search
CPC ........ G06F 3/041; G06F 1/161; G06F 1/1632; G06F 2200/06
(Continued)

(56) References Cited

U.S. PATENT DOCUMENTS 4,159,417 A * 6/1979 Rubincam ................ G03H 1/30
235/375
4,232,260 A * 11/1980 Lambkin ............... H01M 10/46
320/110
(Continued)

FOREIGN PATENT DOCUMENTS

DE 19546786 6/1997
EP 0396009 11/1990
(Continued)

OTHER PUBLICATIONS

European Search Report in European Application No. 05022702.4, dated Mar. 27, 2006, 11 pages (with English translation).
(Continued)

*Primary Examiner* — Prabodh M Dharia
(74) *Attorney, Agent, or Firm* — Fish & Richardson P.C.

(57) ABSTRACT

A digital book includes a casing adapted to fold open and shut like a book and having a folding axis, a main part, and a secondary part, together forming a book back part. A display unit consists of at least two parts arranged such that when the casing is folded out, the main part and the secondary part are each presented with at least one screen each, like pages of a book. A control unit has means for receiving, storing, processing, and reproducing information, and an operating unit has operating elements for using the digital book as a device for receiving/processing/reproducing information. A supply unit has a receiving opening and a guide and supply pin, by means of which the digital book can be plugged in when the casing is folded shut, for inputting and outputting information, for supplying energy, and for storing the digital book.

28 Claims, 46 Drawing Sheets

(51) Int. Cl.
  *G06F 1/18* (2006.01)
  *G06F 3/0482* (2013.01)
  *G06F 3/0483* (2013.01)
  *G06F 3/0485* (2013.01)
  *G06F 3/0488* (2013.01)
  *G06F 15/02* (2006.01)

(52) U.S. Cl.
  CPC .......... *G06F 1/1632* (2013.01); *G06F 1/1643* (2013.01); *G06F 1/1647* (2013.01); *G06F 1/1649* (2013.01); *G06F 1/1652* (2013.01); *G06F 1/1654* (2013.01); *G06F 1/1656* (2013.01); *G06F 1/1683* (2013.01); *G06F 1/189* (2013.01); *G06F 3/0482* (2013.01); *G06F 3/0483* (2013.01); *G06F 3/0485* (2013.01); *G06F 3/04883* (2013.01); *G06F 3/04886* (2013.01); *G06F 15/0283* (2013.01); *G06F 2200/1632* (2013.01)

(58) Field of Classification Search
  USPC ....... 345/121, 168–179, 776, 835, 864, 901; 707/532; 713/340; 455/90, 557; 361/681, 683
  See application file for complete search history.

(56) References Cited

U.S. PATENT DOCUMENTS

| | | | |
|---|---|---|---|
| 4,822,296 A * | 4/1989 | Wilson | H01M 2/1022 439/343 |
| 4,912,671 A * | 3/1990 | Ishida | G06F 17/30952 434/157 |
| 5,027,394 A | 6/1991 | Ono et al. | |
| 5,534,888 A * | 7/1996 | Lebby | G06F 1/1616 345/672 |
| 5,537,608 A * | 7/1996 | Beatty | H04M 1/27455 379/157 |
| 5,555,369 A * | 9/1996 | Menendez | G06F 8/34 715/762 |
| 5,567,541 A * | 10/1996 | Rouhani | H01M 10/48 429/61 |
| 5,597,183 A | 1/1997 | Johnson | |
| 5,621,906 A * | 4/1997 | O'Neill | G06F 3/04815 715/839 |
| 5,646,649 A * | 7/1997 | Iwata | G06F 1/1626 345/169 |
| 5,663,748 A * | 9/1997 | Huffman | G06F 15/0283 345/173 |
| 5,712,760 A * | 1/1998 | Coulon | G06F 1/1616 345/905 |
| 5,748,228 A * | 5/1998 | Kobayashi | H04N 1/195 348/63 |
| 5,761,485 A * | 6/1998 | Munyan | G06F 15/0283 326/8 |
| 5,771,471 A * | 6/1998 | Alberth, Jr. | H02J 7/0068 363/8 |
| 5,774,338 A * | 6/1998 | Wessling, III | G06F 1/163 2/94 |
| 5,956,034 A * | 9/1999 | Sachs | G06F 15/0283 715/776 |
| 5,969,283 A * | 10/1999 | Looney | G10H 1/0041 380/53 |
| 6,064,766 A * | 5/2000 | Sklarew | G06F 3/033 382/189 |
| 6,158,884 A | 12/2000 | Lebby | |
| 6,167,439 A * | 12/2000 | Levine | G06F 3/0483 358/408 |
| 6,172,985 B1 * | 1/2001 | Gilbert | H04L 12/5692 370/252 |
| 6,180,640 B1 * | 1/2001 | Cuny | C07D 401/04 514/215 |
| 6,190,803 B1 * | 2/2001 | Tomiyama | H01M 4/485 429/231.1 |
| 6,202,060 B1 * | 3/2001 | Tran | G06F 3/0481 |
| 6,243,071 B1 * | 6/2001 | Shwarts | G06F 3/0483 715/776 |
| 6,282,662 B1 * | 8/2001 | Zeller | G06F 1/3203 713/300 |
| 6,297,838 B1 * | 10/2001 | Chang | G06F 1/16 345/156 |
| 6,321,158 B1 * | 11/2001 | DeLorme | G01C 21/26 340/995.16 |
| 6,340,957 B1 * | 1/2002 | Adler | G06F 1/1615 345/1.3 |
| 6,396,481 B1 | 5/2002 | Challa et al. | |
| 6,400,351 B1 * | 6/2002 | Ishizawa | G06F 1/1616 345/156 |
| 6,418,532 B2 | 7/2002 | Redford | |
| 6,445,932 B1 * | 9/2002 | Soini | H04M 1/0214 455/556.1 |
| 6,493,734 B1 | 12/2002 | Sachs | |
| 6,728,546 B1 * | 4/2004 | Peterson | H04M 1/2473 455/462 |
| 6,851,822 B2 | 2/2005 | Herrera | |
| 7,036,075 B2 * | 4/2006 | Walker | G06F 17/211 434/169 |
| 7,082,578 B1 * | 7/2006 | Fishkin | G06F 1/16 345/184 |
| 7,106,296 B1 * | 9/2006 | Jacobson | B41J 2/01 345/107 |
| 7,142,846 B1 * | 11/2006 | Henderson | H04M 1/2745 340/7.55 |
| 7,190,351 B1 * | 3/2007 | Goren | G06F 1/1626 345/156 |
| 2004/0086840 A1 * | 5/2004 | Redford | G06F 3/0238 434/307 R |

FOREIGN PATENT DOCUMENTS

| | | |
|---|---|---|
| JP | 566857 | 3/1993 |
| JP | 6141089 | 5/1994 |
| WO | WO 97/22097 | 6/1997 |

OTHER PUBLICATIONS

European Office Action in European Application No. 05022702.4, dated Mar. 6, 2008, 8 pages (with English translation).
European Office Action in European Application No. 05022702.4, dated Feb. 2, 2010, 7 pages (with English translation).
European Communication in European Application No. 05022702.4, dated Jul. 28, 2014, 5 pages (with English translation).
European Communication in European Application No. 05022702.4, dated Aug. 12, 2010, in response to the decision of Feb. 2, 2010, 7 pages (with English translation).

* cited by examiner

FIG. 12A
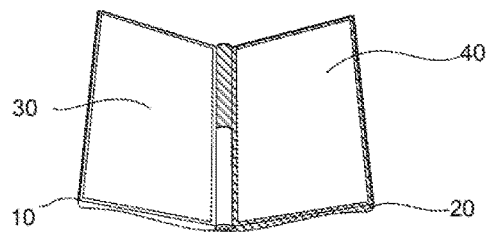
FIG. 12B
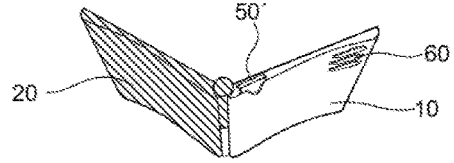
FIG. 12C
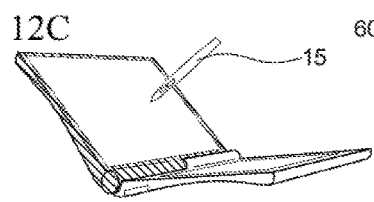
FIG. 12D
FIG. 12E
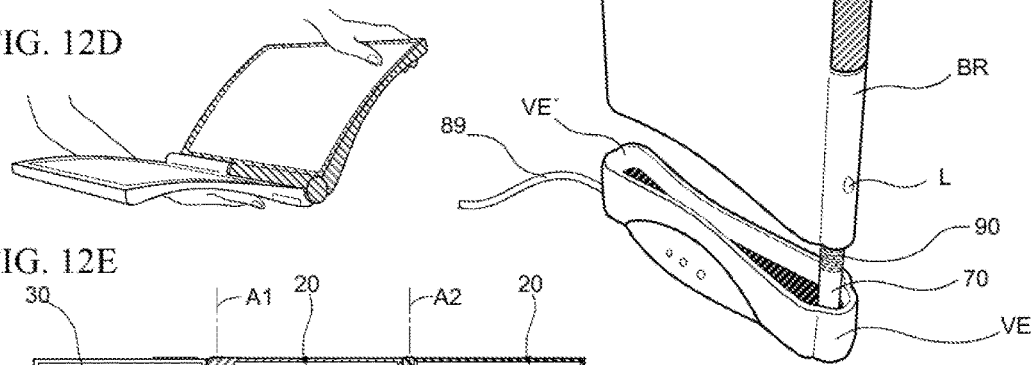
FIG. 12F
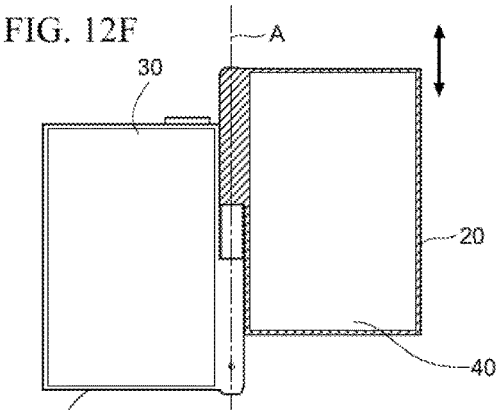
FIG. 12G
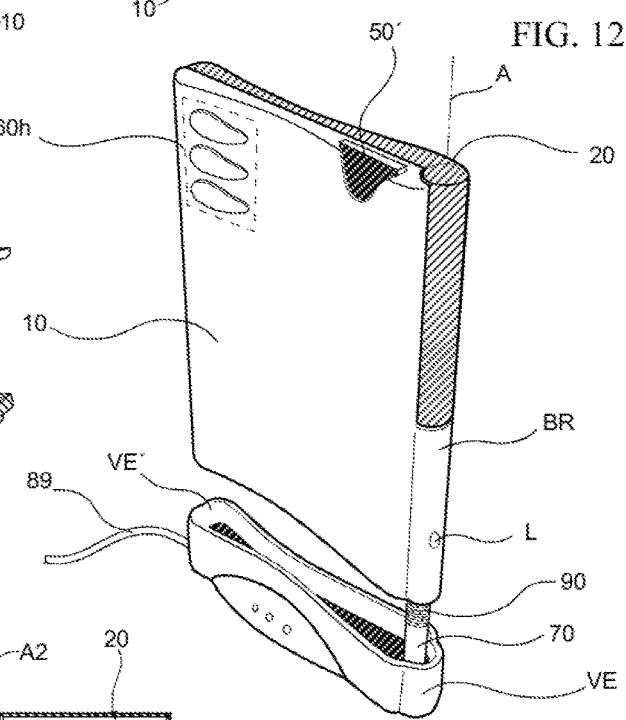
FIG. 12H
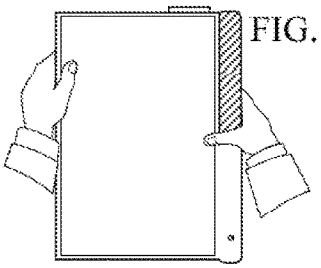

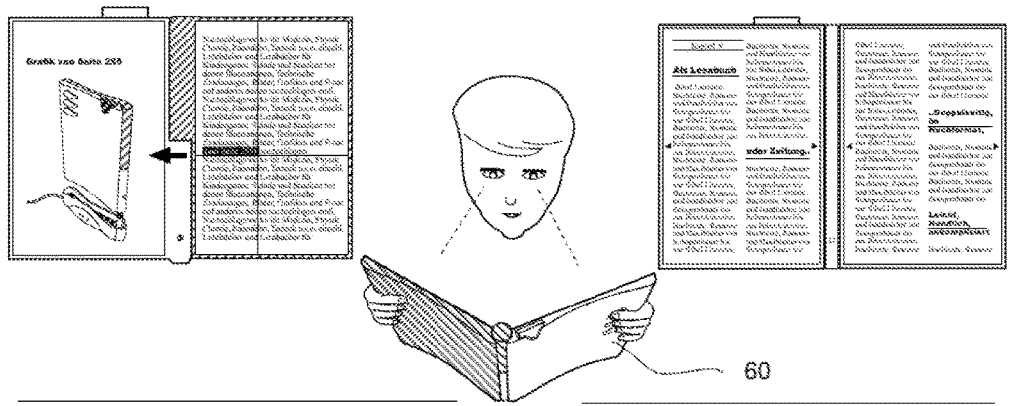
FIG. 13A
FIG. 13B
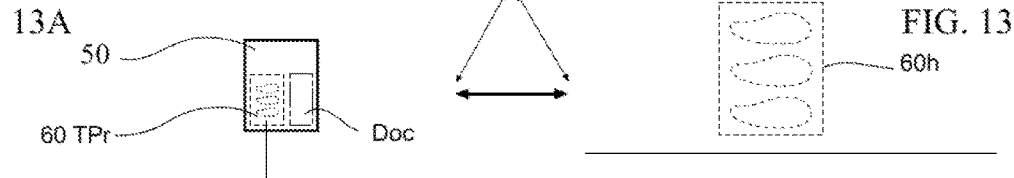
FIG. 13C
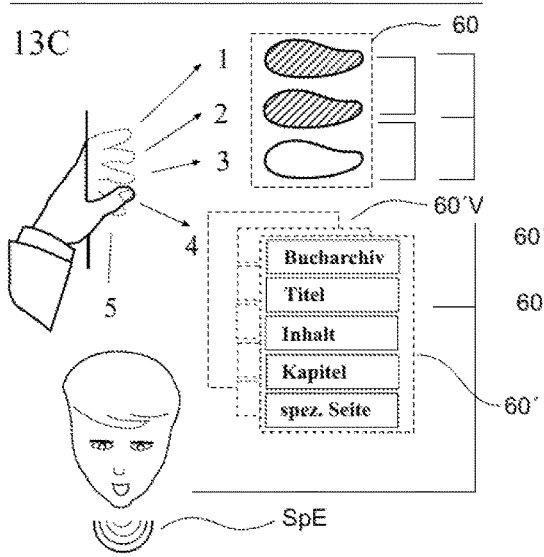
FIG. 13D
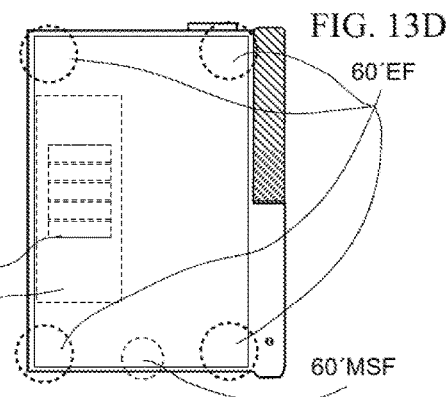
FIG. 13E
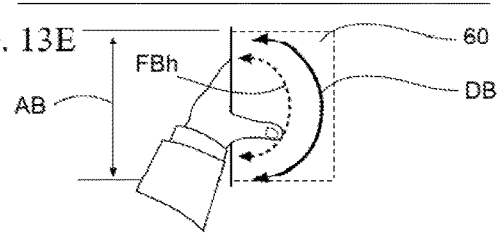
FIG. 13F
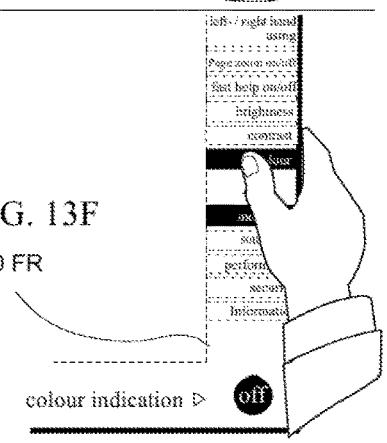

FIG. 14A
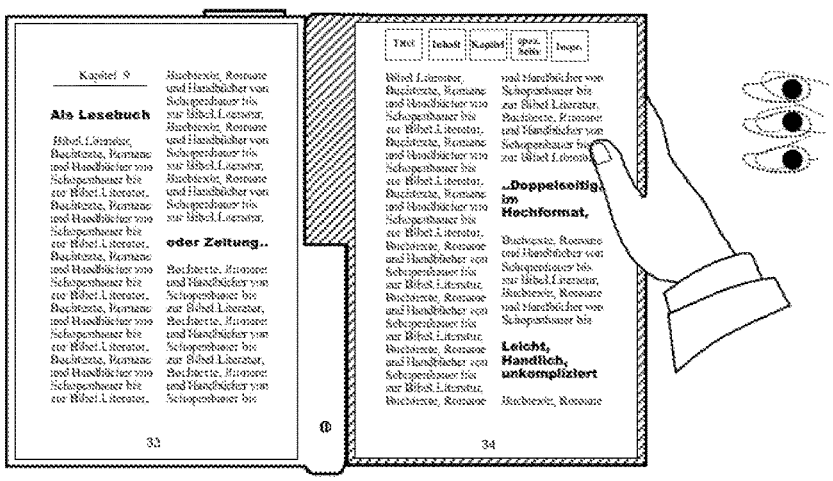
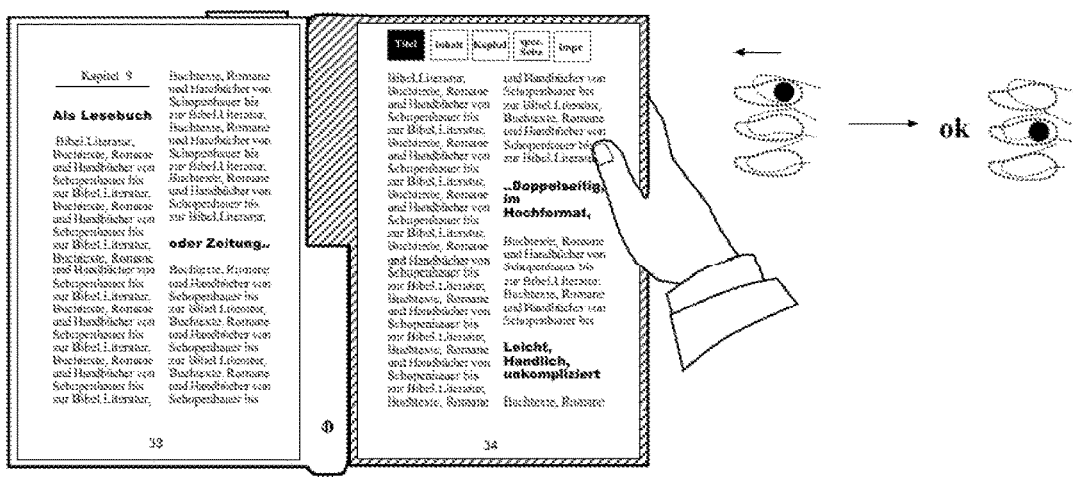

FIG. 14B
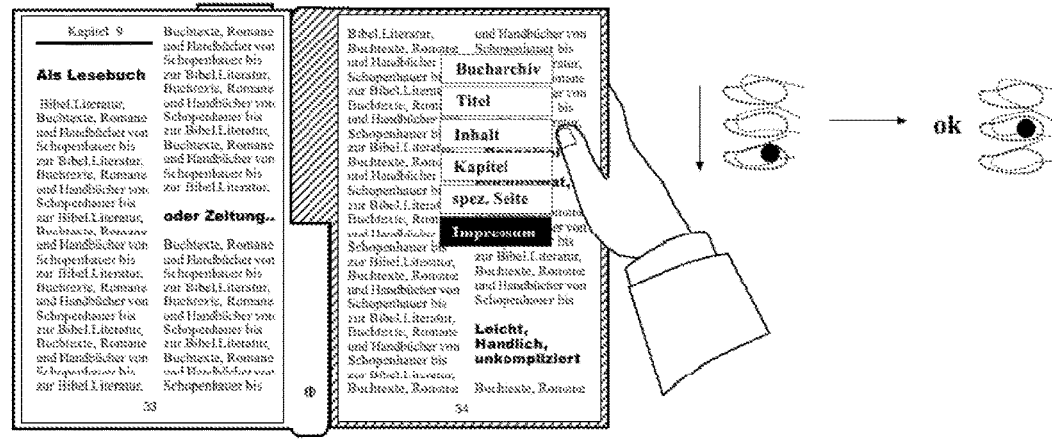

FIG. 14C
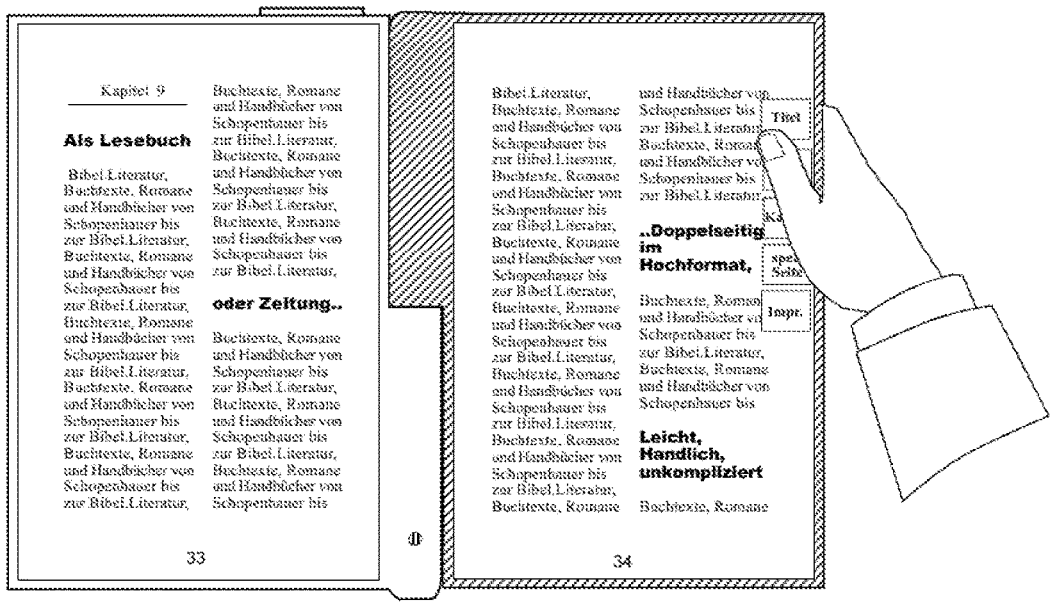
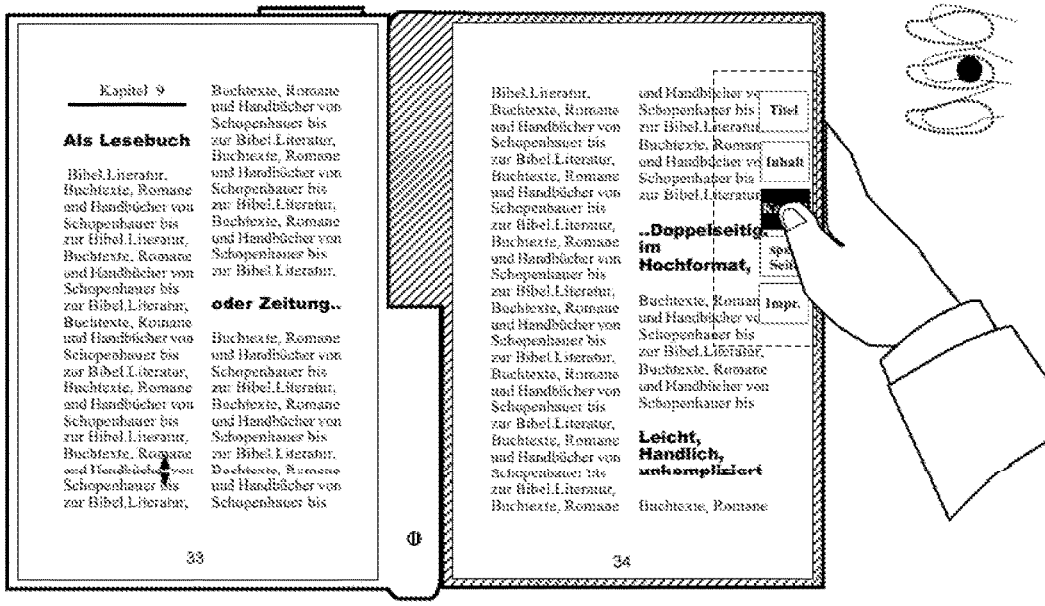

FIG. 14D
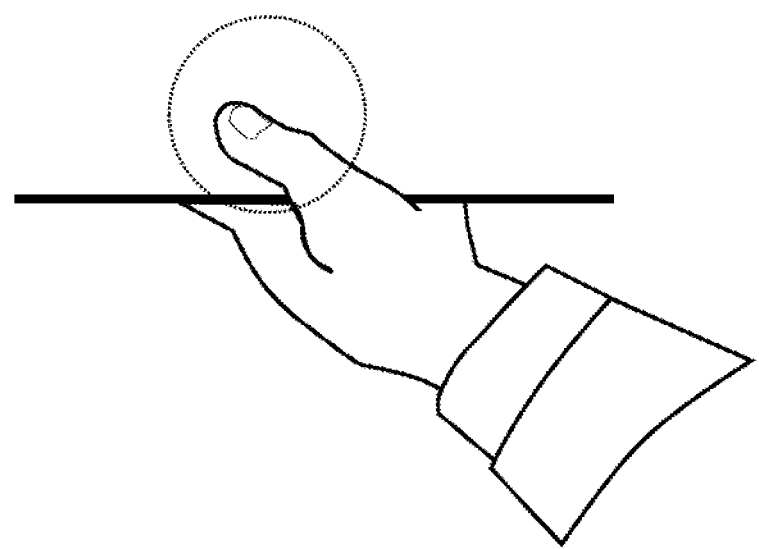
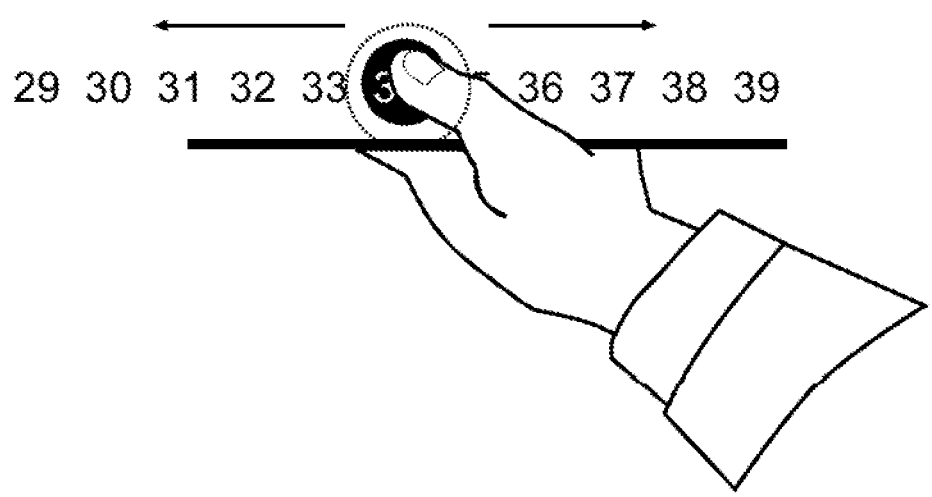

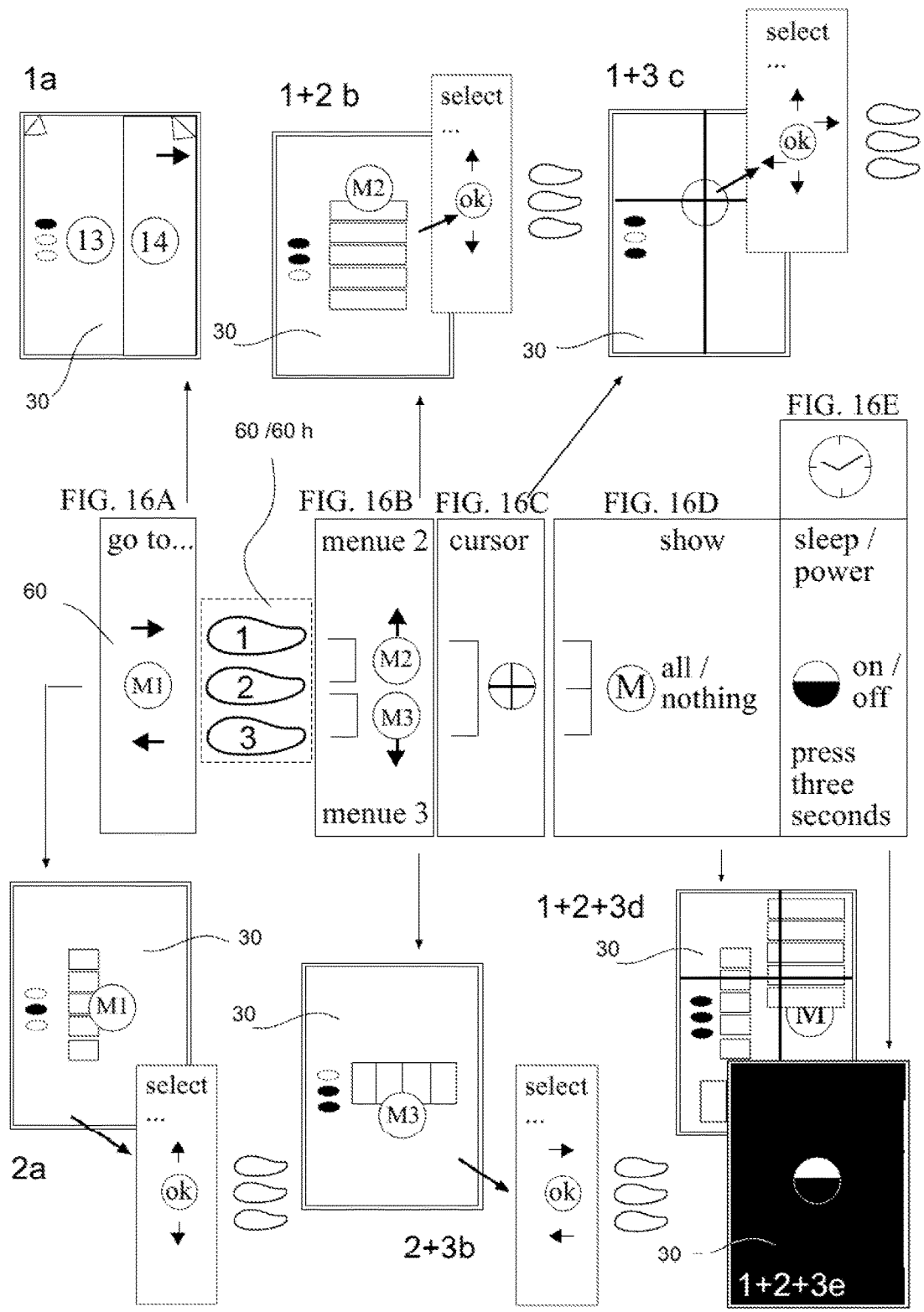

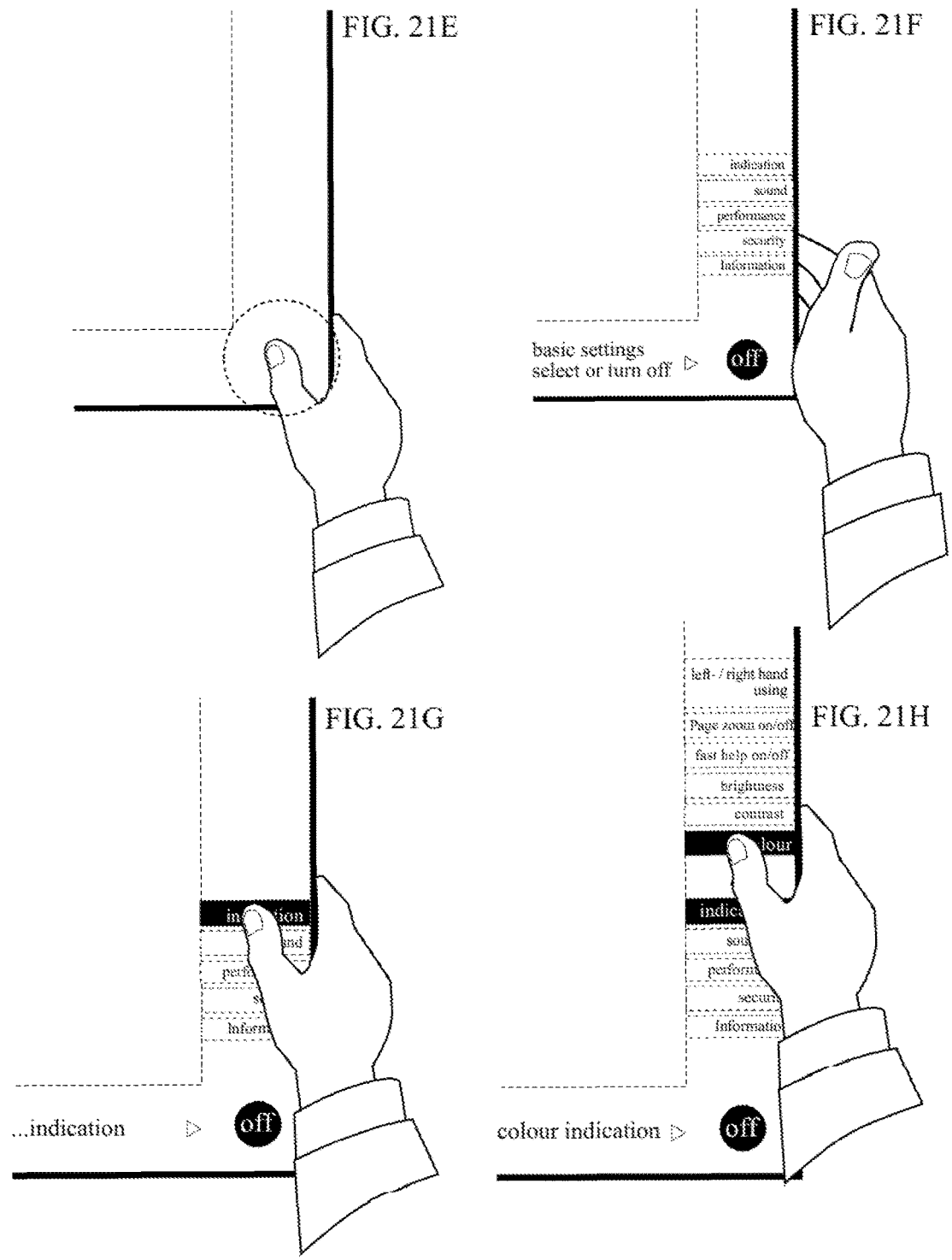

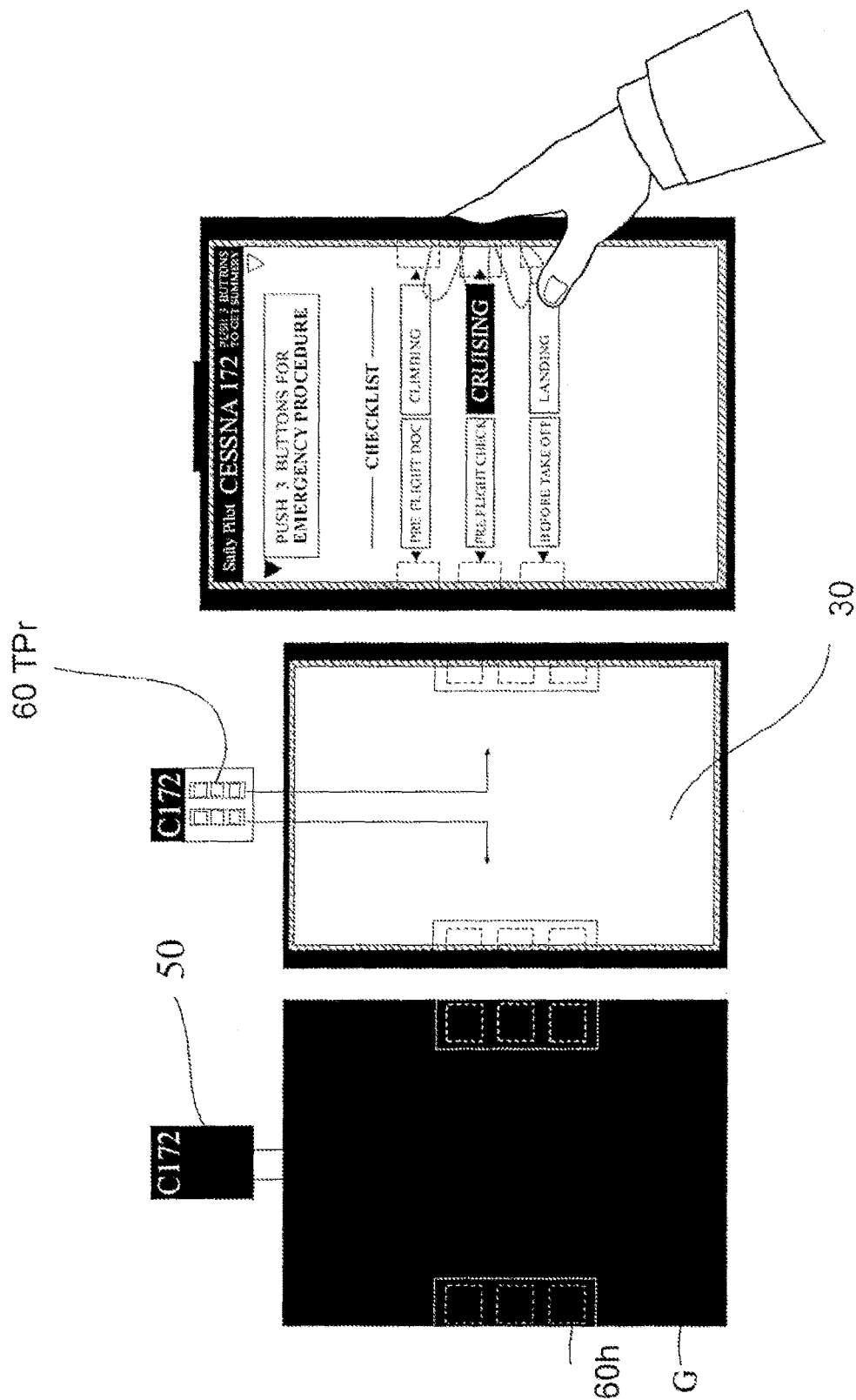

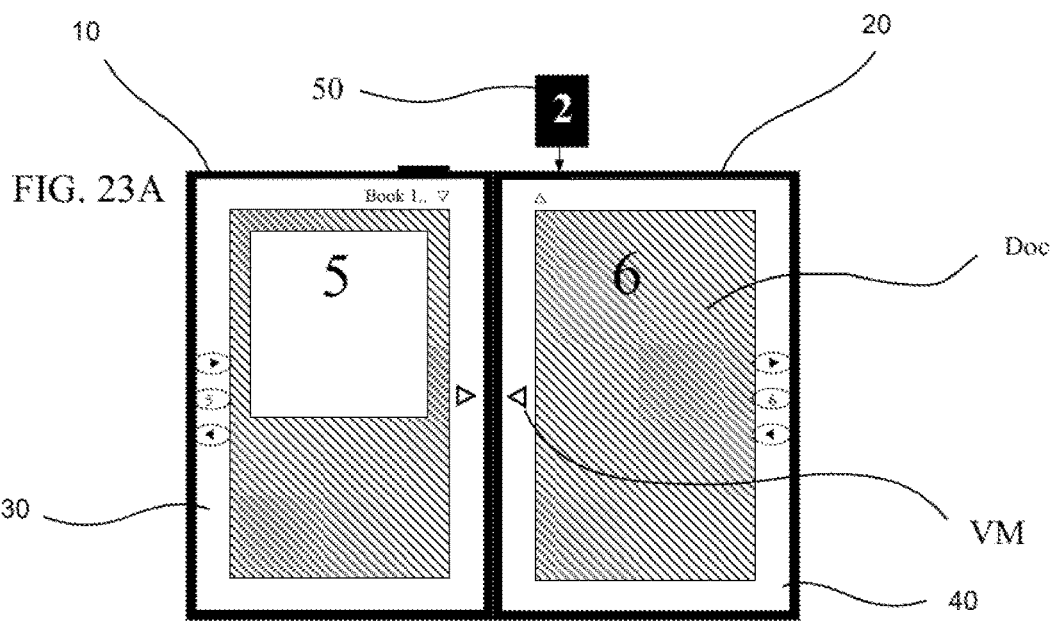
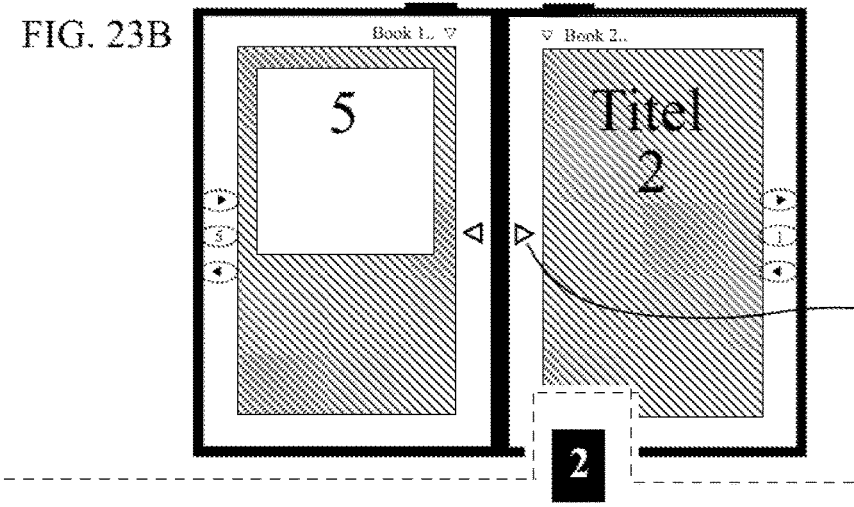
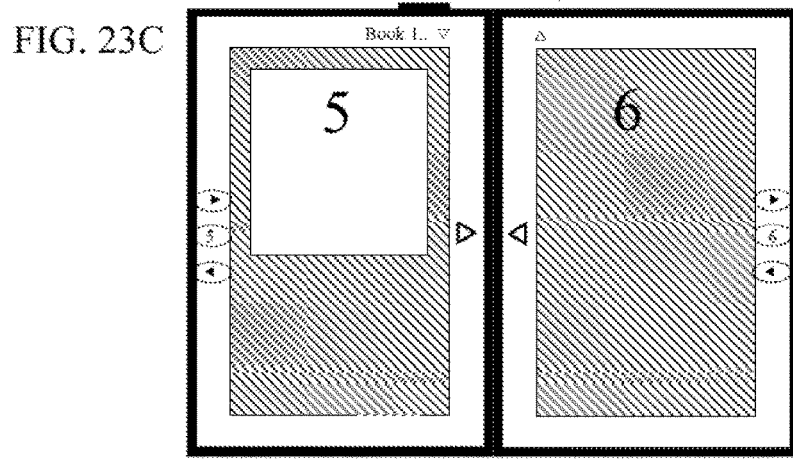

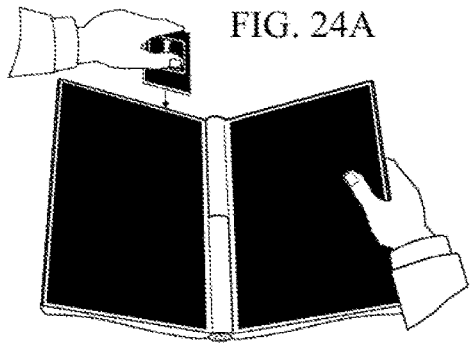
FIG. 24A
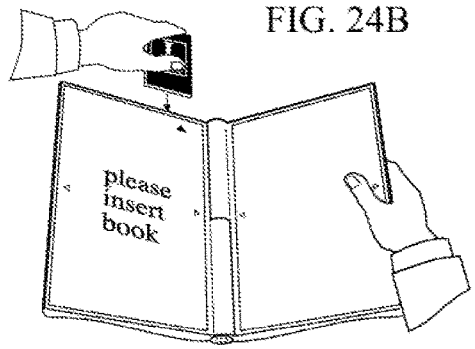
FIG. 24B
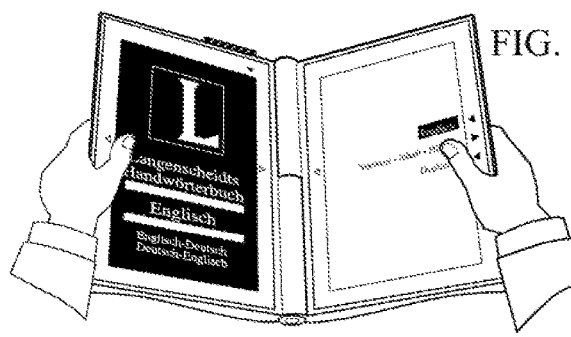
FIG. 24C
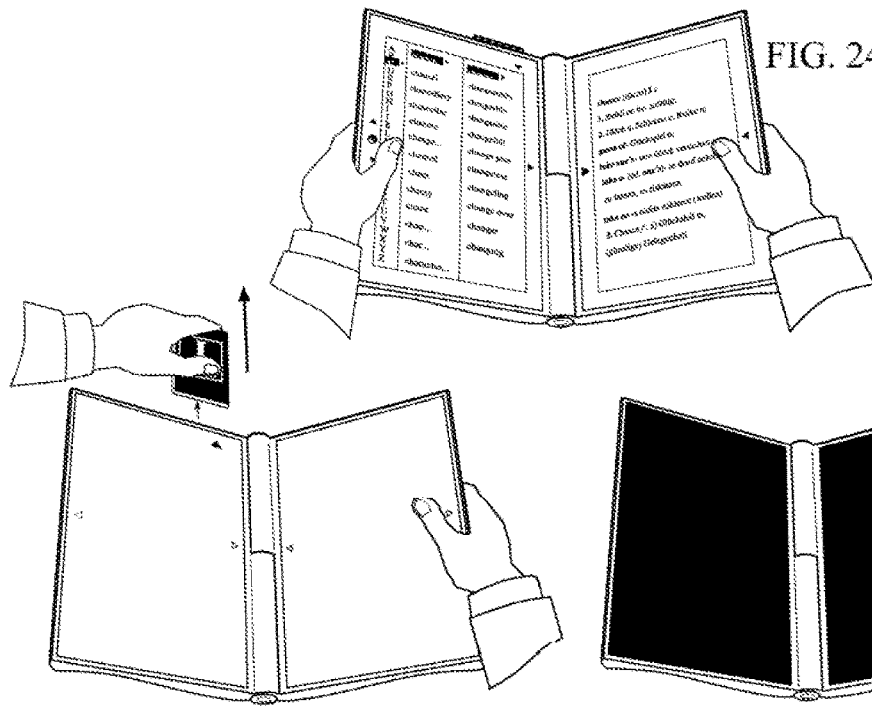
FIG. 24D
FIG. 24E
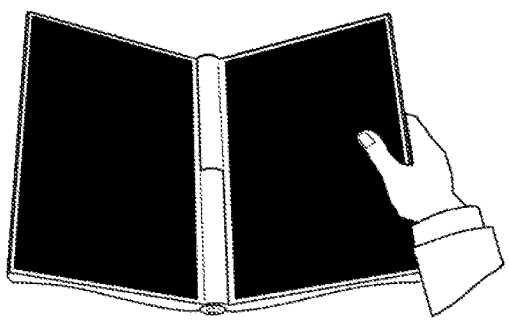
FIG. 24F

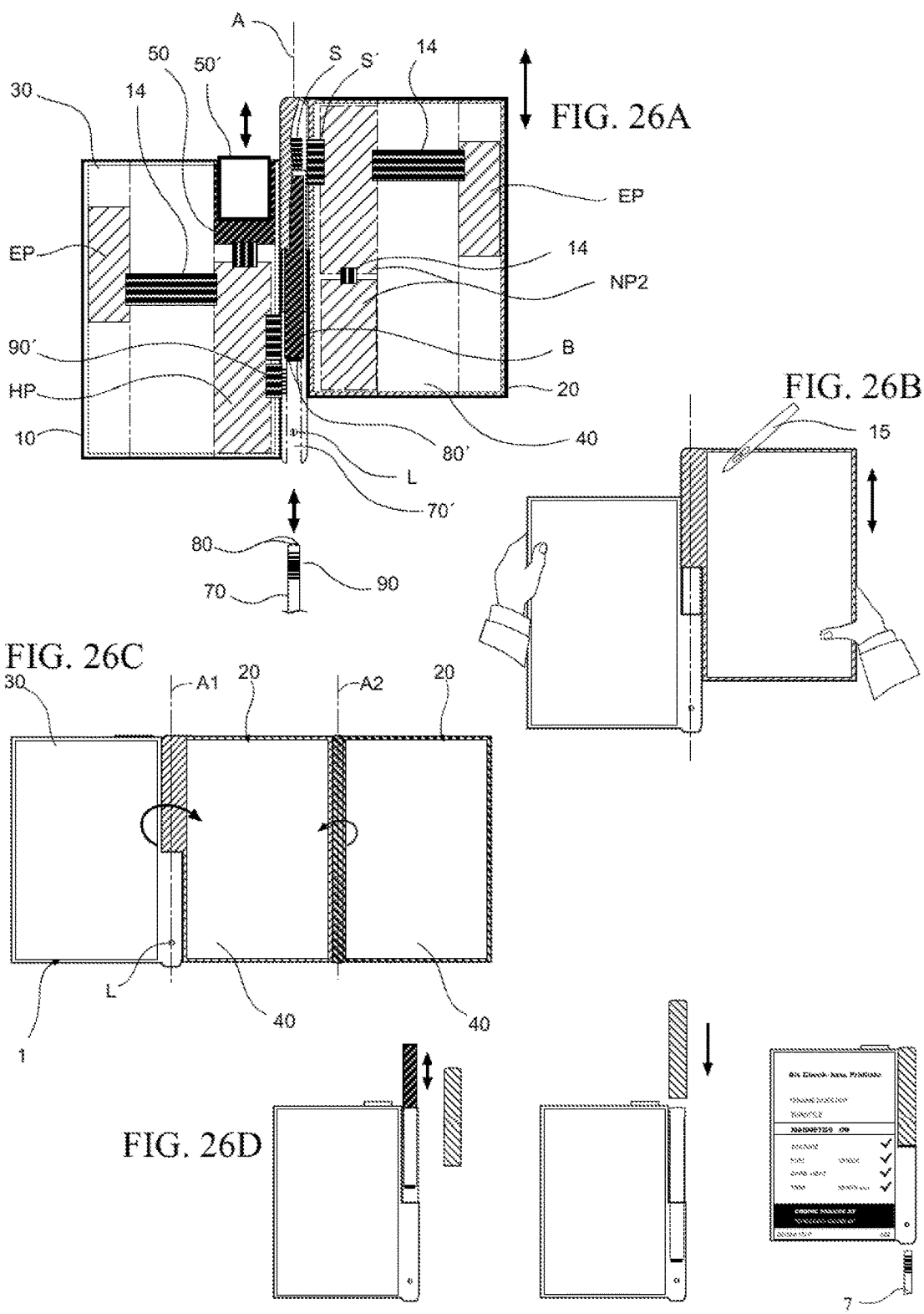

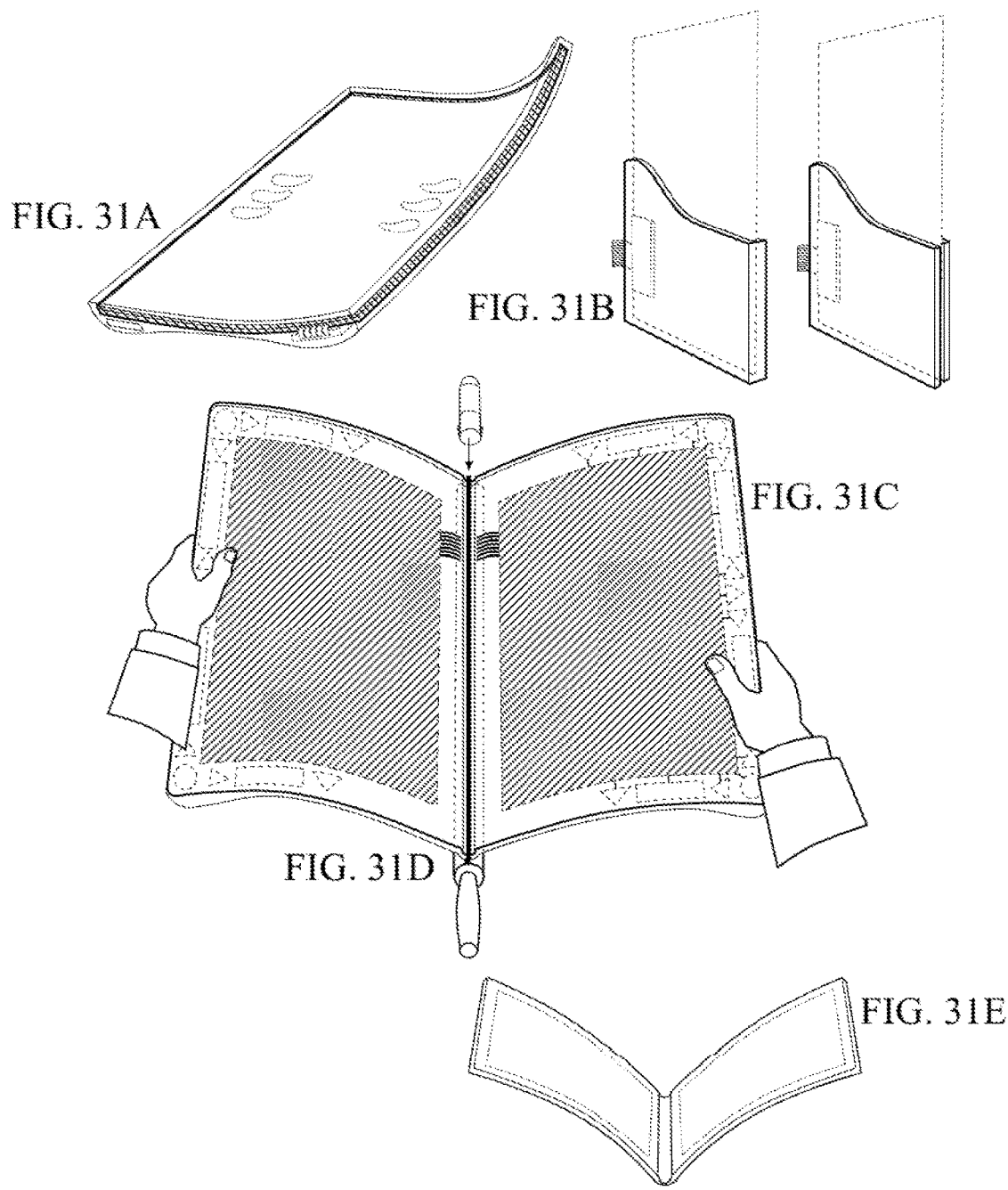

DIGITAL BOOK

CROSS-REFERENCE TO RELATED APPLICATIONS

This application is a continuation of U.S. patent application Ser. No. 09/508,794, which was filed on Jun. 1, 2000 (now U.S. Pat. No. 8,654,082), which is a U.S. National Stage application under 35 U.S.C. § 371 of International Patent Application No. PCT/EP98/06008, filed on Sep. 21, 1998, which claims foreign priority of Application No. DE 197 414 53.2, filed on Sep. 19, 1997.

FIELD OF THE INVENTION

The present invention relates to a digital book, in particular for the reproduction of book, newspaper and magazine information and other documentation and publications in electronic or digital form by means of text, graphical, photo and/or video and audio information for operation through laymen.

BACKGROUND OF THE INVENTION

The consumption of paper and with it: the demand for raw materials are growing year for year. The ever growing population and the always increasing demand for information, but also the self-imposed competition-induced communication constraint cause an explosion-like expanding flood of information which necessitates in always shorter intervals an immense consumption of paper, which thus is not only a burden to the environment but also entails an economic disadvantage as regards the transportation, stock-keeping and recycling costs as well the speed necessary to make available publications. Owing to modern information technologies it has indeed become possible to produce a large part of the information via computers, to offer it for instance via internet, online services or data bases or to market it in the form of CDs, however such information can be consumed by the consumer via PCs, laptops and notebooks only, which presupposes that at least one of the above-mentioned computers is purchased, that necessary applications are installed and that one has to be familiar with the use thereof before a first publication can be read.

The afore-mentioned reasons and the investment costs associated therewith, the necessary time and the, from the view of a technical layman, special knowledge required for installing and operating hardware and software make it difficult for a large part of the population to take advantage of electronic publications. But also older or handicapped persons often do not find access to computers, since, without basic knowledge, operation and handling are not possible for a layman or possible with difficulties only, or the complexity of the user interfaces imposes excessive demands on these persons.

Moreover, laptops and notebooks, due to their various drives and multitude of input and output interfaces for specific applications, are of large volume and weight, and they are equipped with a keyboard for the entire particular font and with just one single screen or display. However, there are applications in which on the one hand the relatively costly and space-consuming keyboard is unnecessary and on the other hand the display or display/operating area provided by just one single screen is too small for specific applications.

Laptops and notebooks, due to their purpose as working tool and the constructionally necessitated or constructional features associated therewith, primarily are no ergonomic, i.e. handy and easy-operation means of information to take up, e.g. belletristic literature or for reading reports, articles, commentaries and news from magazines and newspapers or for studying publications in relaxed posture or in situations where no supporting surface is available. Expenditure and time of operation often stand in no relation to the often spontaneous demands which moreover are frequently to be settled shortly, e.g. looking up information from a lexicon, a telephone directory or a television magazine.

The document U.S. Pat. No. 5,534,888 A1 reveals an electronic book comprising two display parts adapted to be folded open in the manner of a book, as well as a central part joining together these two display parts.

A simple ergonomic and compact electronic device as actual substitute for books, magazines or newspapers for universal use in different situations in life, which is uncomplicated and comfortable to hold and operate for technical laymen and at the same time has little optical irritations for undisturbed reading and manipulating a large variety of different publications/is not known so far. The electronic book known from U.S. Pat. No. 5,534,888, for handling through the user, requires often inconvenient and time-consuming complicated operations since a multitude of keys arranged in inconvenient manner in terms of ergonomics is to be operated, with the functionality thereof being predetermined and the space available for the display being thus curtailed. In case of an electronic book known from U.S. Pat. No. 5,534,888 A1 the operation takes place with the aid of an auxiliary display on the outside of the book covers (display elements), with the result that the user must shut the electronic book in order to carry out specific adjustments. Furthermore, the keys can be operated in single manner only. On the reverse of the central part there is arranged a multitude of electrical connectors which are hidden behind protective flaps and which, if necessary, must be identified by the user with technical knowledge and must be made accessible by folding up the protective covers. In case electrical lines are connected to the electrical connectors, the electronic book of the prior art can no longer be held on the book back in the manner of a book or be placed on a support.

It is thus the object of the invention to make available a digital book of the type indicated at the outset, which in contrast to the prior art offers, despite a compact construction, on the one hand a considerably enlarged display area and on the other hand handling options that are user-friendly, simple and easily understandable for computer laymen, to enable the same to read comprehensive literature, e.g. scientific works, encyclopedias or also belletristic literature, in order to offer the advantage to the user, also in comparison with a conventional more voluminous and heavier book, to at least read and/or possibly work on an arbitrary number of pages via e.g. just two digital book pages in handy form. The reading and viewing habits of traditional readers of books, magazines and newspapers need to be considered in this respect, who expects as irritation-free as possible viewing of the publications or document information indicated and are repelled by an impression too closely oriented along computer technology, e.g. as regards certain forms of operating elements or due to other overstrain, as it often occurs in case of older people or technical laymen who refuse to use an electronic or digital book. What is to be ensured in this respect is safe and ergonomic holding and operation in different situations, e.g. when walking, lying or if no other supporting surface is available, as well as simple and understandable handling with a minimum or lacking previous knowledge or for instance in case of a handicap. This is to provide uncomplicated and constant operability despite different possibilities of use and a multitude of tasks. It is intended to render possible fast and reduced operation with a minimum of changes in posture during reading.

The object underlying the invention is met by the subject matters of the independent patent claims.

BRIEF DESCRIPTION OF THE INVENTION

Advantageous developments of the invention are defined by the features indicated in the dependent claims.

The digital book according to the present invention is advantageous since it represents a genuine alternative to a traditional book, presupposing first of all the viewing and reading habits of the user and requiring no specific technical (computer) knowledge. Furthermore, in comparison with the known prior art.
  (a) the reading and/or working area is enlarged through operation by means of rear-side operating elements,
  (b) pages can be read in the manner of traditional book pages, without disturbing elements, e.g. menu list, icons, operating elements etc.,
  (c) this device can be used without specific preparations in any situation and in an arbitrary body position, e.g. in case of confinement to bed of the user.

Multifunction input means (FIG. 11 at 60h) located in the range of action of the holding hand, which can be combined (FIG. 13A through FIG. 19C) and can be programmed or switched over under software control (FIG. 13A through FIG. 22C) and preferably are formed as keys located on the side directed away from the display area and operated by means of the fingers of the holding hand (FIG. 3 through FIG. 6C, FIG. 11, and FIG. 13A through FIG. 19C), with functions being displayed only if required and being handled marginally without disturbing the document (FIG. 15A and FIG. 16A through FIG. 21H):
  (a) faster completion of operating routines
  (b) minimization of movement and avoiding constant changes in position of the hand holding the display means
  (c) reduction of the technical impression and/or expenditure with utmost utility with the least possible amount of input elements
  (d) better distribution of the tasks' to the individual fingers
  e) enlargement of the front display' area
  (e) flexibility through the additional possibility of combination with other input means, such as e.g. the display area and/or actual operating elements which can also be operated with the other hand and/or voice input
  (f) easier orientation e.g. for visually impaired and blind persons (presupposed is of course the reading out of the book via an audio output)

User interface (FIG. 9A and FIG. 9B) located on the underside of the digital book, preferably in the folding hinge of a two-part display unit (FIG. 1 through FIG. 6C and FIG. 11), which is the holding grip of a one-part display unit (FIG. 12H), for coupling by means of cable connectors preferably with jack plugs, in order to effectively connect different devices, apparatus and means to the book (FIG. 1 through FIG. 3, FIG. 5, FIG. 11, FIG. 25 through FIG. 27E) and/or to serve as a support for the book station (FIG. 5) and to supply data information and/or energy to the digital book by means of signal transmission (FIG. 1):
  (a) uncomplicated connection
  (b) avoiding damage in case of improper handling
  (c) redaction of interfaces and associated therewith reduced production costs
  (d) book back free from cables and plugs for better placement e.g. on a table surface or in the lap
  (e) use both for cable connection and for the holding pin of the supply station
  (f) more favorable symmetry and balance in case of possibly, arising strain loads through connected supply cables
  (g) lesser irritation through disturbing cables
  (h) reduction of the "technical impression" on the side of the user Ergonomically Shaped Display Back Side and Flexibility
  (a) handier, more Pleasant and safer holding during operation and transport
  (b) more compact construction with sensible and. optically advantageous accommodation of the necessary electronics
  (c) predetermined bending location for easier bending (flexibility)
  (d) protection of operating elements disposed on the rear side/laterally
  (e) reduction of the "technical impression" on the side of the user
  (f) reduced risk of damage and easy transport The digital book according to the invention can be used to advantage as a means of reference that can easily be carried along, e.g. as comprehensive-contents road map, hiking map or the like. Furthermore, if required, comprehensive literature can be carried along on journeys without laborious transport of a multitude of traditional books. The digital book is suitable in particular also as reference means in places offering no large freedom of movement. To be named as an example in this respect is in particular the cockpit of a large commercial airplane in which usually a multitude of files with examination and operating instructions are to be carried along. Especially in emergency situations is it, important to find corresponding hints quickly without time-consuming leafing or page-turning. A conventional notebook or the like is suitable to a limited extent only because of the complicated handling thereof and the susceptibility of its disk drive e.g. in case of turbulences. Besides, this holds to a high degree for utilizations in private aircraft.

A further advantage consists in that at least two screens can be read in the book page format (upright format) as whole pages, with the at least two screens being adapted to possibly fulfil different functions. For example, it is possible to read a full page of a manuscript text and to have indicated at the same time extracts of text passages on the secondary screen that were previously marked on the text side, or other vales of the respective (e.g. scientific) book text can be indicated e.g. along with illustrations mentioned on the text side, without the current book page being covered or blanked out thereby. Besides, cross-references, reference hints etc. can be indicated by marking, e.g. by tapping the source mark with the screen pen, without requiring "page turning".

Due to the possibility of separating the screens of the digital book, it is possible, starting from a basic configuration thereof (which is intended for reading only), to match the secondary screen to the needs of the user in accordance with the requirement profile and the prior art, and the range of capabilities of the digital book can thus be expanded. For example, the secondary screen can be designed to be pressure-sensitive whereby a screen page can be written on in hand-writing by means of the screen pen while the written text quasi simultaneously can be indicated on the main screen in printed letters, and optionally in another language by means of a translation function of the loaded software.

This renders possible e.g. more rapid and convenient preparation and revision of business letters.

A digital book having a first optimized user interface according to the invention, for simplified operation with minimum technical information, comprising at least one input unit located. on a right and/or left side of the digital book for manipulating the information displayed and/or for effecting a change in operating state and/or setting and/or for loading document information and/or for switching to another operating mode, however without restriction thereto, with the main input element(s) or key element(s) being advantageously disposed in the gripping edge on the side (60*h*) of the digital book facing away from the display side, such that operations possibly may be carried out at a location where the display unit (10) is held, by means of the fingers of the holding hand.

FIG. 11 shows in exemplary manner an upper left position, preferably there is provided a position laterally in the middle of a display side, since the central position constitutes a more neutral starting position for operation, as will be pointed out in the subsequent description of the figures, in which however preferably three combinations keys, shown preferably in the exemplary figures, can be replaced by other operating elements, provided that these at least in part fulfil tasks by way of their properties, which include for example the selection and activation of information displayed on the display area and/or moving pages and/or at least the option of displaying a first item of information on the display area and/or to release an already displayed first item of information, e.g. by deactivation of an activation blocking means (ES) to be operated via an arbitrary input provided therefor, e.g. via touchscreen preferably also in the region of lateral gripping edge of the display (20). It is left open whether there is only service of real operating elements and/or in combination with a sensitive display area and/or in combination with speech, since this is dependent first of all (as shown in FIG. 16A through FIG. 19C) on how the properties of the display medium are designed, e.g. as touchscreen or as a mere display screen. It is basically also possible to arrange other operating elements at other locations of the display unit without affecting the scope of protection.

The operating elements are provided in different designs and arrangements. The operating area may also be equipped e.g. with a slide pad and/or trackball and/or a multifunction key etc. or the corresponding key areas can be designed as induction areas or switches.

A digital book with an additional optimized user interface according to the invention for simplified operation with minimum technical information, comprising at least one or plural display area (s) of sensitive design, via which, by touching an arbitrary, but predetermined location, first operating information of an invisible functional choice or operating information is made available, i.e. displayed, which can be handled further. This takes place preferably by identification of a functional choice or functional group to be displayed via fixed position information (60'V) offered, for example, by a first corner of the display area and/or a central location on a lateral side of the display area. Preferably, it is provided for the normal reading mode to keep blanked out or invisible a multiplicity of irritating and disturbing functions or operating information to be indicated on the display area for operation and to make available corresponding functional or operating information only in case of necessity, with all functions being made visible or available either all at once or one functional group separately from at least one further functional group for manipulation thereof. The advantage hereof is an irritation-free or undisturbed document page displayed, similar to a book (illustrative examples are shown in FIG. 19A through FIG. 21H).

An additional advantageous development, which however is not restricted thereby, effecting the installation of functional or operating information by an initialized document, provides the possibility of separating the display area into regions allowing the layman sensible operation with respect to specific functions of the publication indicated, e.g. if a coupled memory with document information (50') makes available all functions and operating information, respectively, required for service of this document, in the display unit in invisible manner at that location where the coupled memory is located. The layman thus has the possibility of requesting only that operating information that is directly associated with the initialized document.

A digital book comprising an additional optimized user interface according to the invention for simplified operation with minimum technical information, comprising at least a first solid-state coupling device (50) provided preferably in the upper part of the digital book and serving preferably for a memory card (50'), but being not restricted thereto, which by means of a coupling operation, preferably by insertion of the solid-state element, triggers one or several processes in the digital book, which facilitates handling of pages by a laymen insofar as e.g. the content of the coupled solid-state body, without further ado by the user, endeavors to carry out the task desired e.g. by introduction of the body (50') into the receiving opening designed for this purpose. For example, the contents of a memory card with book information is displayed after successful coupling, without additional activity by the user, or at least a first item of information is made available that only needs to be verified by the user (FIG. 24A through FIG. 24F). The initialization request necessary therefor preferably is provided by the digital book, after identification of the coupled solid-state body. To this end, the already known plug and play technology may be used to ensure recognition of the solid-state body (cf. in this respect also FIG. 22A through FIG. 22C or FIG. 23A through FIG. 23C).

An additional advantageous means for easy operation with minimum technical information according to the invention, by coupling one or more solid-state bodies with the digital book according to the invention, consists in that these solid-state elements contain software and/or hardware components, such as e.g. electronic means (integrated circuits, battery, memory, transmitter and/or receiver for information transfer without cables, etc.) which in some way or other, as outlined, preferably without further ado of the user, expand the range of capabilities with regard to the information to be indicated, which is input into the digital book via the solid-state means, and/or takes over operating functions that cannot be carried out by the user, or in a restricted scope only, due to lack of an alphanumerical keyboard.

A further advantageous means for simple operation with a minimum of technical information, by coupling one or more solid-state bodies with the digital book according to the invention, is the automatic installation and/or setting of the digital book—effected by coupling of a solid-state memory with the digital book, fox: example by programming the functional keys of the digital book for optimum handling of the document stored in the solid-state memory (FIG. 22A through FIG. 22C) and the corresponding operating information and/or e.g. the automatic switching over from a separate-display operating mode to a combined-display operating mode, and vice versa, preferably automatically by coupling and/or decoupling a first and/or second solid-state memory with document information to be displayed (FIG. 23A through FIG. 23C).

A digital book with an additional optimized user interface according to the invention for simplified operation with a minimum of technical information makes use of a coupling by means of cable connectors via preferably only one interface on the bottom side of the digital book (70'), preferably in the pivot hinge of the book in case of two-part or multi-part display sections which in case of one-part display sections is the gripping handle, for receiving for example a jack plug (70'). This provides the advantage that the interface is sturdy, uncomplicated in operation and that the contact positions necessary for establishing contact can be accommodated along an arbitrary length of the jack plug, since introduction is not hindered by the constructionally necessitated depth of the digital book. The preferably only one interface is designed such that the electronic means of the digital book can be effectively connected to a large variety of different devices, means and apparatus by means of signals for transmitting data for example in bidirectional and serial fashion and/or energy. To this end, it is possible to couple different peripheral apparatus, such as e.g. printers and/or telephone and/or modem and/or PCs and/or laptops and/or charging devices, which are cited as examples only. For doing so, the layman user just needs to plug in the corresponding cable connector and latch the same, if there are provisions to this effect. Another function of this interface consists in receiving the guide and supply pin of the book station, which has the task of supplying energy and/or data information to the digital book, which for example in accordance with the particular design can be provided on the book station or in the digital book. This supply plug at the same time serves as a stabilization pin (FIG. 5 at 7) of the digital book to be arranged thereon in upright position, namely as two-part book in the closed state and/or as one-part book in the opened state via the interface integrated in the handle (not shown).

BRIEF DESCRIPTION OF THE DRAWINGS

Embodiments of the invention will be described in detail in the following with reference to a number of drawing figures:

FIG. 6A, FIG. 6B, and FIG. 6C show different perspective views, in the "folded-open" state, of a permanently connected and/or a display-part coupling embodiment of the digital book according to the invention, comprising two display parts, for reading and/or writing on a display area adapted to be written on.

FIG. 12A, FIG. 12B, FIG. 12C, FIG. 12D, FIG. 12E, FIG. 12F, FIG. 12G, and FIG. 12H show representations of different modes of appearance of the digital book according to the invention, however without restriction thereto, in the form of a one-part or multipart, permanently connected or display-part coupling embodiment.

FIG. 13A, FIG. 13B, FIG. 13C, FIG. 13D, FIG. 13E, and FIG. 13F show the partial aspects underlying the digital book according to the invention, for optimizing, i.e. simplifying operation along with simultaneous reduction of irritating information and/or technical designs.

FIG. 14A, FIG. 14B, FIG. 14C, and FIG. 14D, by way of an example of a folded-open two-part digital book according to the invention, however without restriction thereto, show the provision of operating information and the further handling thereof by means of operating elements located away from the display area and/or by means of an input via a sensitive input area, as well as the provision of first functional information as well as further operation via the sensitive input area.

FIG. 16A, FIG. 16B, FIG. 16C, FIG. 16D, and FIG. 16E show the general combination possibility of an input area of the digital book according to the invention, using as example three real operating elements and their programming with regard to a first function and additional first functions possible by combined operation, as well as the automatic software-controlled reprogramming of the operating elements through a first operating step, for fulfilling a second task in a second operating step.

FIG. 21A, FIG. 21B, FIG. 21C, FIG. 21D, FIG. 21E, FIG. 21F, FIG. 21G, and FIG. 21H, by way of the example of two corner, functions displayed in the display area, show an embodiment of FIG. 19A through FIG. 19C, in which the lateral edge operations in the region of the gripping edge are realized in a document edge and/or frame in addition, in order not to irritate or disturb a displayed document.

FIG. 22A, FIG. 22B, and FIG. 22C, by way of the example of a one-part embodiment of the present invention, show the automatic and software-controlled programming of operating elements and the resulting change it the displayed operating information by a coupled memory medium or an initialized document.

FIG. 23A, FIG. 23B, and FIG. 23C, by way of the example of a two-part embodiment of the present invention, show the automatic switching over of a combined-display operating mode, during coupling of a second book document with: the digital book, to a separate-display operating mode with corresponding display of the document on the display area as well as automatic switching over from a separate-display operating mode to a combined-display operating mode associated with a reverse process.

FIG. 24A, FIG. 24B, FIG. 24C, FIG. 24D, FIG. 24E, and FIG. 24F, by way of the example of a two-part embodiment of the digital book according to the invention, shows the activation and/or deactivation process of the digital book associated with coupling of a solid-state memory, as well as the attempt of installing and/or displaying the contents of the solid-state memory, which is effected automatically by coupling said solid-state element.

FIG. 26A, FIG. 26B, FIG. 26C, and FIG. 26D show in exemplary manner a hardware coupling and decoupling possibility by attaching or removing different hardware parts via the pivot hinge of a two-part digital book, which upon removing a part is the gripping handle of a one-part digital book, in which electronics is accommodated.

FIG. 31A, FIG. 31B, FIG. 31C, FIG. 31D, and FIG. 31E show several flexible digital books according to the invention by way of the example of one or two display parts with operating possibility, in which for example one or several polymer displays are adhered in at least partly transparent plastics or plastics-similar material for strengthening.

DETAILED DESCRIPTION OF THE INVENTION

Figure 1:
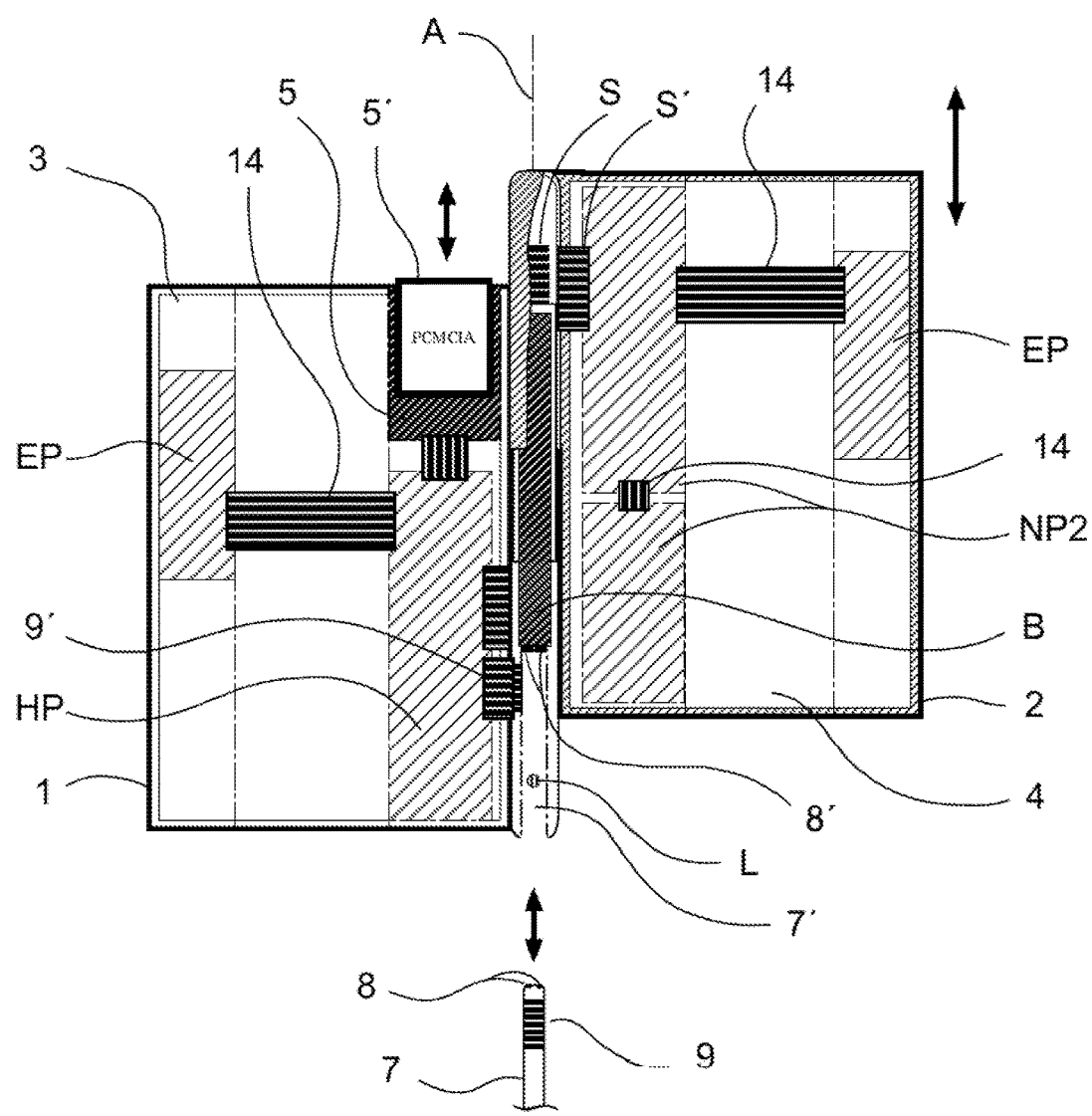
FIG. 1 shows a schematic plan view of a display-part coupling embodiment of the digital book according to the invention with two display parts in the folded open condition of the book casing along with schematically indicated installations and additional elements for the digital book, including the separating and coupling possibilities of the essential parts thereof.

FIG. 1 shows a schematic plan view of a display-part coupling embodiment of the digital book according to the invention, comprising two display parts 1, 2, in the folded open condition of the book casing along with schematically indicated installations and additional elements EP, EP2, HP, NP2, 14, 5, 5', B for the digital book adapted to be coupled, including the separation and connecting possibilities of the essential parts thereof. A casing of the two-part embodiment, adapted to be folded open and shut in the manner of a book, comprises at least one folding axis A, a main part 1 and at least one secondary part 2, said parts 1, 2 forming together a book back part. Parts 1, 2 are combined so as to be mechanically and/or electrically separable, with the necessary electrical connections of both parts 1, 2 being established for example by sliding contacts S, S'. Shown schematically are furthermore a main part circuit board HP, a secondary part circuit board NP as well as extension circuit boards EP, EP2, which are interconnected via bus lines 14. Formed in the casing is an insertion channel 5 with a reading means, for insertion of a PC card 5' or the like, which in essence is used for loading the digital book and contains e.g. book texts, graphics, operating programs etc. The casing comprises furthermore an operating unit 6 with a plurality of operating elements, preferably individually or in combination with operating keys (cp. e.g. FIG. 3).

Figure 2:
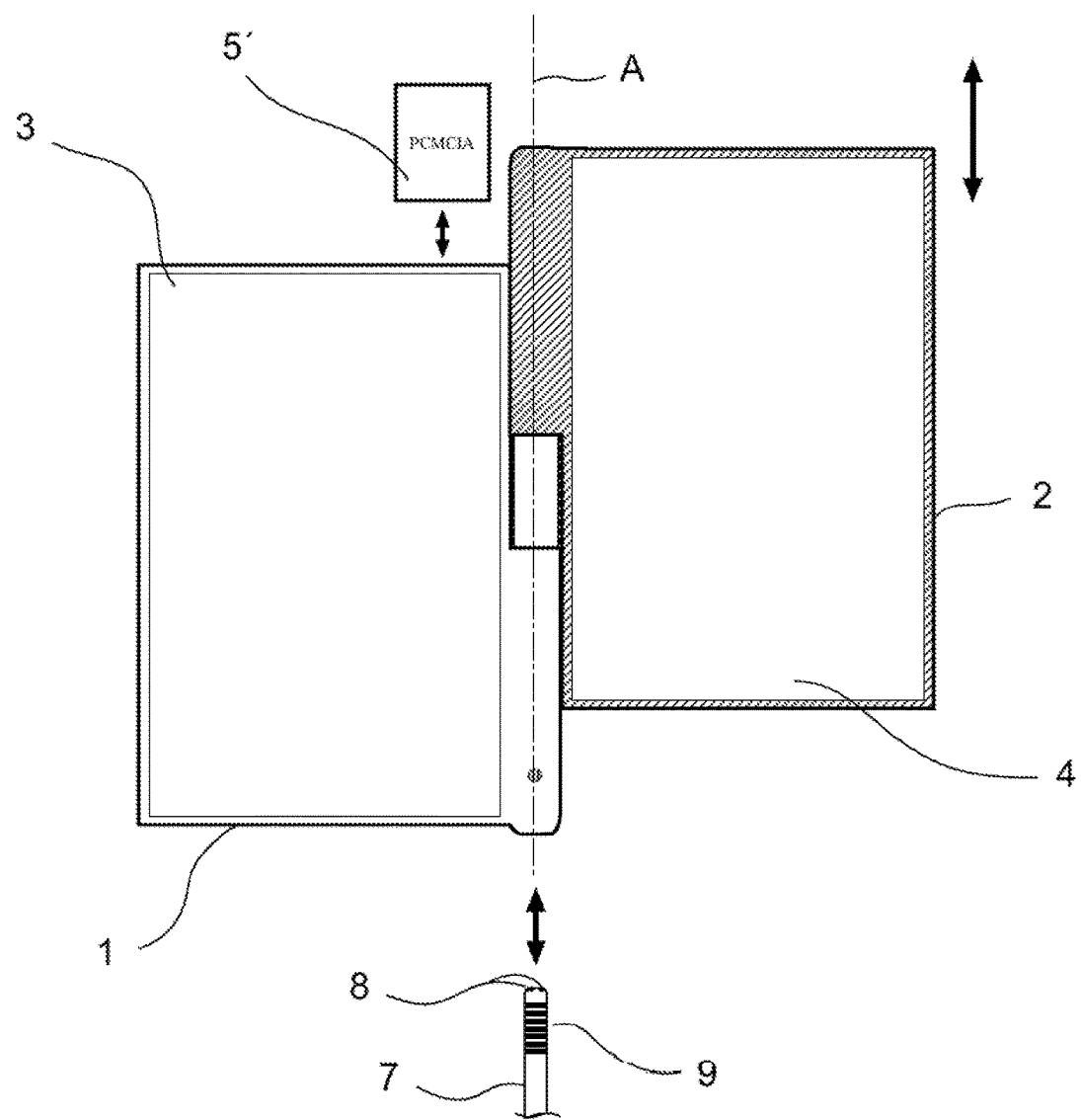
FIG. 2 shows a simplified schematic plan view of the display-part coupling embodiment of the digital book according to the invention with two display parts in the folded open state of the book casing along with additional elements, similar to the representation shown in FIG. 1.

FIG. 2: The display-part coupling embodiment of the digital book according to the invention contains a display unit 1, 2, 3, 4 which is at least of two-part construction and is arranged such that the main part 1 with at least one screen 3 and the secondary part 2 with at least one screen 4, in the folded-open state of the casing, present themselves to the user, like pages of a book, for looking at and optionally, for working on as required (cp. also FIG. 2).

Figure 3:
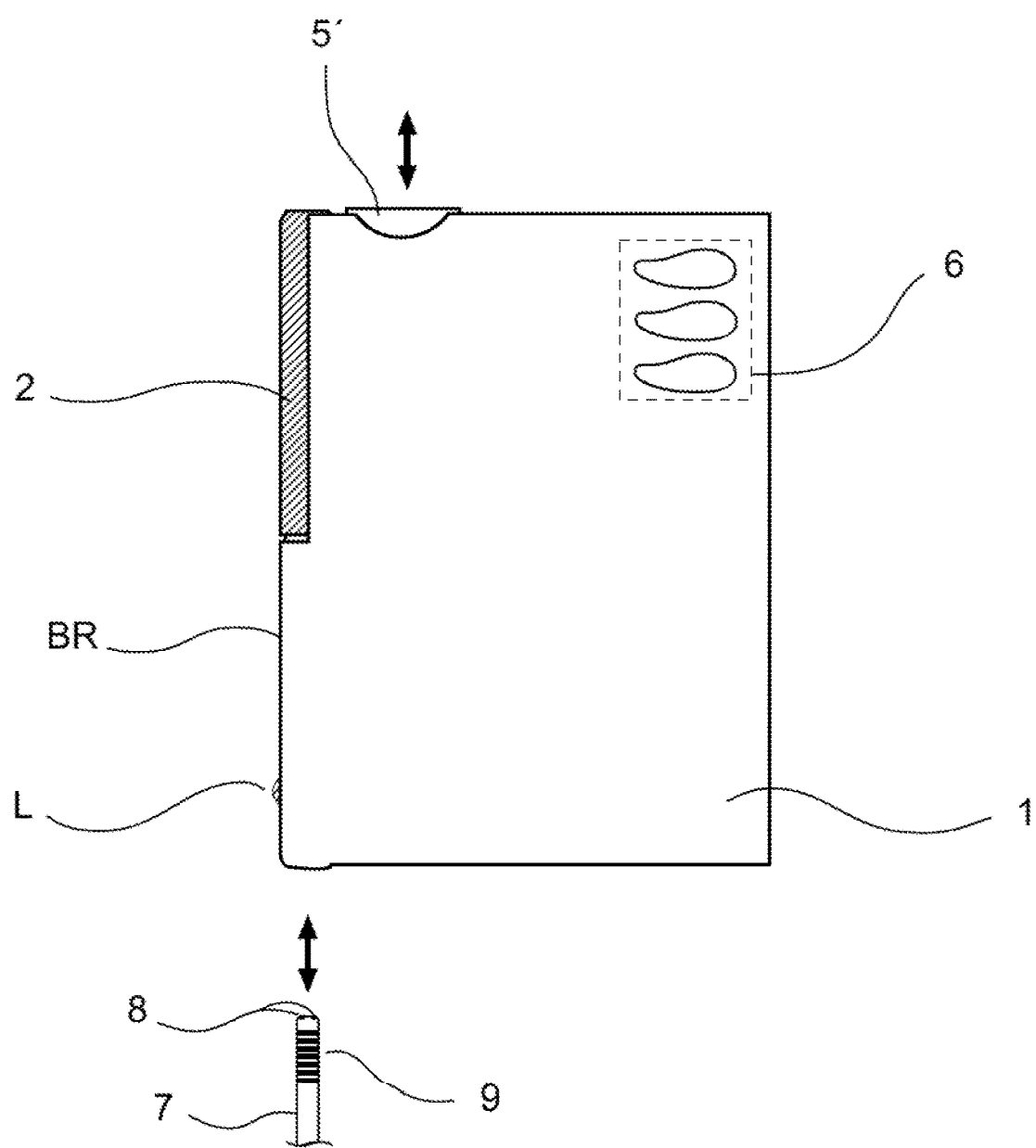
FIG. 3 shows a schematic side view of a permanently connected embodiment and/or of the main part of the display-part coupling embodiment of the digital book with two display parts, along with preferably juxtaposed combination key elements in the region of the gripping edge for operation thereof.
Figure 5:
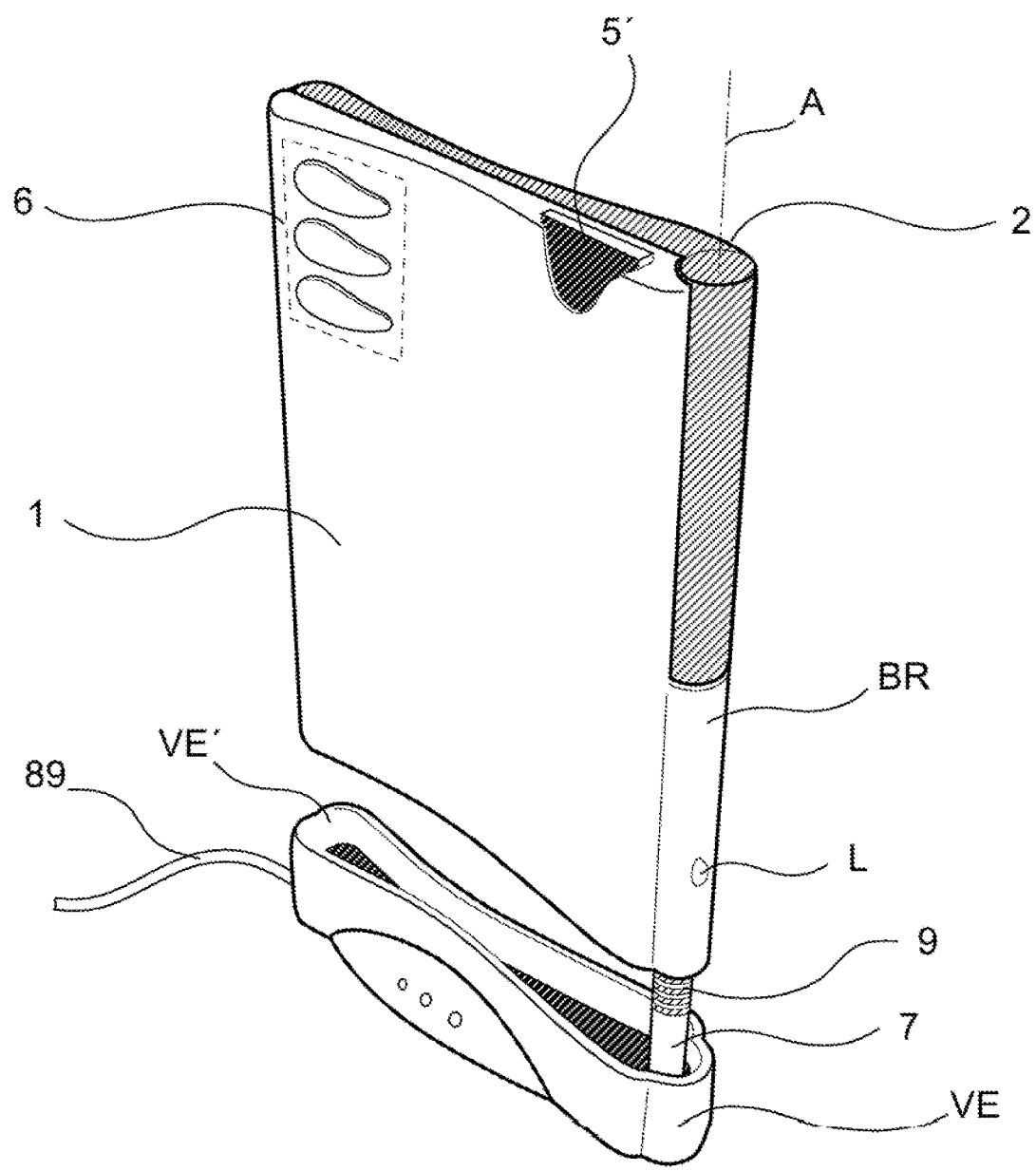
FIG. 5 shows a perspective view of the permanently connected and/or display-part coupling embodiment of the digital book according to the invention with two display parts in the closed condition for using 'the preferably juxtaposed combination key elements in the region of the gripping edge for operation, as well as a perspective view of a supply unit.

FIG. 3: The display part of the main part of the display-part coupling embodiment of the digital book according to the invention, in the closed condition of the casing, is adapted to be plugged into a supply unit VE (cf. FIG. 5) via a guide and supply pin 7 having a pair of power supply contacts 8 and a multiplicity of contact rings 9 for supplying and outputting information, said supply unit VE having a supply unit opening VE' for inputting and outputting information signals and/or for supplying energy and for accommodating the digital book (cp. FIG. 5). The book back part BR contains furthermore a light-emitting diode L for indicating the charging state of battery B. The juxtaposed combination key elements are arranged in the region of the gripping edge.

In a modified embodiment, math part and secondary' part may also be fixedly or permanently connected to each other in pivotable manner, without the provision that both parts can be separated from each other.

Figure 4:
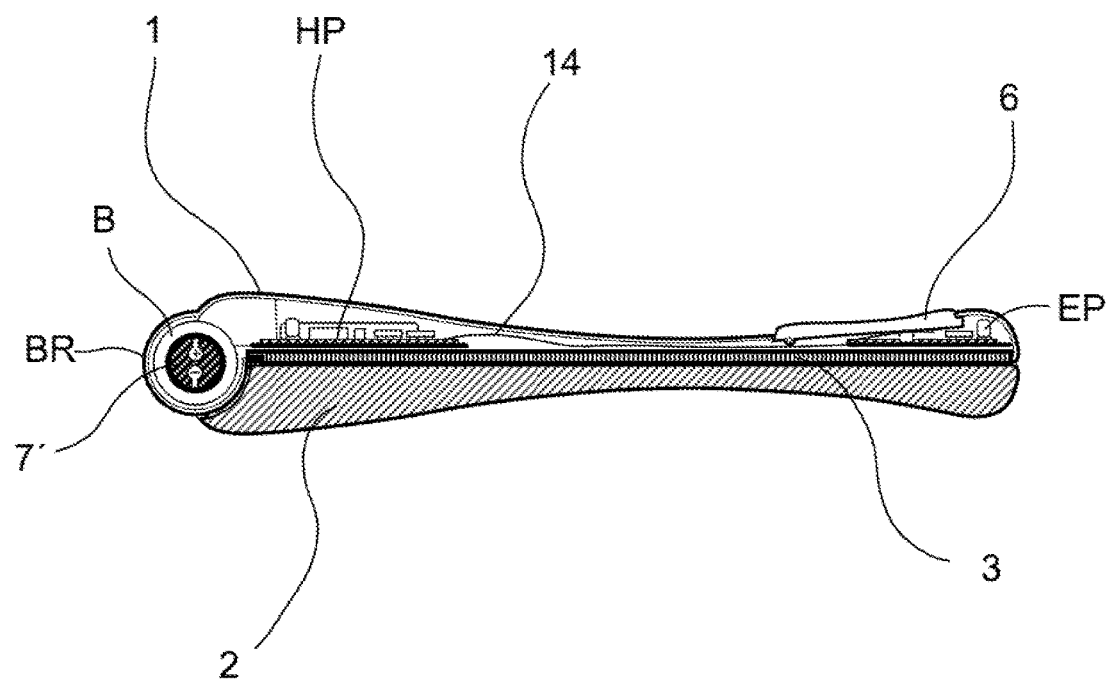
FIG. 4 shows, partly in section, a bottom view of the permanently connected embodiment and/or the display-part coupling embodiment of the closed digital, book according to the invention with two display parts, for use of the preferably juxtaposed combination key elements in the region of the gripping edge for operation e.g. by a left-handed and/or right-handed person if e.g. a display area adapted to be written on is disposed on the right side of the digital book.

FIG. 4 shows partly in section a bottom view of the main part of the permanently connected and/or of the display-part coupling; embodiment of the closed digital book according to the invention for use e.g. by a left-hander and/or a right-hander if e.g. a display area adapted to be written on is disposed on the right side of the digital book, with the representation containing the elements described hereinbefore. The casing contains, in a guide and supply opening 7', countercontacts 8' for power supply and/or countercontacts 9' for inputting and outputting information. The book back part BR (cp. also FIG. 3) is provided with a preferably rechargeable battery B for power supply of the electronic units and components of the digital book and for driving the screens 3, 4.

FIG. 5 shows, as already indicated, a perspective view of the permanently connected and/or of the display-part coupling embodiment with two display parts of the digital book according to the invention in the closed state, as well as a perspective view of a supply unit VE having a receiving opening VE'. The guide and supply pin projecting from the supply unit serves, among other things, for stabilization of the digital book in the supply unit. The digital book is shown in relation to the supply unit VE in a condition during removal of the digital book or in a condition during introduction of the same into the supply unit VE. Supply unit VE comprises a connecting cable 89 for inputting and/or outputting information, for example from and/or to a PC and/or a modem, and/or for supplying energy for powering the electronic units and components and for driving the screens of the digital book. Juxtaposed combination key elements are arranged in the region of the gripping edge.

Figure 6A:
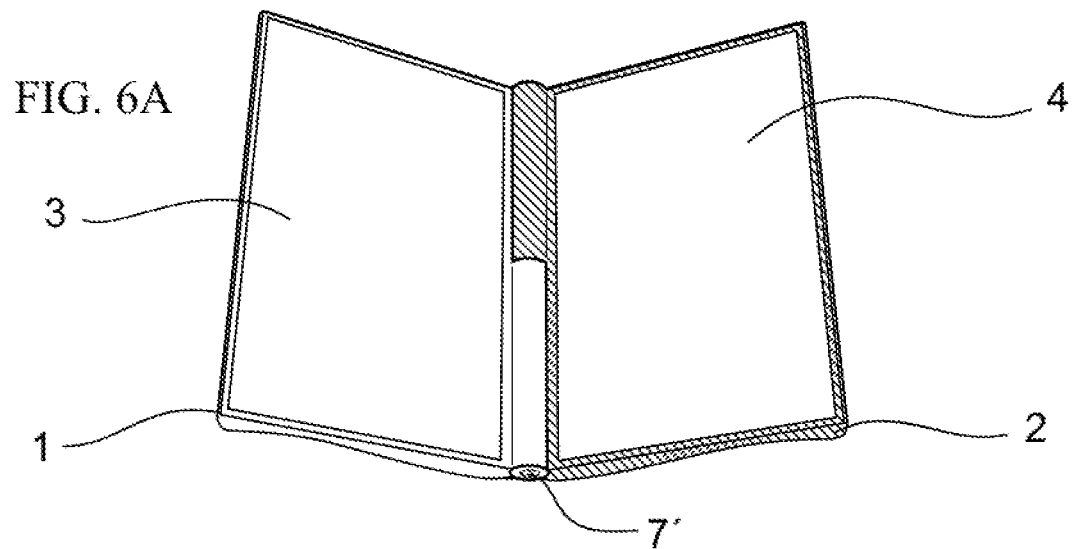
Figure 6B:
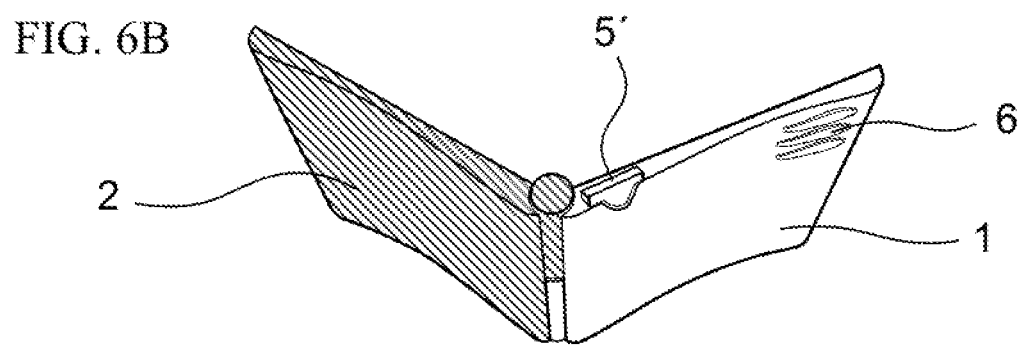
Figure 6C:
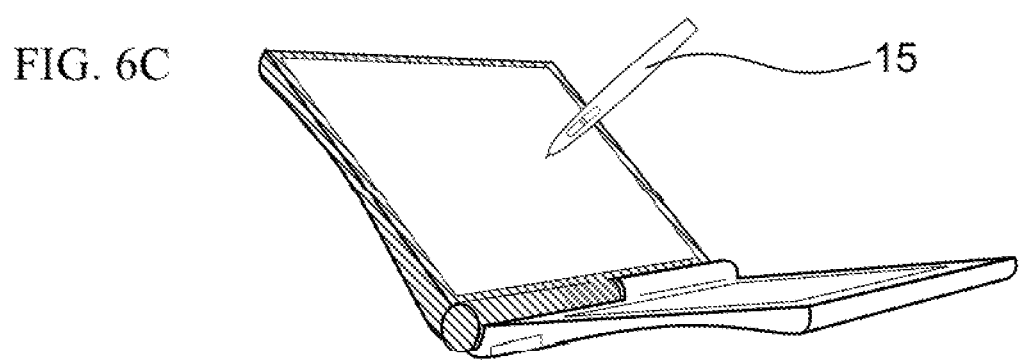
Figure 7A:
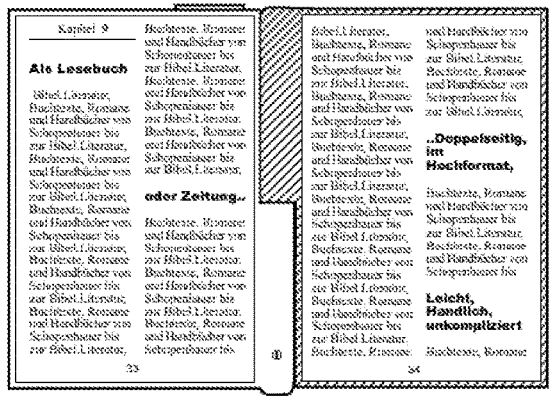
FIG. 7A, FIG. 7B, FIG. 7C, FIG. 7D, FIG. 7E, and FIG. 7F show different representations, constituting however no restriction, of the permanently connected and/or the display-part coupling embodiment of the digital book according to the invention with one, two and three display parts in various situations of use, from which various advantages of the digital book are apparent.
Figure 7B:
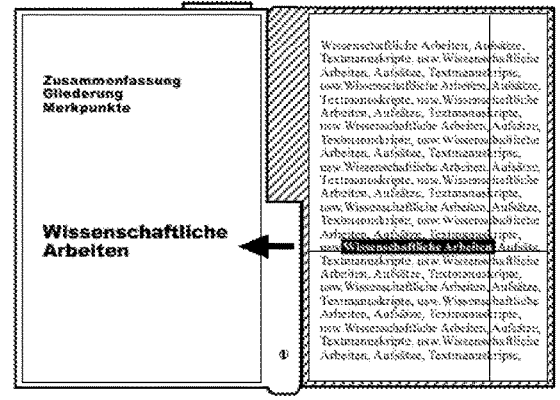
Figure 7C:
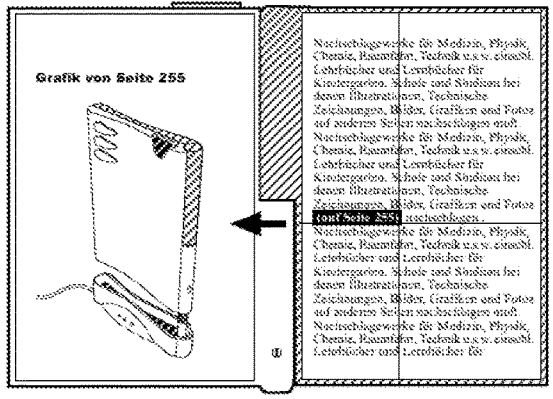
Figure 7D:
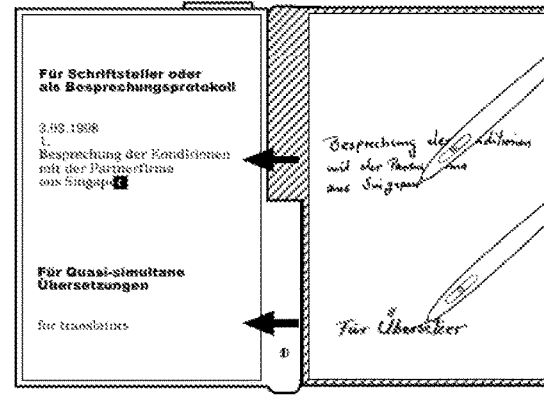
Figure 7E:
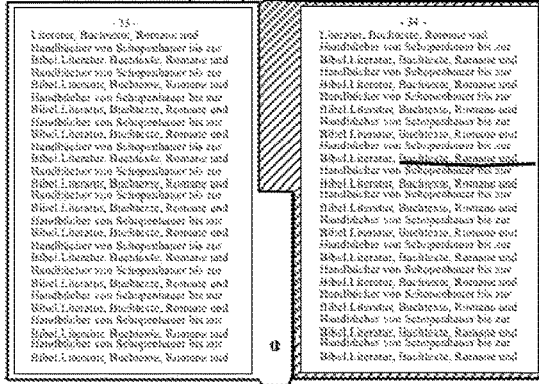
Figure 7F:
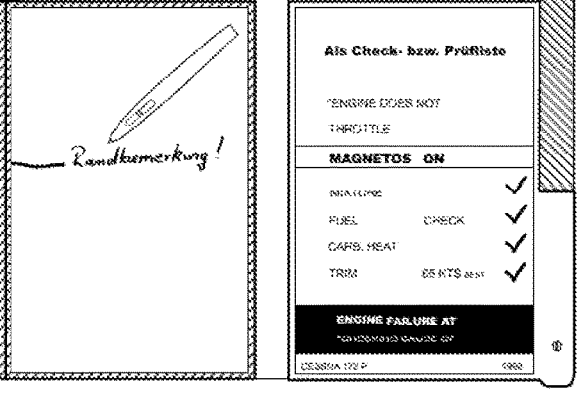

FIG. 6A, FIG. 6B, and FIG. 6C show different perspective views in the "folded open" condition a permanently connected and/or a display-part coupling embodiment of the digital book according to the invention with two display parts, for reading and/or e.g. writing on a display area adapted to be written on. Writing on the display area adapted to be written own and designed to be pressure-sensitive, in the example shown, takes place by means of a screen pen 15. Instead of using screen pen 15 for marking or triggering a specific function, it is of course also possible to press with a fingertip against a specific location of the screen, as it is known in connection with the so-called touchscreen.

FIG. 7A, FIG. 7B, FIG. 7C, FIG. 7D, FIG. 7E, and FIG. 7F show, as already indicated, different representations of the permanently connected and/or of the display-part coupling embodiment with one, two and three display parts of the digital book according to the invention in different applications, these representations indicating various advantages of the digital book.

Figure 8:
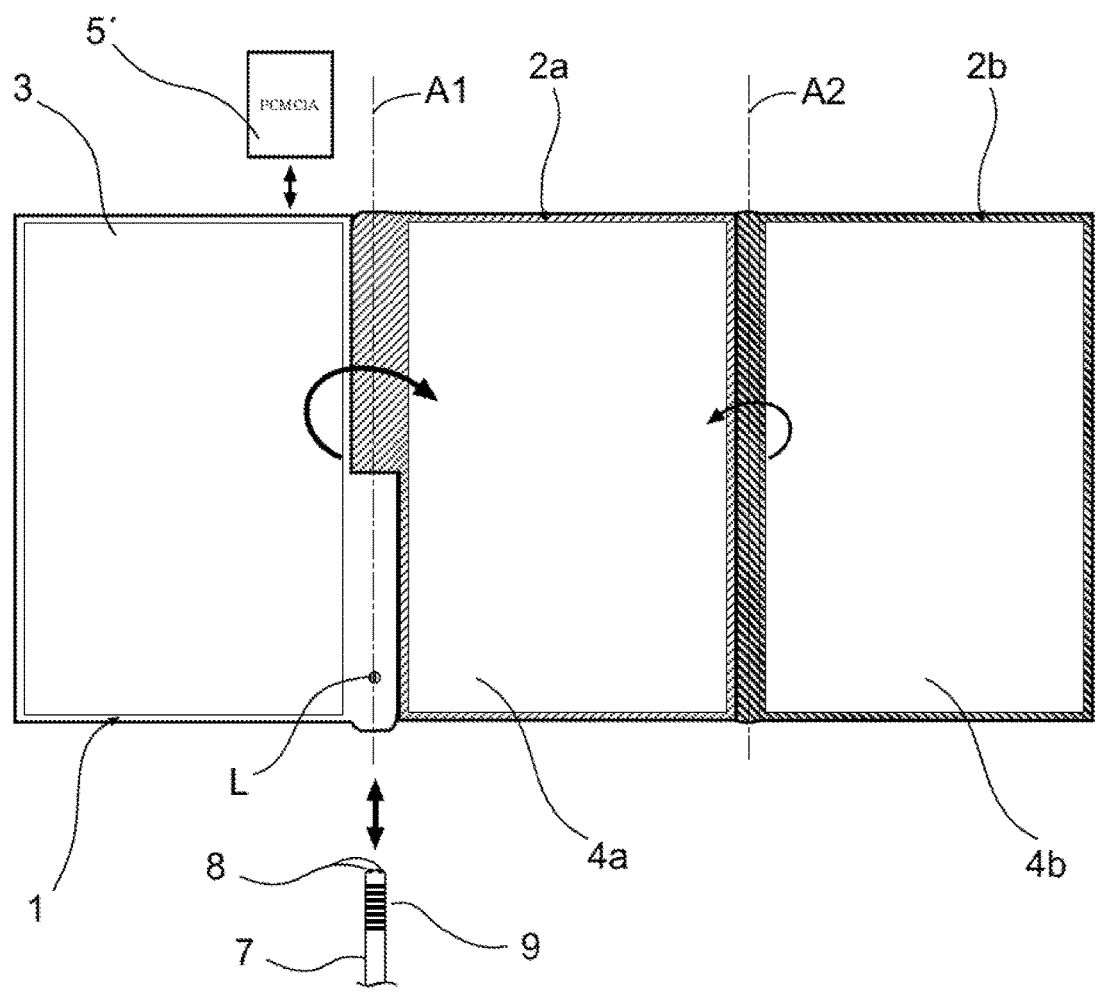
FIG. 8 shows a representation of a possible structure of the secondary part of a display-part coupling embodiment of the digital book according to the invention in the form of a double screen, similar to a folding map or a time organizer in the "folded open" state of the digital book for use with three screens.

FIG. 8 shows the representation of a possible structure of a secondary part 2a, 2b in form a double screen 4a, 4b similar to a folding map or time organizer in the "folded open" condition of the digital book for an application with three screens 3, 4a, 4b. In the embodiment shown the casing of the digital book comprises two folding axes A1, A2.

Figure 9A:
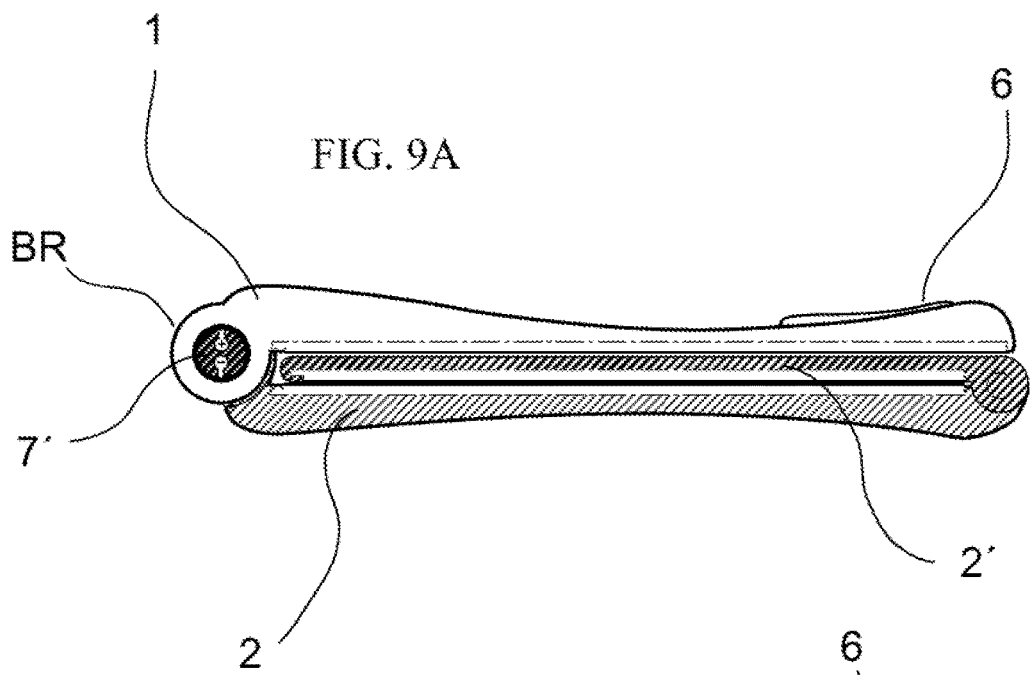
FIG. 9A and FIG. 9B show representations of the same embodiment as shown in FIG. 8, in the folded together or "folded shut" state of the digital book.
Figure 9B:
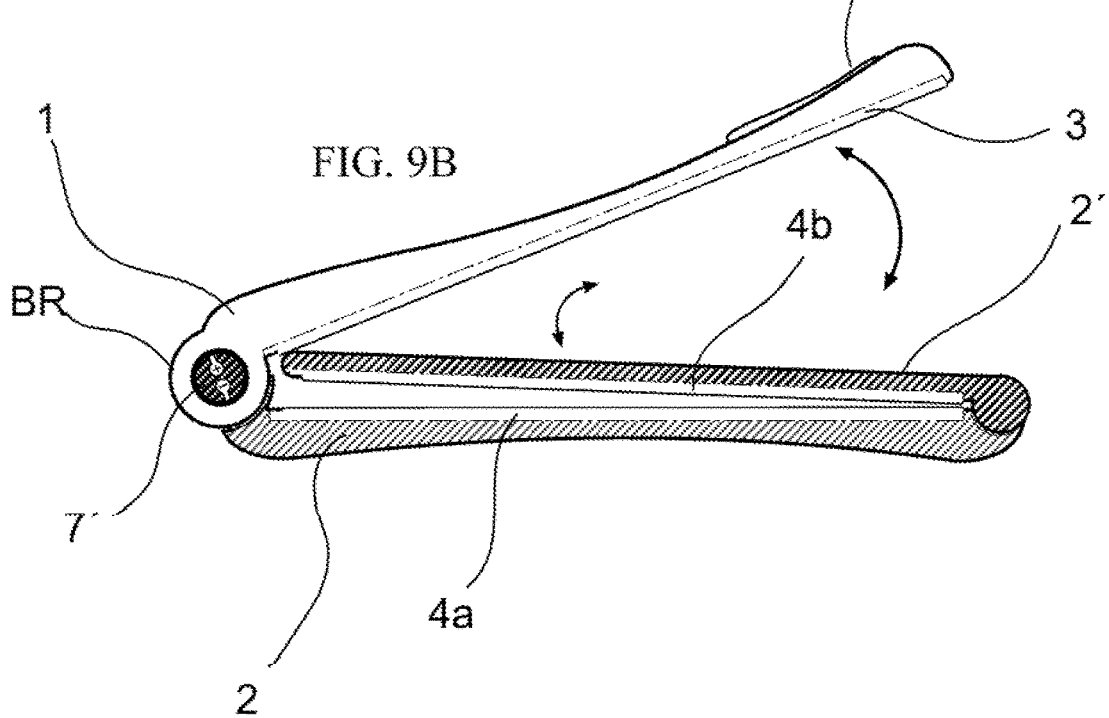

FIG. 9A and FIG. 9B show representations of the same embodiment as shown in FIG. 8, in the folded together or "folded shut" condition of the digital book.

Figure 10:
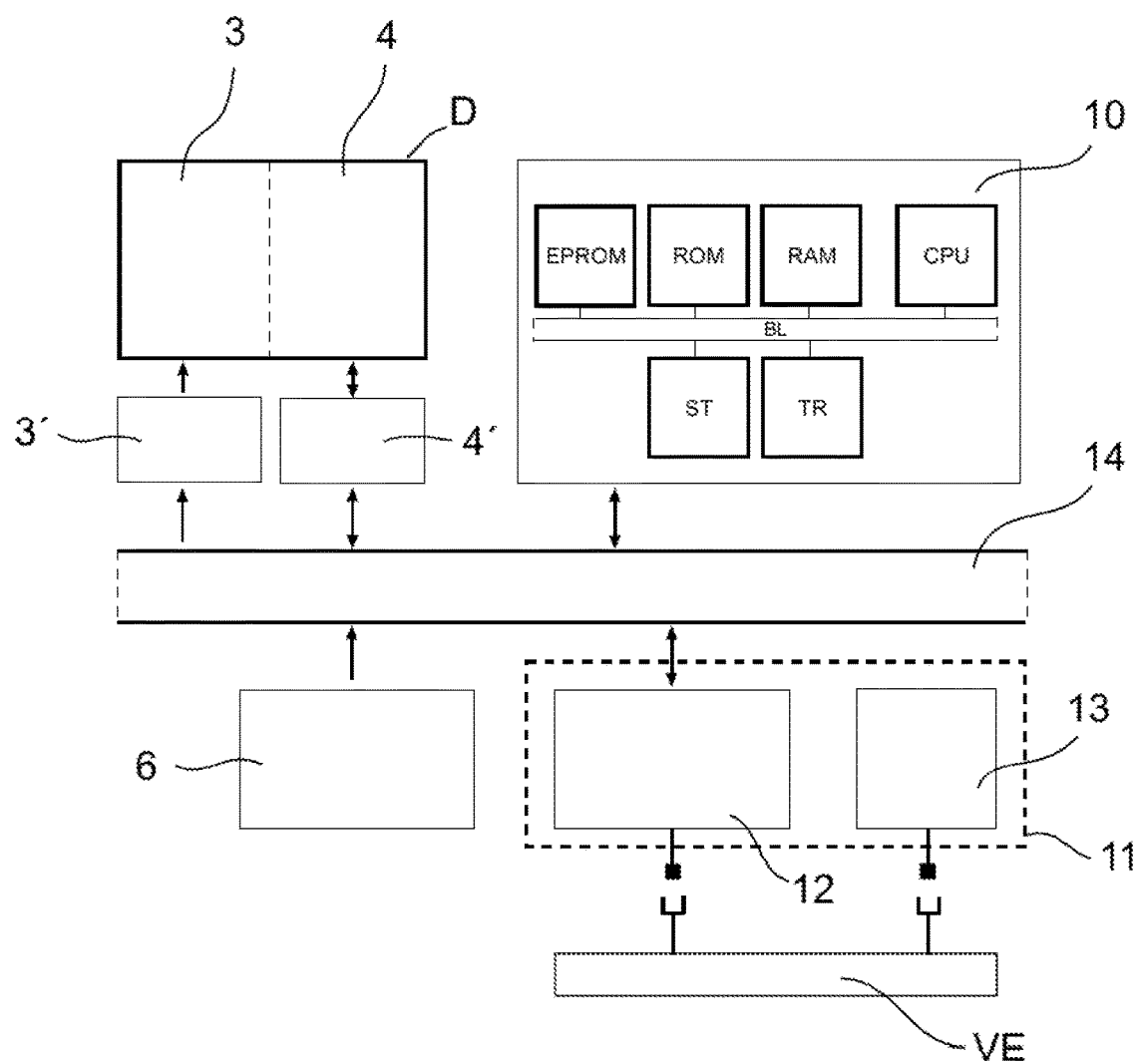
FIG. 10 shows an exemplary block circuit diagram of the display-part coupling embodiment of the digital book according to the invention in the form of a. configuration of units and components for operation of the digital book, however without restriction to this block circuit diagram.

FIG. 10 shows, as already indicated, a block circuit diagram of the display-part coupling embodiment of the digital book according to the invention, showing the configuration of units and components for operating the digital book. In addition to the elements described hereinbefore, the block circuit diagram comprises a display unit D having two screens 3, 4, two screen drivers or graphic cards 3', 4', a control unit 10 with means for. receiving, storing, processing and reproducing information, in which the information may be present in the: form of text, image, graphical, audio and/or video information, an interface unit 11 for inputting and outputting information and for supply energy, said interface unit 11 including an information interface 12 and a power supply means 12 for supplying power to the units D, 10, 11 from the supply unit VE, Control unit 10 contains an EPROM, a RON, a RAM, a CPU, a control means ST and a driver circuit TR, with these elements being interconnected via a bus line BL. The screen drivers or graphic cards 3', 4', the operating unit 6 with its operating elements, the control unit 10 and the information interface 12 are connected to each other via the afore-mentioned bus line 14.

Figure 11:
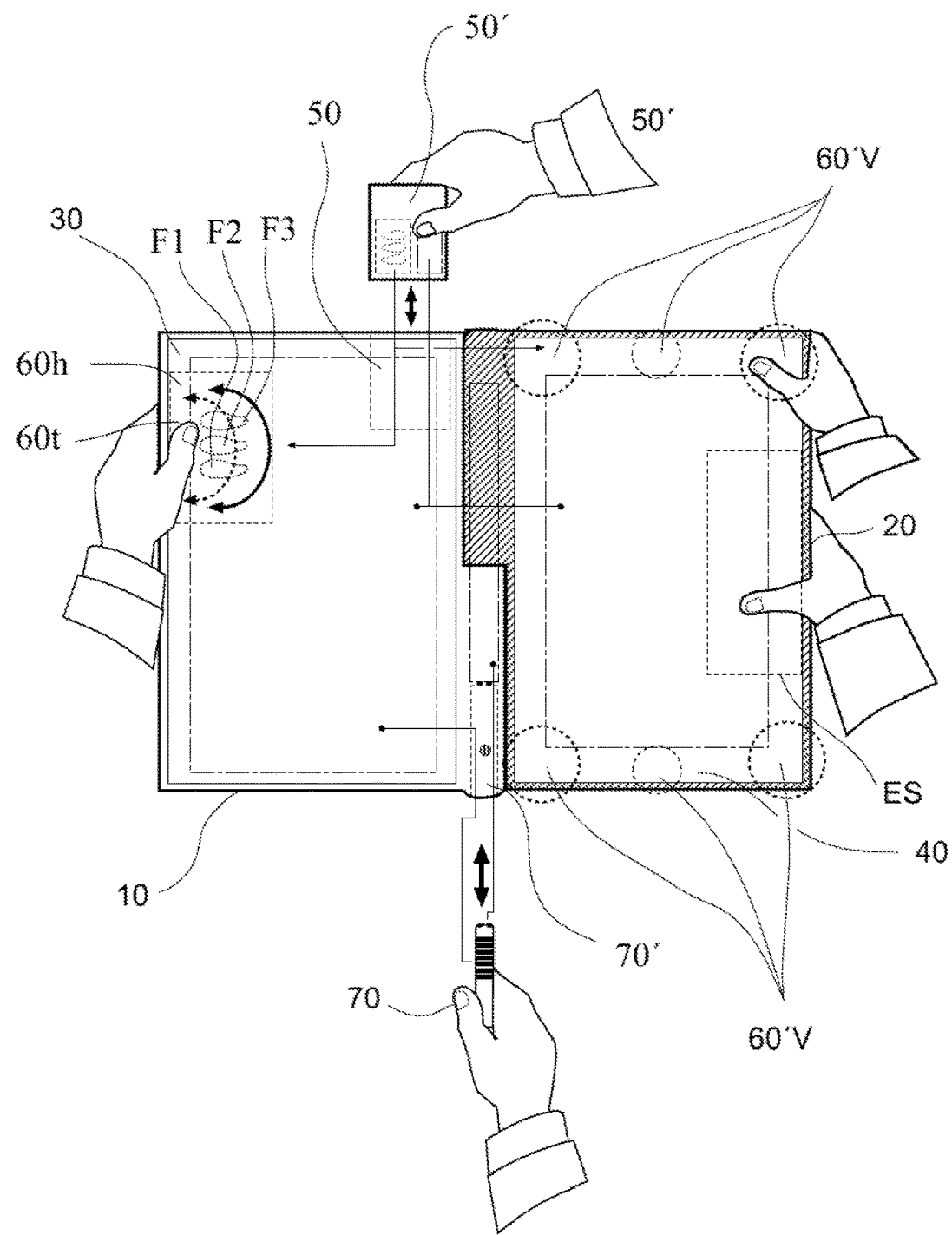
FIG. 11 shows a representation of the permanently connected and/or display-part coupling embodiment of the digital book according to the invention, however without restriction thereto, and of the optimized user interfaces underlying the invention for simple operation by a layman and for reducing technical information.
Figure 15A:
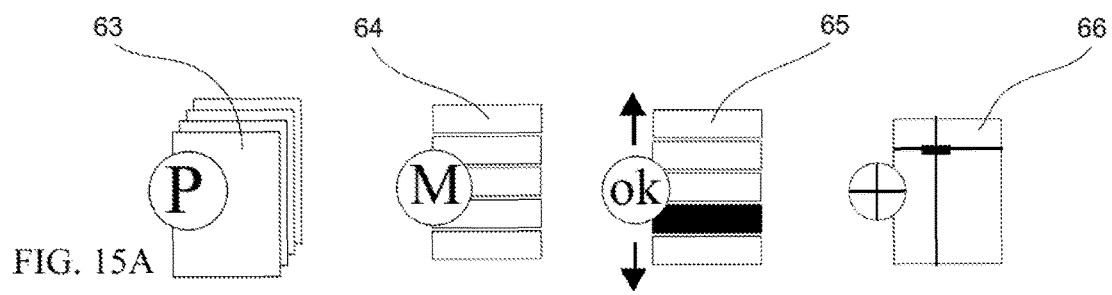
FIG. 15A, FIG. 15B, FIG. 15C, FIG. 15D, and FIG. 15E show the functional possibilities of a minimum configuration of operating elements of the digital book according to the invention, comprising a first function for carrying out a first task, using as example the provision of selection information on the display area and the automatic and software-controlled reprogramming of the operating elements following after first operation, for fulfilling a second task, e.g. selecting and/or activating a selected function, or deactivating of the provision.
Figure 15B:
Figure 15C:
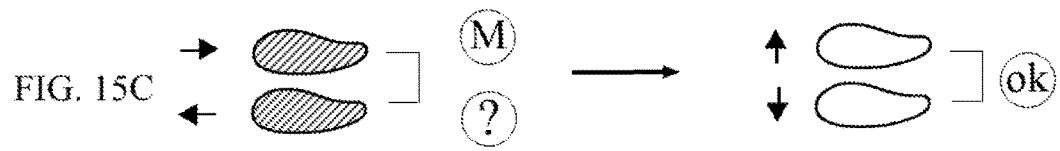
Figure 15D:
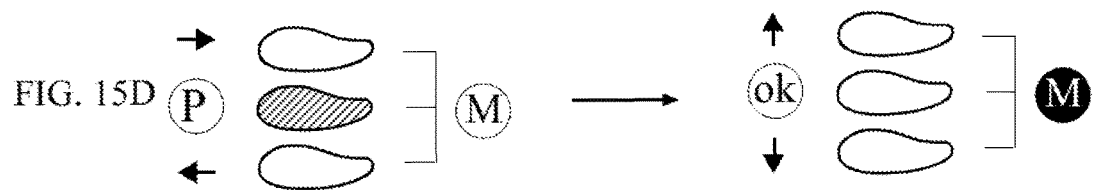
Figure 15E:
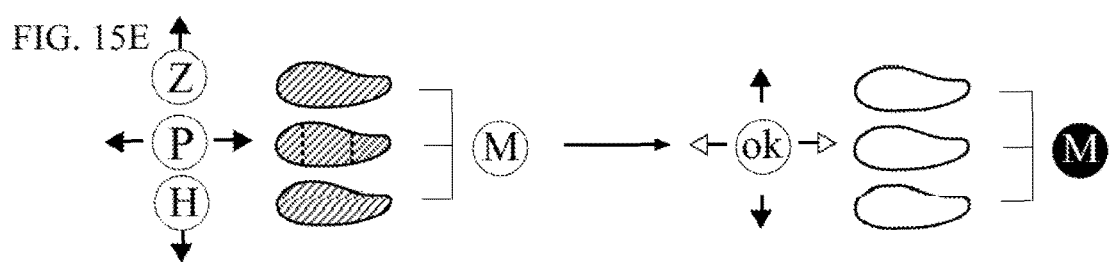
Figure 17A:
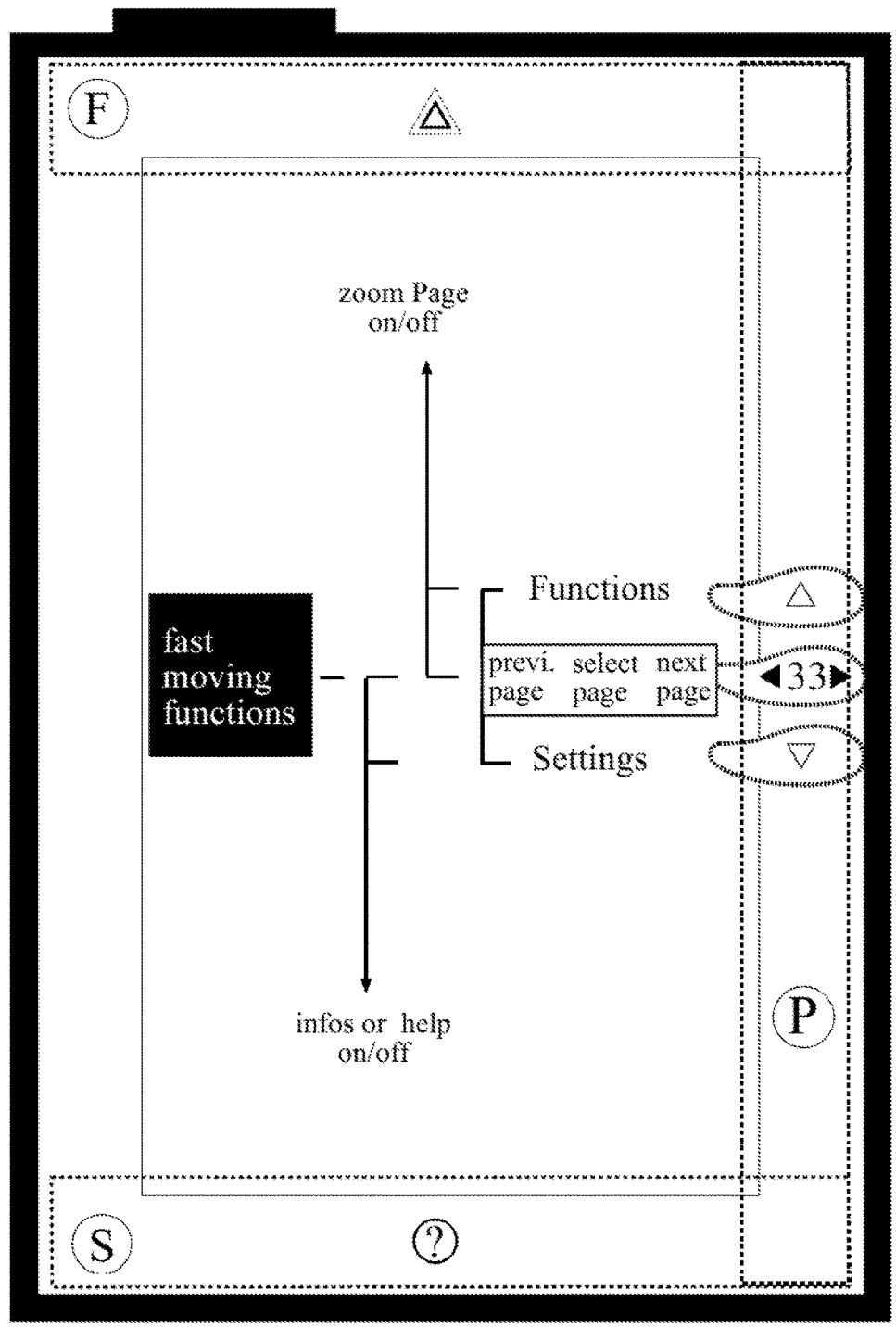
FIG. 17A, FIG. 17B, FIG. 17C, and FIG. 17D, by way of the example of one-part and two-part display sections of the digital book according to the invention, show the programming of the three operating elements for a digital book, which are preferably disposed on the rear side, in which operation is accomplished only via real operating elements.
Figure 17B:
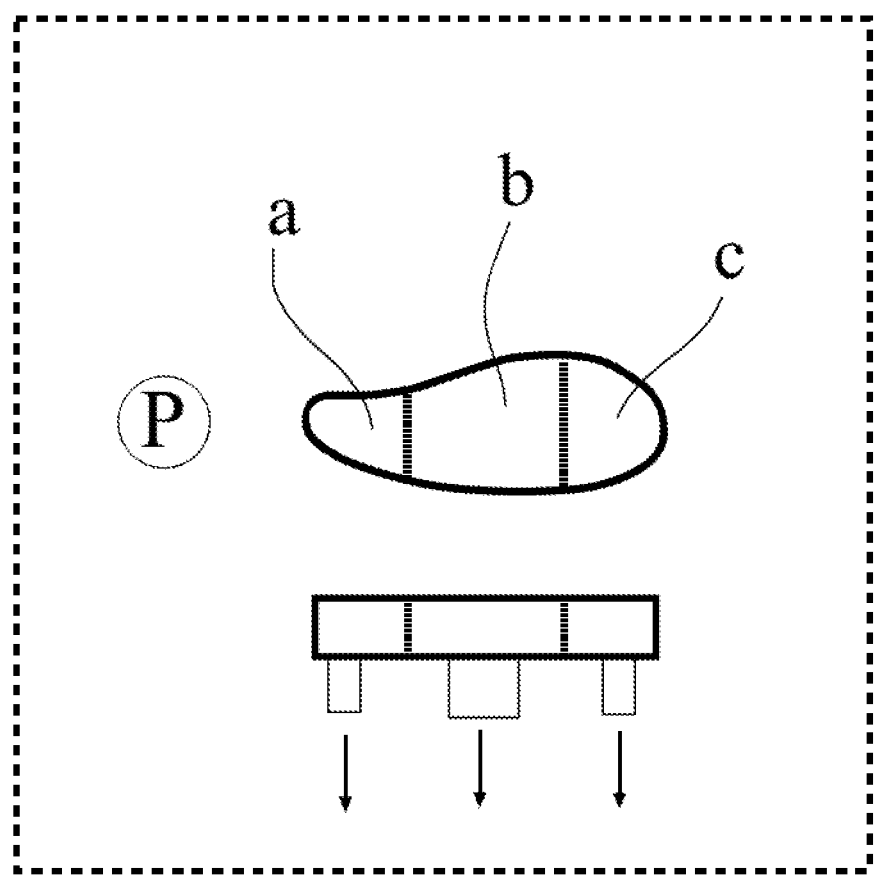
Figure 17C:
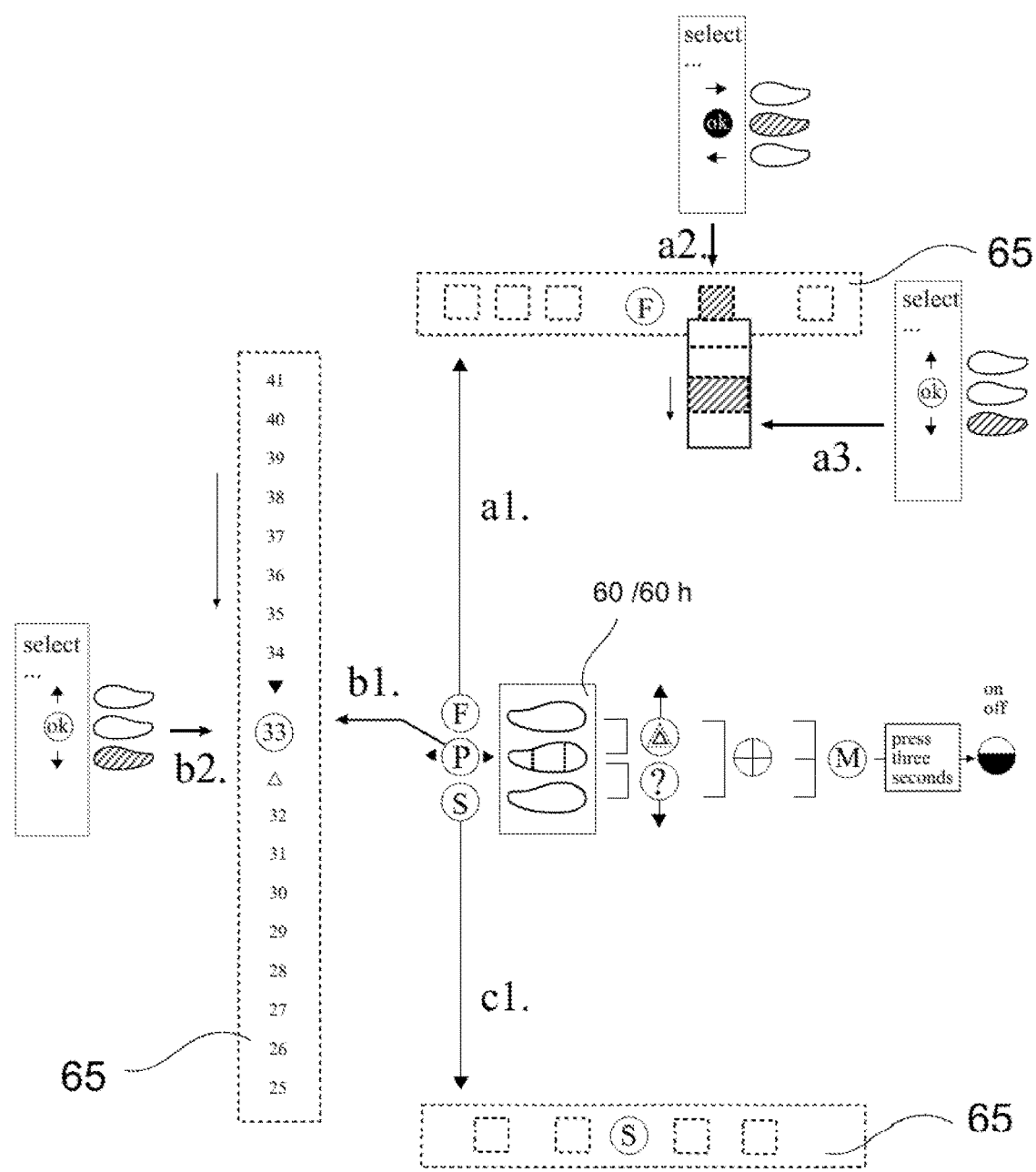
Figure 17D:
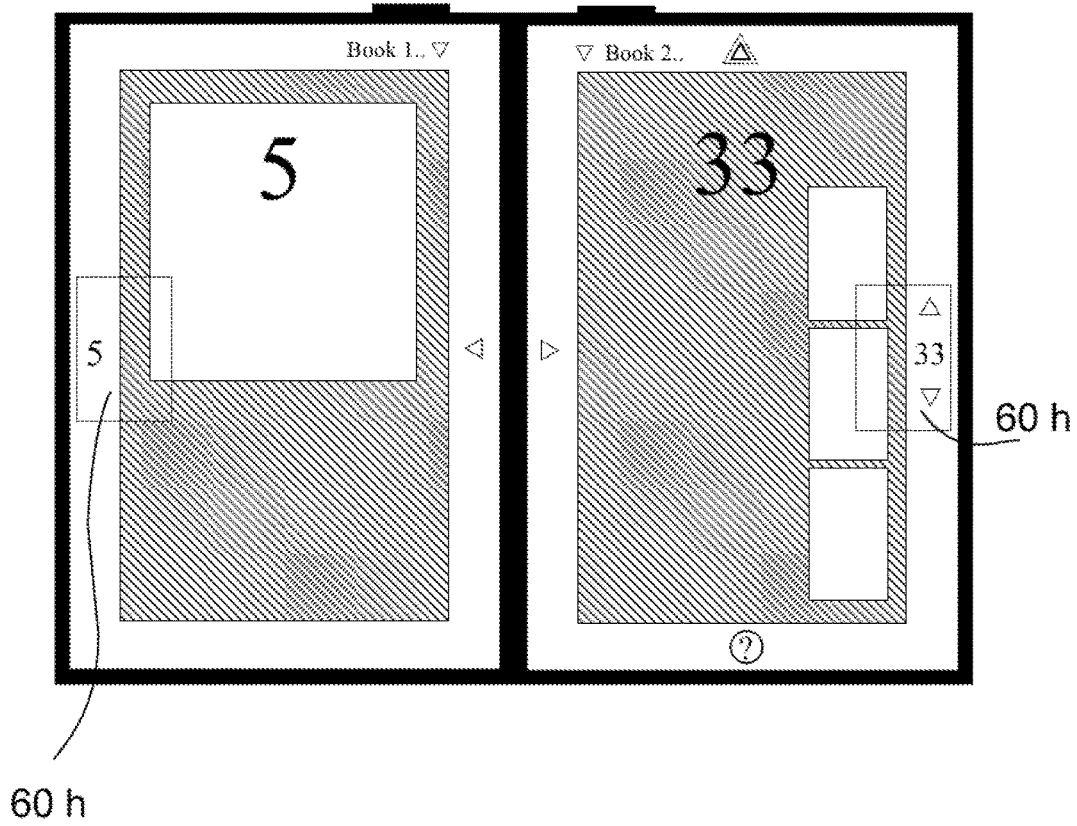
Figure 18A:
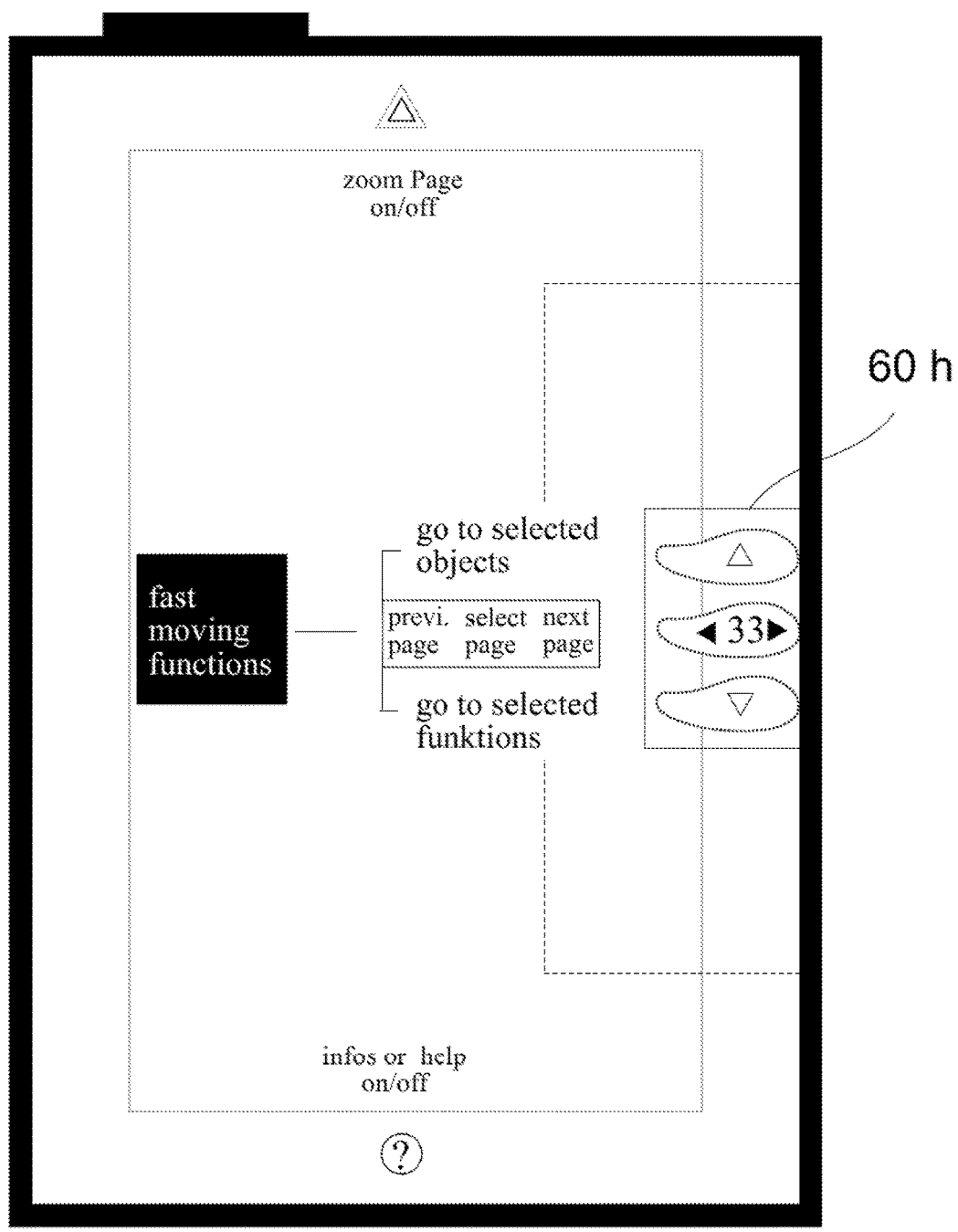
FIG. 18A, FIG. 18B, FIG. 18C, FIG. 18D, and FIG. 18E, by way of the example of one-part and two-part display sections with an additional input possibility via the display area (touchscreen), show the programming of the three operating elements for a digital book, which are preferably disposed on the rear side, in which the real operating elements in a first function realize the provision of operating information on the display area, for possible subsequent further processing or operation via a sensitive display area.
Figure 18B:
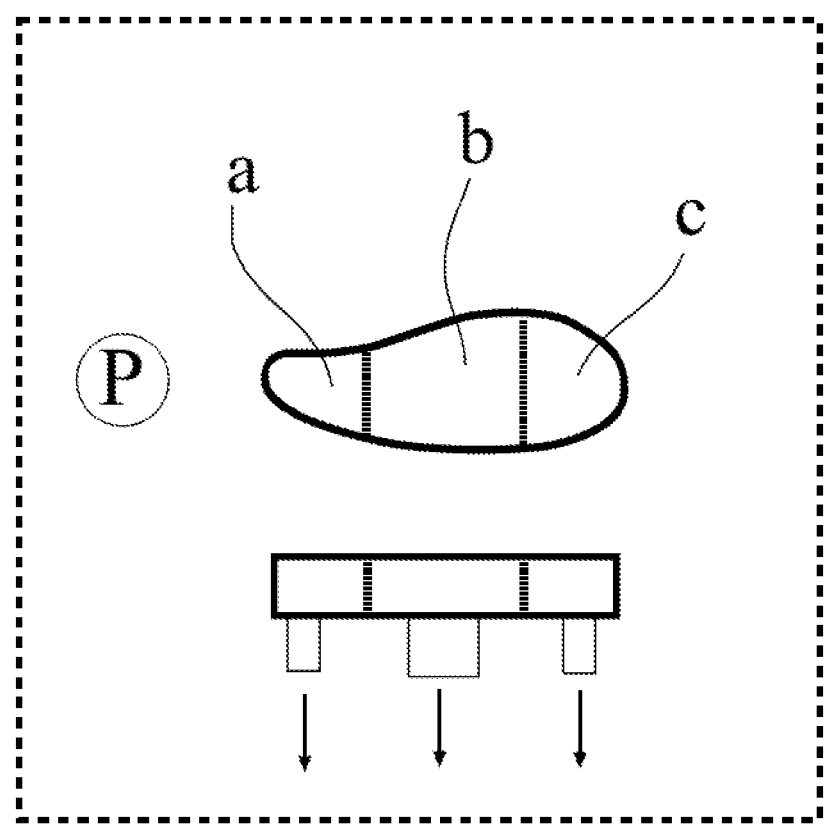
Figure 18C:
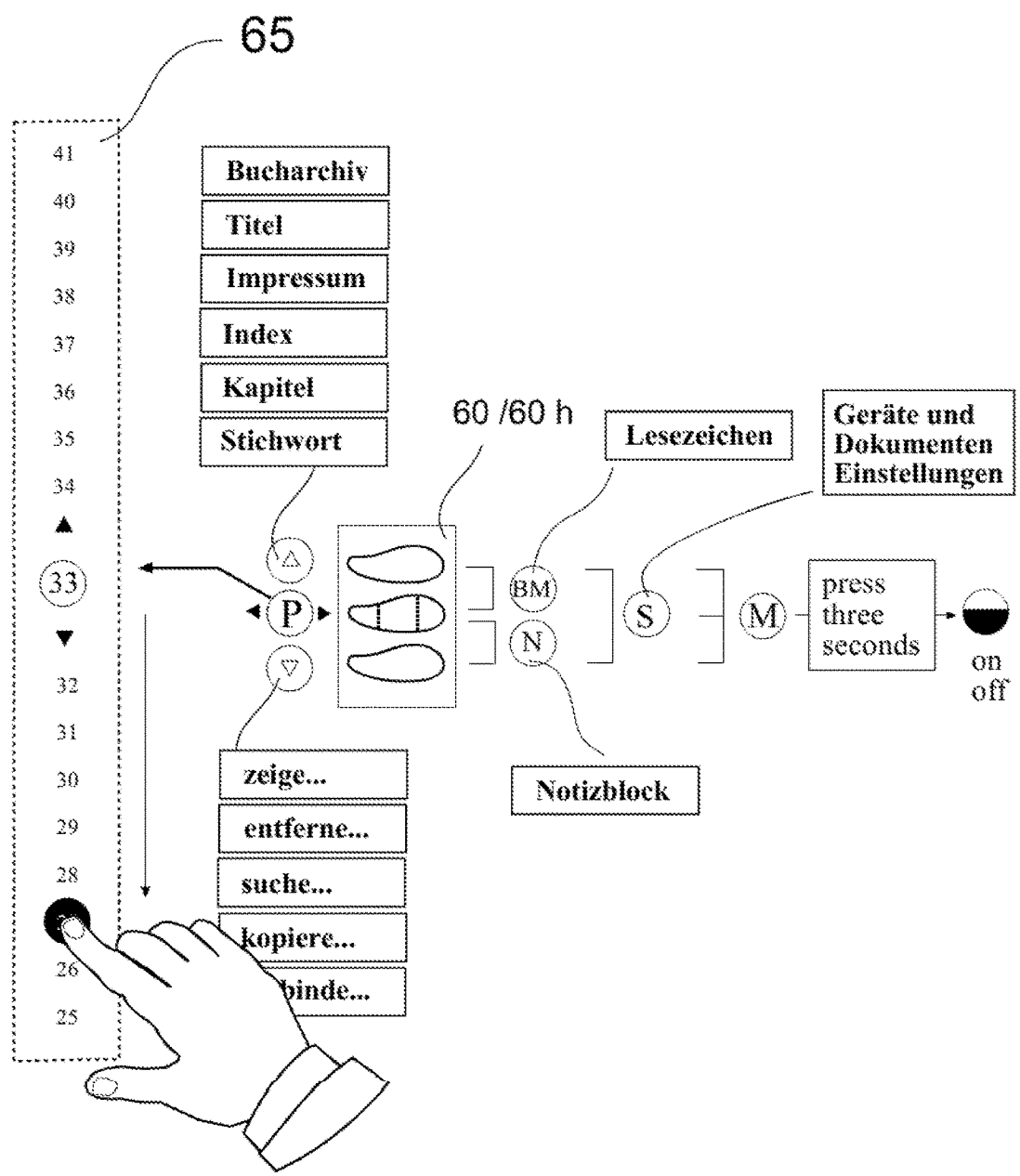
Figure 18D:
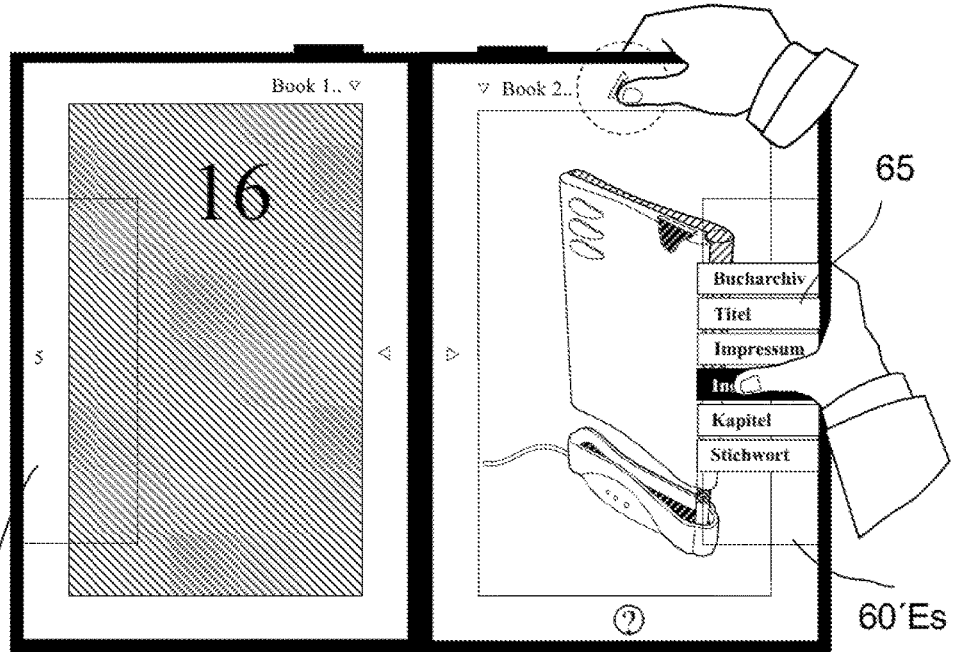
Figure 18E:
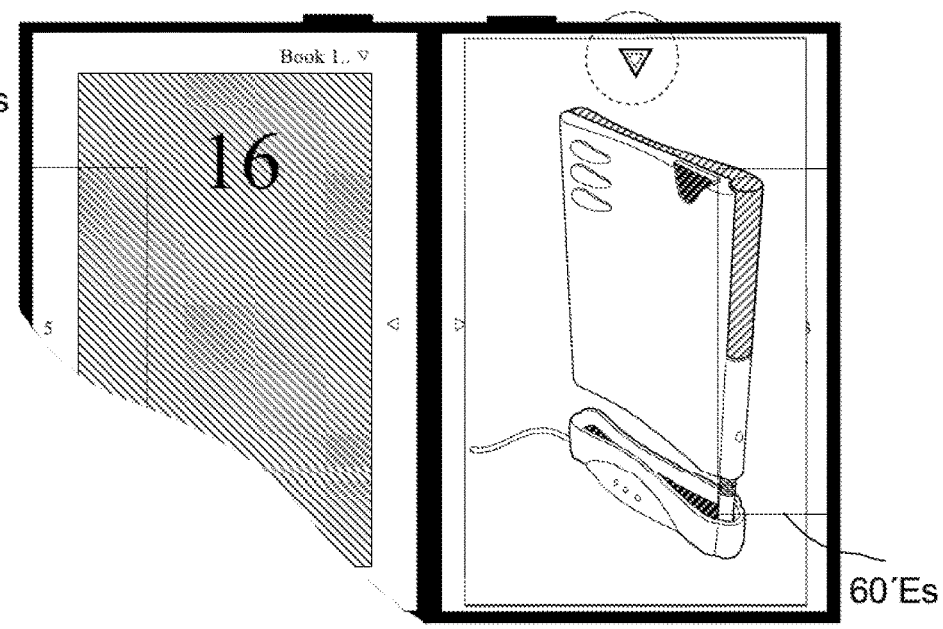

FIG. 11 shows a representation of the permanently connected and/or of the display-part coupling embodiment with two display parts of the digital book according to the invention, and the optimized user interfaces for simple operation by a layman and for reducing technical information, with five individual hands.

FIG. 11 shows a digital book according to the invention comprising an optimized user interface for simplified operation with a minimum of technical information, having at least one manipulation region 60*h* located on the right and/or left side of the digital book, in particular for manipulating the displayed information and/or for effecting a change in operating state and/or setting and/or for loading document information and/or for switching over to a different mode of operation, with the manipulation region 60h in this embodiment having functional keys F1, F2, F3 arranged on the rear side (i.e. the side directed away from the display area) as well as a pressure-sensitive input region 60t on the front side. Input region 60t optionally may also be realized by other technical means, e.g. capacitive proximity switches, miniature keys.

The manipulation region 60h is arranged such that manipulation operations should be possible at a location where the display unit 10 is held, by means of the fingers of the holding hand. FIG. 11 shows in exemplary manner an upper left position, and preferably there is provided a position in the middle of a lateral edge of a display side, since the middle position constitutes a more neutral starting position for operation, as will be pointed out in the subsequent description of the figures; there are provided preferably three combination keys.

At least in part fulfil tasks by way of their properties, which include for example the selection and activation of information displayed on the display area and/or moving pages and/or at least the option of displaying a first item of information on the display area and/or to release an already displayed first item of information, e.g. by deactivation of an activation blocking means (ES) to be actuated via an arbitrary input provided therefor, e.g. via touchscreen preferably also in the range of the lateral gripping edge of the display (20). It is left open whether there is only service of real operating elements and/or in combination with a sensitive display area and/or in combination with speech, since this is dependent first of all (as shown in FIG. 16A through FIG. 19C) on how the properties of the display medium are designed, e.g. as touchscreen or as a mere display screen. It is basically also possible to arrange other operating elements at other locations of the display unit without affecting the scope of protection. The operating elements are provided in different designs and arrangements. The operating area may also be equipped e.g. with a slide pad and/or trackball and/or a multifunction key etc. or the corresponding key areas can be designed as induction areas or switches.

A digital book with an additional optimized user interface according to the invention for simplified operation with minimum technical information, comprising at least one or plural display area(s) of sensitive design, via which, by touching an arbitrary, but predetermined location, first operating information of an invisible functional choice or operating information is made available, i.e. displayed, which can be handled further. This takes place preferably by identification of a functional choice or functional group to be displayed via fixed position information (60'V) offered, for example, by a first corner of the display area and/or a central location on a lateral side of the display area. Preferably, it is provided for the normal reading mode to keep blanked out or invisible a multiplicity of irritating and disturbing functions or operating information to be indicated on the display area for operation and to make available corresponding functional or operating information only in case of necessity, with all functions being made visible or available either all at once or one functional group separately from at least one further functional group for manipulation thereof. The advantage hereof is an irritation-free or undisturbed document page displayed, similar to a book (illustrative examples are shown in FIG. 19A through FIG. 21H). An additional advantageous development, which however is not restricted thereby, effecting the installation of functional or operating information by an initialized document, provides the possibility of separating the display area into regions, allowing the layman sensible operation with respect to specific functions of the publication indicated, e.g. if a coupled memory with document information (50') makes available all functions and operating information, respectively, required for service of this document, in the display unit in invisible manner at that location where the coupled memory is located. The layman thus has the possibility of requesting only that operating information that is directly associated with the initialized document.

A digital book comprising an additional optimized user interface according to the invention for simplified operation with minimum technical information, comprising at least a first solid-state coupling device (50) provided preferably in the upper part of the digital book and serving preferably for a memory card (50'), but being not restricted thereto, which by means of a coupling operation, preferably by insertion of the solid-state element, triggers one or several processes in the digital book, which facilitates handling of pages by a laymen insofar as e.g. the content of the coupled solid-state body, without further ado by the user, endeavors to carry out the task desired e.g. by introduction of the body (50') into the receiving opening designed for this purpose. For example, the contents of a memory card with book information is displayed after successful coupling, without additional activity by the user, or at least a first item of information is made available that only needs to be verified by the user (FIG. 24A through FIG. 24F). The initialization request necessary therefor preferably is provided by the digital book, after identification of the coupled solid-state body. To this end, the already known plug and play technology may be used to ensure recognition of the solid-state body (cf. in this respect also FIG. 22A through FIG. 22C or FIG. 23A through FIG. 23C).

An additional advantageous means for easy operation with minimum technical information according to the invention, by coupling one or more solid-state bodies with the digital book according to the invention, consists in that these solid-state elements contain software and/or hardware components, such as e.g. electronic means (integrated circuits, battery, memory, transmitter and/or receiver for information transfer without cables, etc.) which in some way or other, as outlined, preferably without further ado of the user, expand the range of capabilities with regard to the information to be indicated, which is input into the digital book via the solid-state means and/or takes over operating functions that cannot be carried out by the user, or in a restricted scope only, due to lack of an alphanumerical keyboard.

A further advantageous means for simple operation with a minimum of technical information, by coupling one or more solid-state bodies with the digital book according to the invention, is the automatic installation and/or setting of the digital book-effected by coupling of a solid-state memory with the digital book, for example by programming the functional keys of the digital book for optimum handling of the document stored in the solid-state memory (FIG. 22A through FIG. 22C) and the corresponding operating information and/or e.g. the automatic switching over from a separate-display operating mode to a combined-display operating mode, and vice versa, preferably automatically by coupling and/or decoupling a first and/or second solid-state memory with document information to be displayed (FIG. 23A through FIG. 23C).

A. digital book with an additional optimized user interface according to the invention for simplified, operation with a minimum of technical information makes use of a coupling by means of cable connectors via preferably only one interface on the bottom side of the digital book (70'), preferably in the pivot hinge of the book in case of two-part or multi-part display sections which in case of one-part display sections is the gripping handle, for receiving for example a jack plug (70'). This provides the advantage that the interface is sturdy, uncomplicated in operation and that the contact positions necessary for establishing contact can be accommodated along an arbitrary length of the jack plug, since introduction is not hindered by the constructionally necessitated depth of the digital book. The preferably only one interface is designed such that the electronic means of the digital book can be effectively connected to a large variety of different devices, means and apparatus by means of signals for transmitting data for example in bidirectional and serial fashion and/or energy. To this end, it is possible to couple different peripheral apparatus, such as e.g. printers and/or telephone and/or modem and/or PCs and/or laptops and/or charging devices, which are cited as examples only.

For doing so, the layman user just needs to plug in the corresponding cable connector and latch the same, if there are provisions to this effect. Another function of this interface consists in receiving the guide and supply pin of the book station, which has the task of supplying energy and/or data information to the digital book, which for example in accordance with the particular design can be provided on the book station or in the digital book. This supply plug at the same time serves as a stabilization pin (FIG. 5 at 7) of the digital book to be arranged thereon in upright position, namely as two-part book in the closed state and/or as one-part book in the opened state via the interface integrated in the handle (not shown).

A first optimized user interface for simple operation by a layman and for reducing irritating technical information, is at least one input unit located on a right and/or left side of the digital book for manipulating the information displayed and/or for effecting a change in operating state and/or setting and/or for loading document information and/or for switching to another mode of operation, however without being restricted thereto, with the main input element (s) or key element (s) being advantageously disposed in the gripping edge on the side (60h) of the digital book facing away from the display side, such that it should be possible to carry out operations at a location where the display unit (10) is held, by means of the fingers of the holding hand. In this respect, there is shown in exemplary manner an upper left position, and preferably there is provided a position laterally in the middle of a display side since the middle position constitutes a more neutral starting position for operation, as will be pointed out in the subsequent description of the figures.

Just as little restrictive is the use of three combinations keys, shown as preferred number in the embodiment illustrated, however, these can be replaced by other operating elements, provided that these at least in part fulfil tasks by way of their properties, which include for example the selection and activation of information displayed on the display area and/or moving pages and/or at least the option of displaying a first item of information on the display area and/or to release an already displayed first item of information, e.g. by deactivation of an activation blocking means (ES) to be operated via an arbitrary input provided therefor, e.g. via touchscreen preferably also in the region of the lateral gripping edge of the display (20). The embodiment shown leaves open whether there is only service of real operating elements and/or in combination with a sensitive display area and/or in combination with speech, since this is dependent first of all on how the properties of the display medium are designed, e.g. as touchscreen or as a mere display screen. It is basically also possible to arrange other operating elements at other locations of the display unit without affecting the scope of protection. The operating elements are provided in different designs and arrangements. For example, the operating area may also be equipped e.g. with a slide pad and/or a trackball and/or a multifunction key etc., or the corresponding key areas can be provided as induction areas or switches.

An additional optimized user interface for simple operation by a layman and for reducing irritating technical information, consists in one or plural display area(s) of sensitive design, via which, by touching an arbitrary, but predetermined location, first operating information of an invisible functional choice or operating information is made available, i.e. displayed, which can be handled further. This takes place preferably by identification of a functional choice or functional group to be displayed via fixed position information (60'V), which is offered, for example, by a first corner of the display area and/or a central location on a lateral side of the display area. Preferably, it is provided for the normal reading mode to keep blanked out or invisible a multiplicity of irritating and disturbing functions or operating information to be indicated on the display area for operation and to make available corresponding functional or operating information only in case of necessity, with all functions being made visible or available either all at once or one functional group separately from at least one further functional group for manipulation thereof. The advantage hereof is an irritation-free or undisturbed document page displayed, similar to a book (illustration examples are shown in FIG. 19A through FIG. 21H). An additional advantageous development, which however is not restricted thereby, effecting the installation of functional or operating information by an initialized document, provides the possibility of separating the display area into regions allowing the layman sensible operation with respect to specific functions of the publication indicated, e.g. if a coupled memory with document information (50') makes available ail functions and operating information, respectively, required for service of this document, in the display unit in invisible manner at that location where the coupled memory is located. The layman thus has the possibility of requesting only that operating information that is directly associated with the initialized document.

An additional optimized user interface for simple operation by a layman and for reducing irritating technical information, consists in at least a first solid-state coupling device (50) provided in the upper part of the digital book and serving preferably for a memory card (50'), but being not restricted thereto, which by means of a coupling operation, preferably by insertion of the solid-state element, triggers one or several processes in the digital book, which facilitates handling of pages by a laymen insofar as e.g. the content of the coupled solid-state body, without further ado by the user, endeavors to carry out the task desired e.g. by introduction of the element (50') into the receiving opening designed for this purpose.

For example, the contents of a memory card with book information is displayed after successful coupling, without additional activity by the user, or at least a first item of information is made available that only needs to be verified by the user (FIG. 24A through FIG. 24F). The initialization request necessary therefor preferably is provided by the digital book, after identification of the coupled solid-state body. To this end, the already known plug and play technology may be used to ensure recognition of the solid-state body (cf. in this respect also FIG. 22A through FIG. 22C or FIG. 23 A through FIG. 23C).

An additional advantageous means for easy operation by coupling one or more solid-state elements with the digital book according to the invention, however without restriction thereto, consists in that these solid-state elements contain software and/or hardware components, such as e.g. electronic means (integrated circuits, battery, memory, transmitter and/or receiver for information transfer without cables, etc.) which in some way or other, as outlined, preferably without further ado of the user, expand the range of capabilities with regard to the information to be indicated, which is input into the digital book via the solid-state means, and/or takes over operating functions that cannot be carried out by the user, or in a restricted scope only, due to lack of an alphanumerical keyboard. A further advantageous means for simple operation by coupling one or more solid-state bodies with the digital book according to the invention, however without restriction thereto, is the automatic installation and/or setting of the digital book—effected by coupling of a solid-state memory with the digital book, for example by programming the functional keys of the digital book for optimum handling of the document stored in the solid-state memory (FIG. 22A through FIG. 22C) and the corresponding operating information and/or e.g. the automatic switching over from a separate-display operating mode to a combined-display operating mode, and vice versa, preferably automatically by coupling and/or decoupling a first and/or second solid-state memory with document information to be displayed (FIG. 23A through FIG. 23C).

An additional optimized user interface for easy operation by a layman and for reducing irritating technical information makes use of a coupling by means of cable connectors via preferably only one interface on the bottom side of the digital book (70'), preferably in the pivot hinge of the book in case of two-part or multi-part display sections which in case of one-part display sections is the gripping handle, for receiving for example a jack plug (70'). This provides the advantage that the interface is sturdy, uncomplicated in operation and that the contact positions necessary for establishing contact can be accommodated along an arbitrary length of the jack plug, since introduction is not hindered by the constructionally necessitated depth of the digital book. The preferably only one interface is designed such that the electronic means of the digital book can be effectively connected to a large variety of different devices, means and apparatus by means of signals for transmitting data for example in bidirectional and serial fashion and/or energy. To this end, it is possible to couple different peripheral apparatus, such as e.g. printers and/or telephone and/or modem and/or PCs and/or laptops and/or charging devices, which are cited as examples only. For doing so, the layman user just needs to plug in the corresponding cable connector and latch the same, if there are provisions to this effect. Another function of this interface consists in receiving the guide and supply pin of the book station, which has the task of supplying energy and/or data information to the digital book, which for example in accordance with the particular design can be provided on the book station or in the digital book. This supply plug at the same time serves as a stabilization pin (FIG. 5 at 7) of the digital book to be arranged thereon in upright position, namely as two-part book in the closed state and/or as one-part book in the opened state via the interface integrated in the handle (not shown).

FIG. 12A through FIG. 12H show a representation of different forms of appearance of the digital book according to the invention, however without restriction thereto, as one-part or multi-part, permanently connected or display-part coupling embodiment.

FIG. 13A through FIG. 13F show the partial aspects underlying the digital book according to the invention for optimizing i.e. simplifying operation along with a simultaneous reduction of irritating information and/or technical designs by bundling the tasks and the corresponding input facilities concentrated in a portion.

There are shown two partial regions (first region shown in FIG. 13A, FIG. 13C, and FIG. 13E and second region shown in FIG. 13B, FIG. 13D, and FIG. 13F) representing the decisive aspects of the invention, which are related to each other, but also play a significant role separately from each other. On the basis of an embodiment, an opened digital book on the left side (first region shown in FIG. 13A, FIG. 13C, and FIG. 13E), which shows the manipulation of displayed information by means of a cursor, the first region illustrates all partial aspects which together and/or separately from each other play a decisive role in simplifying operation of the digital book. This includes the reduction of the operating expenditure and the operating information via the possibility of operating section or key programming 6OTPr of an initialized document Doc, which preferably is carried out automatically upon coupling of the information-carrying solid-state memory 50.

A further aspect FIG. 13C is the reduction of the operating expenditure and operating information by combination of input possibilities, such as e.g. real operating elements 60 which are combined with virtual operating elements 60' and 60'V and/or with speech input SpE, with the real operating elements preferably being adapted to be mutually combined, whereby the number of required operating elements can be reduced as well. In the illustrated embodiment, there are employed three keys 60, by means of which a multiplicity of functions can be carried out in the manner indicated hereinbefore. Further optimization of the operating function consists in distributing the operating elements to the fingers of the holding hand (FIG. 13C) 1, 2, 3, 4, 5 holding the display means, such that preferably the index finger 1, the middle finger 2 and the ring finger 3 operate the function keys, which renders possible considerably faster operation, while the small finger serves for locking the display part and the thumb is freely movable in order to effect, possibly in combination with speech and/or the real operating elements or alone, operation of the virtual operating elements, i.e. input elements 60' displayed on the display area. To this end, the real operating elements 60 are preferably disposed on the rear side of a display area.

Further optimization of the operating functions (FIG. 13E) is the compressed arrangement of the operating elements AB in a portion FBh, which during holding of the display can be operated by means of the fingers, with said portion being preferably the area in the region of the lateral gripping edge, where the display-holding hand is situated most frequently, i.e. under ergonomic aspects in the middle region of a display side, since this location is the most balanced one for holding the display unit and is the most neutral one for operation by a left-hander or right-hander.

On the basis of an additional illustrative embodiment, in which an opened digital book is shown on the right side (second region shown in FIG. 13B, FIG. 13D, and FIG. 13F) without indicating operating elements, the second region shows all partial aspects of what, either commonly and/or separately from each other, plays a decisive role in reducing the elements disturbing or irritating in reading a document.

This includes the reduction of the real operating elements 60 to a necessary minimum and/or hiding the operating elements 60h e.g. on the side of the display unit (FIG. 13D) directed away from the display side. FIG. 13D illustrates the hidden arrangement of virtual manipulation elements, i.e. function elements 60', i.e. elements to be operated via the display area, which are made visible in common or separately from each other only in case of necessity, such that no first functional information for identifying e.g. a menu, is available and just the position of a first input possibility 60'EF in relation to the display area provides orientation as to what functions are to be made available. Preferably, the corners 60'EF or central sides in the middle (not shown) of the display area serve for orientation. FIG. 13D shows furthermore an activation protection section 60ES which avoids inadvertent activation of a displayed or not displayed function 60' in the region of the gripping edge. To this end, an input e.g. via speech SpE or a real operating element 60', 60 or a different location on the display area, for example a corner 60MSF, is made for cancelling the input protection so that a function can be carried out. A further possibility of reducing disturbing elements (FIG. 13F) concerns already available operating and functional information, respectively, which for avoiding irritation of a displayed document, is located in an edge or a frame laterally of the document 60FR displayed, similar to the edge of a book or the passe-partout of a picture.

The operation concentrated to a specific region, preferably with rear-side or lateral combination keys which advantageously should not be more than three mutually separate operating elements, however without restriction thereto, provides better distribution of a multiplicity of tasks and the functions associated therewith in consideration of the calmest possible or most relaxed position during carrying or holding the display unit.

FIG. 14A through FIG. 14D, by way of the example of a folded open, two-part digital book according to the invention, however without restriction thereto, show the provision of operating information and the further handling thereof by means of operating elements facing away from the display area and/or by input via a sensitive input area, as well as the provision of a first item of functional information and the further processing thereof via the sensitive input area.

FIG. 15A through FIG. 15E show functional possibilities of a minimum configuration of operating elements of the digital book according to the invention, comprising a first function to perform a first task, using as example the provision of select information on the display area and the automatic and software-controlled reprogramming of the operating elements following said first operation, for fulfilling a second task, e.g. the selection and/or activation of a selected function or deactivation of said provision.

FIG. 16A through FIG. 16E show the general combination possibility of an input area of the digital book according to the invention, using as example three real operating elements and their programming with regard to a first function and additional first functions rendered possible by combined operation, as well as the automatic, software controlled reprogramming of the operating elements by a first operating step, in order to fulfil another task in a second operating step.

FIG. 17A through FIG. 17D, by way of the example of one-part and two-part display sections of the digital book according to the invention, show the programming of the three operating elements preferably arranged on the rear side, for a digital book in which operation is effected via real operating elements only.

FIG. 18A through FIG. 18E, by way of the example of one-part and two-part display sections/with an additional possibility of input via the, display area (touchscreen), show the programming of the three operating elements: preferably arranged on the rear side, for a digital book in which the real operating elements in a first function realize the provision of operating information on the display area, for possible subsequent further processing or operating via a sensitive display area.

Figure 19A:
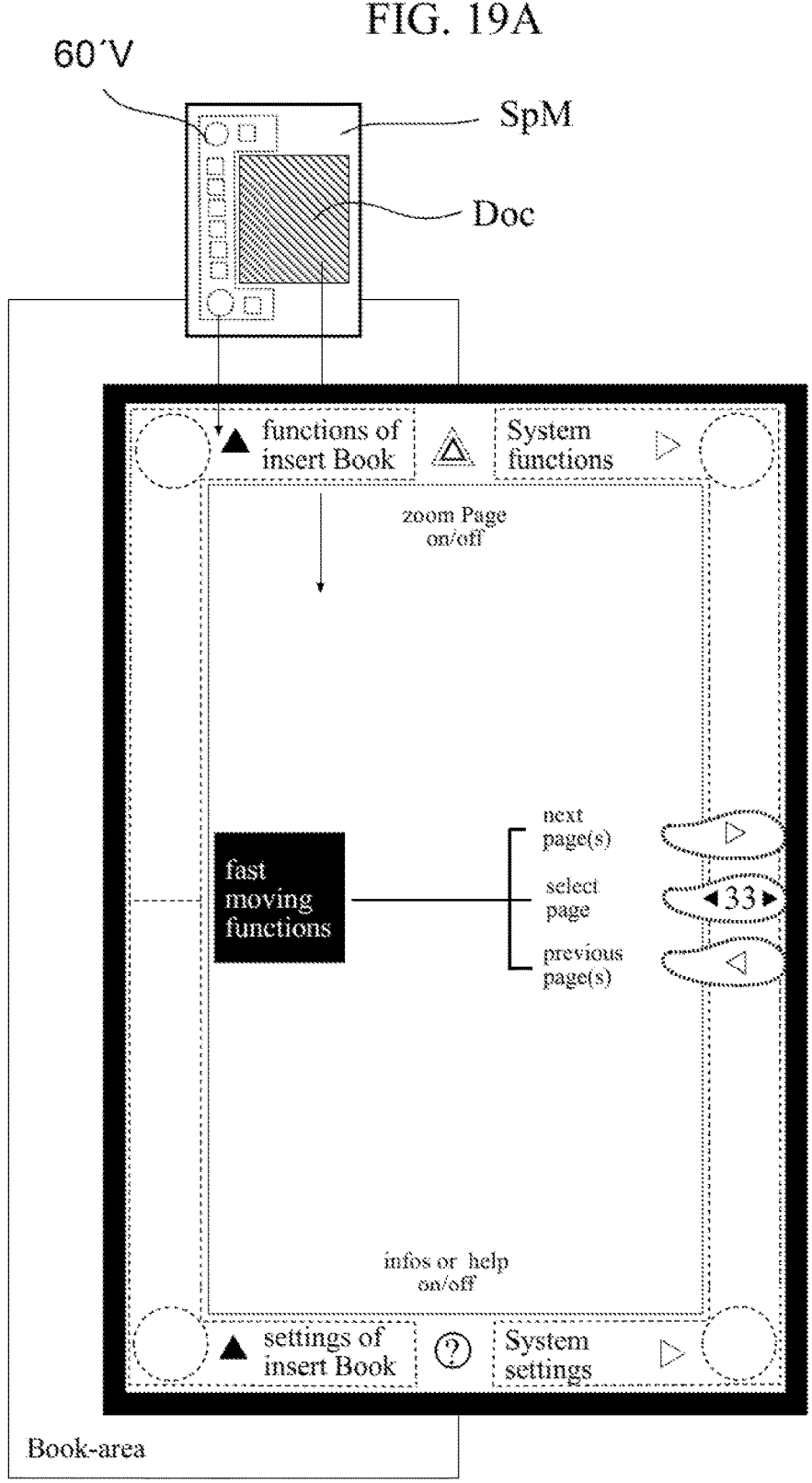
FIG. 19A, FIG. 19B, and FIG. 19C, by way of the example of one-part and two-part display sections, show the programming of the three operating elements for a digital book, which are arranged preferably on the rear side, as rapid-function operating elements for frequent routine operations, using as example a first function of simple-operation operating elements, for example for moving the pages within a book document and processing of not so often needed functions via the display area, with these functions being made available by touching a location on the display area and being programmed for example by initialization of a coupled book document.
Figure 19B:
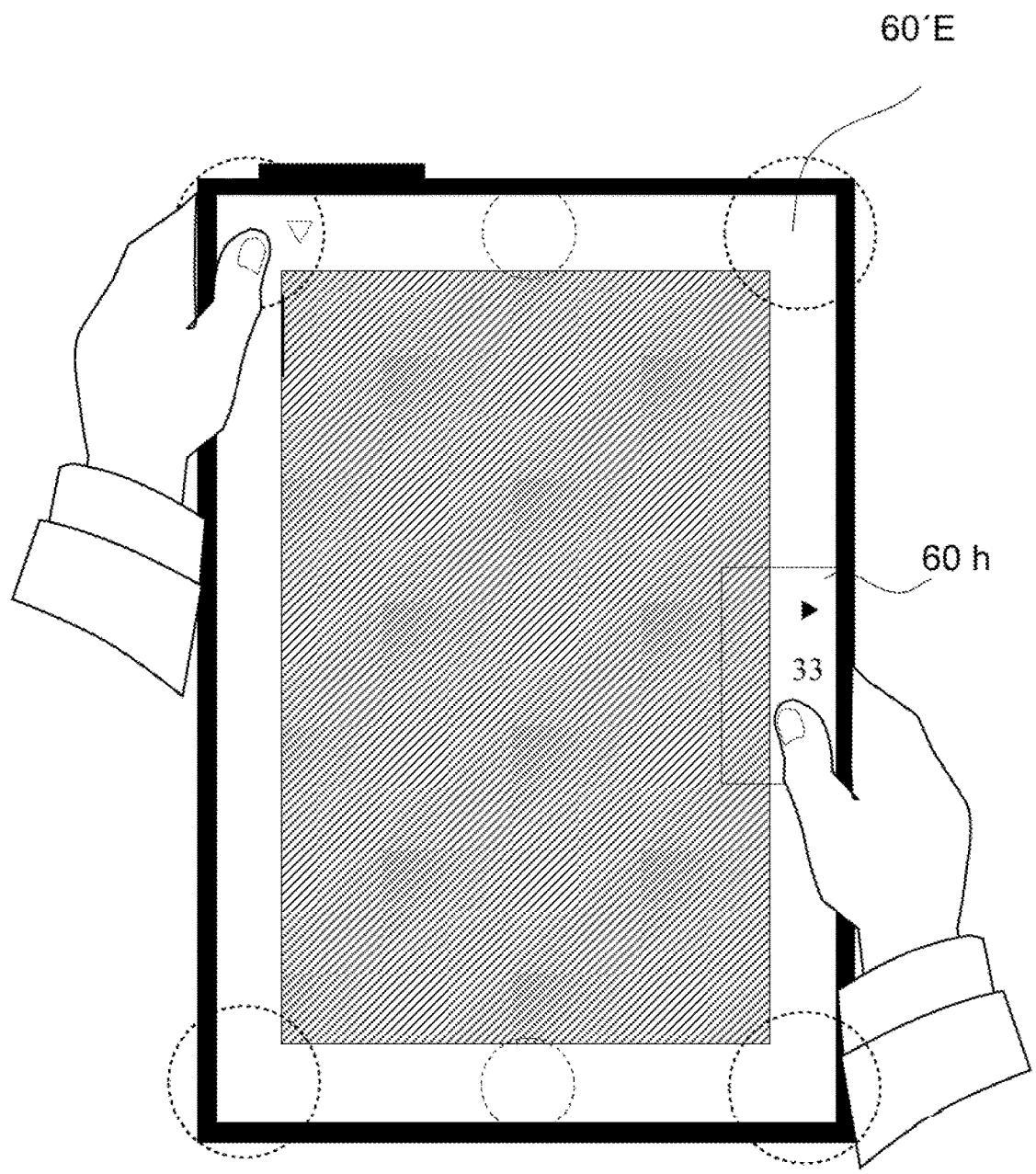
Figure 19C:
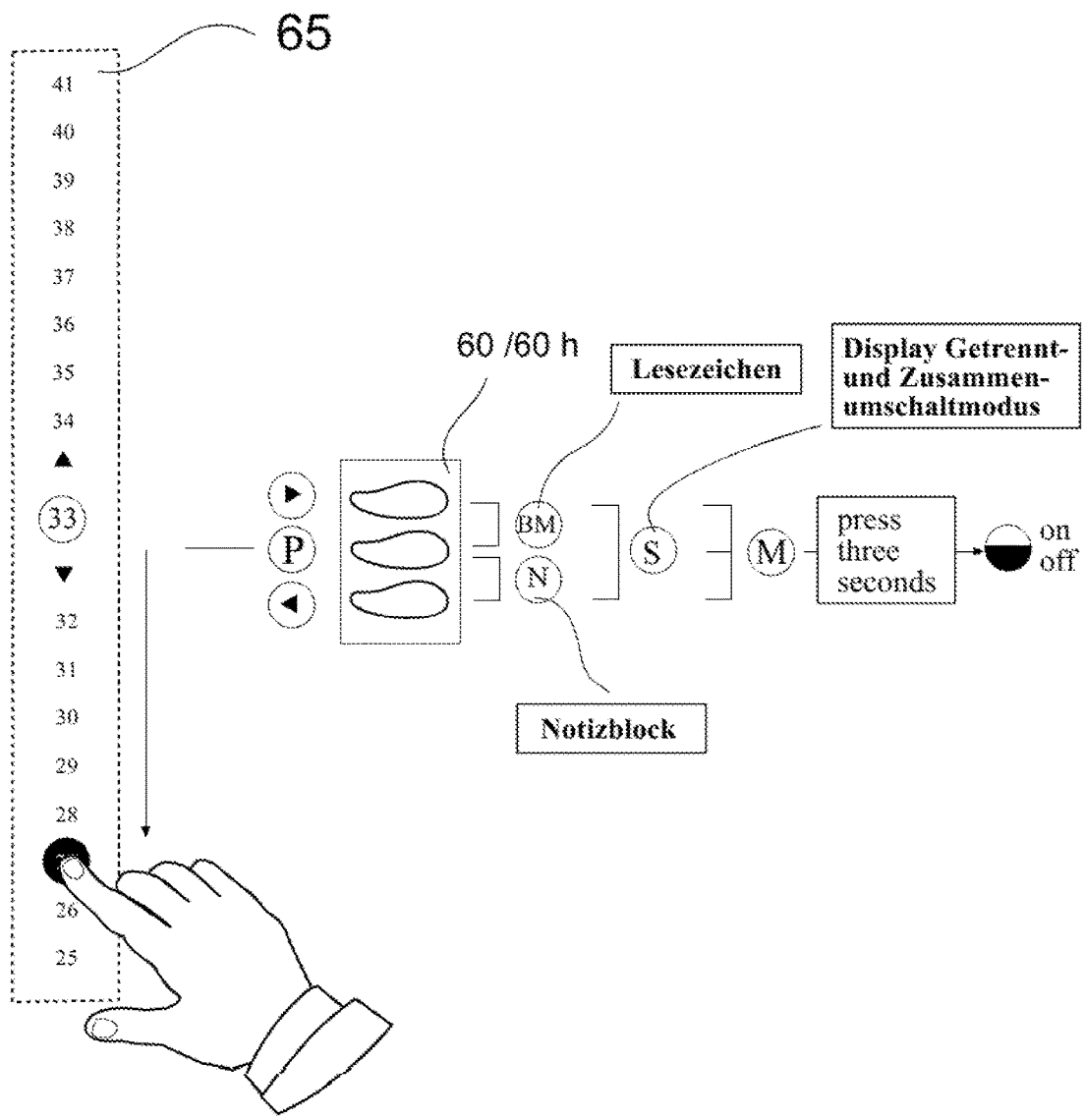
Figure 20A:
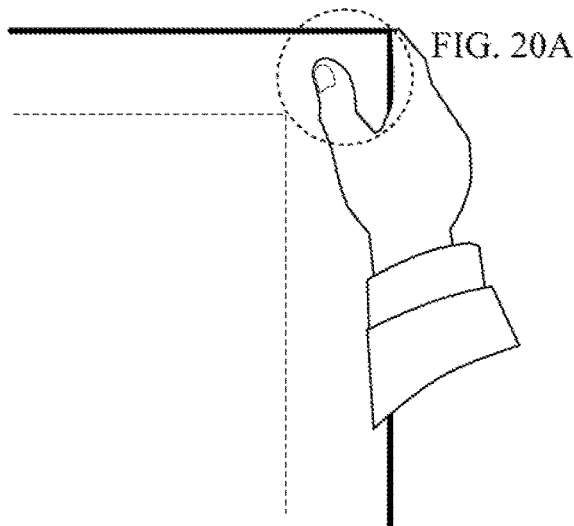
FIG. 20A, FIG. 20B, FIG. 20C, FIG. 20D, and FIG. 20E, by way of the example of a corner function and a function in the middle of a lateral edge displayed in the display area, show an embodiment of FIG. 19A through FIG. 19C, with lateral edge operations in the region of the gripping edge of the display unit being realized in a document edge and/or frame, in order not to irritate or disturb a displayed document.
Figure 20B:
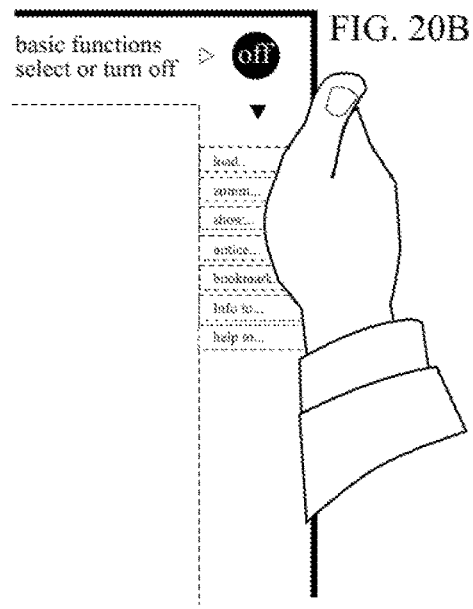
Figure 20C:
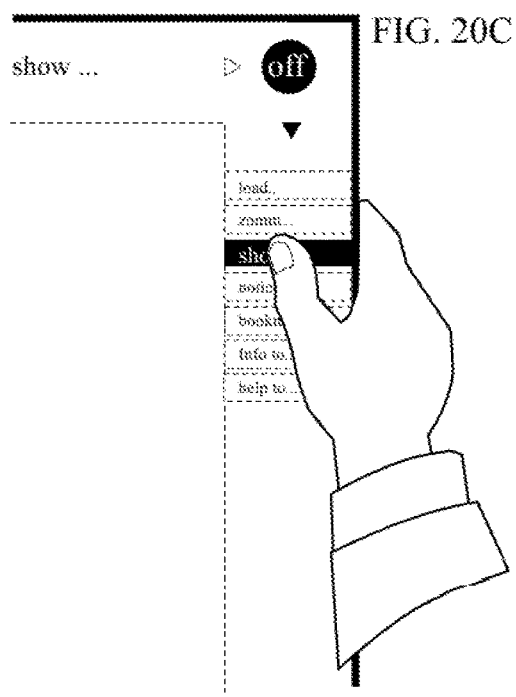
Figure 20D:
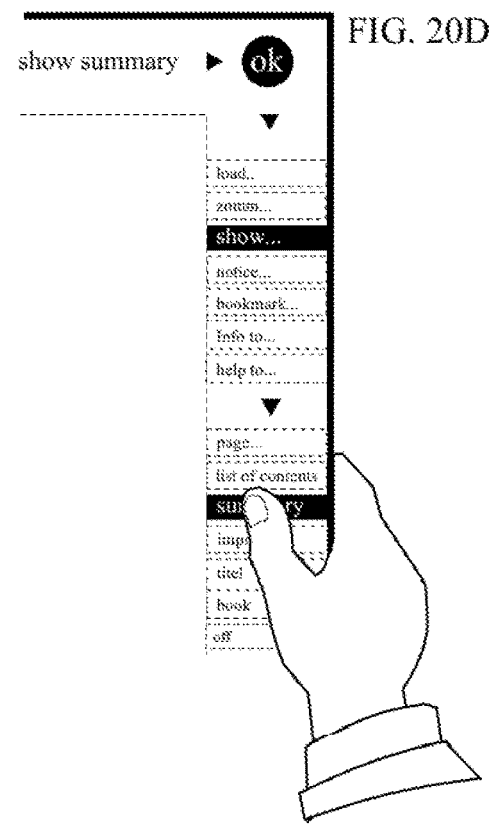
Figure 20E:
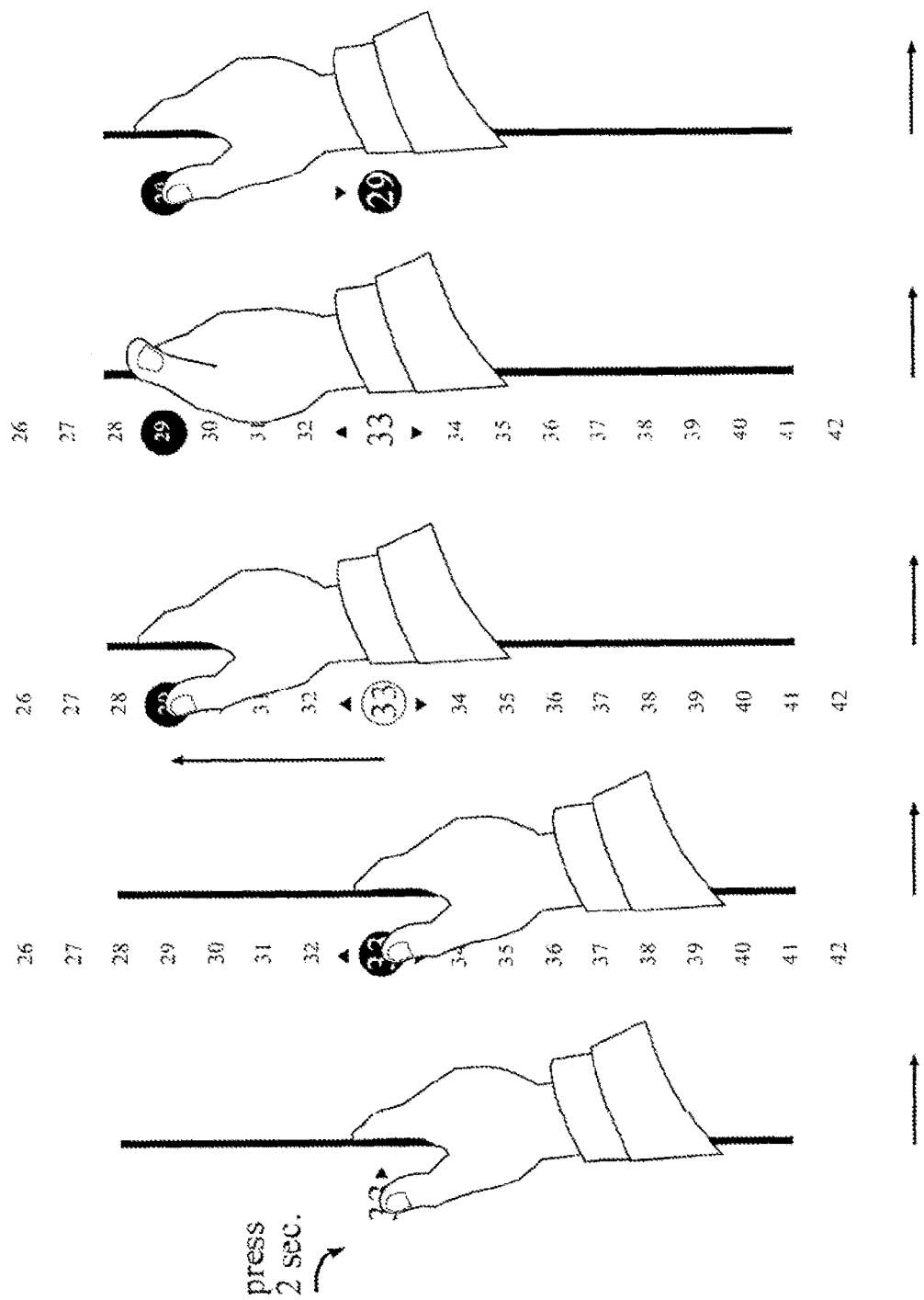
Figure 21A:
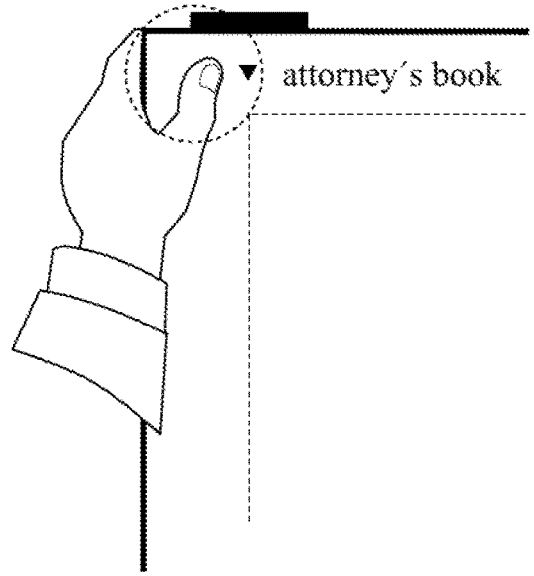
Figure 21B:
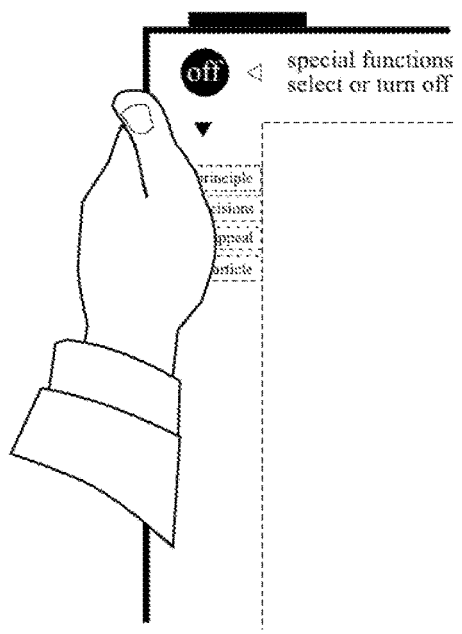
Figure 21C:
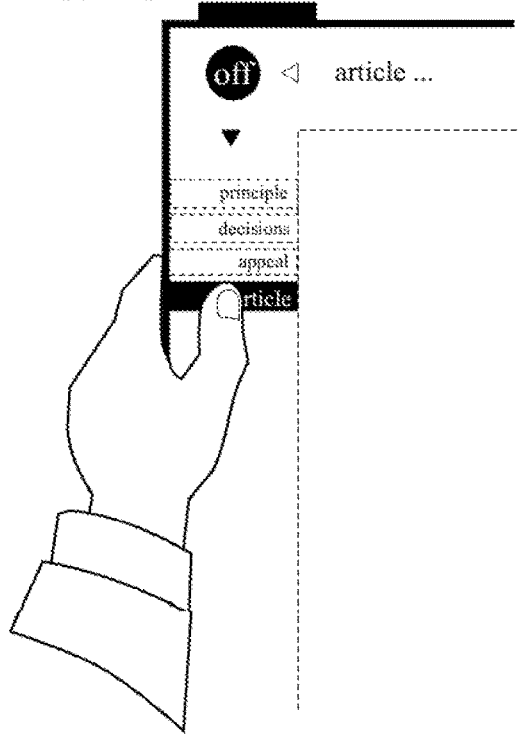
Figure 21D:
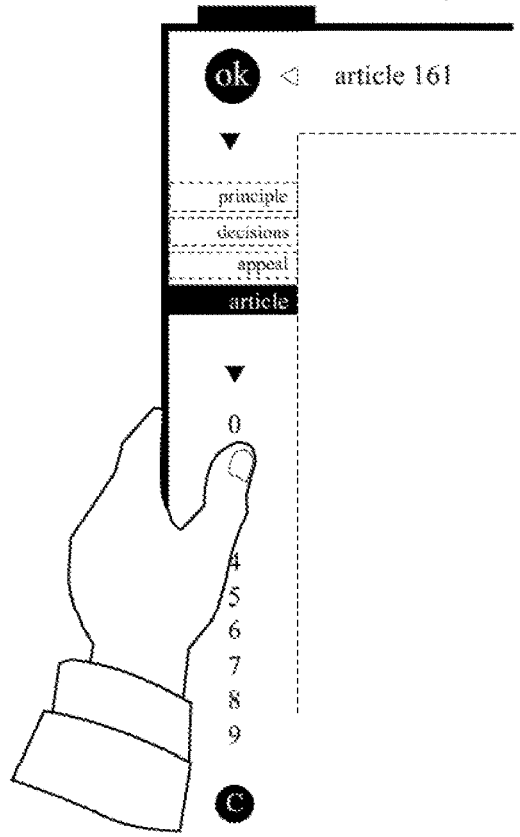

FIG. 19A through FIG. 19C, by way of the example of one-part and two-part display sections, show the programming of the three operating elements for a digital book, which are preferably arranged on the rear side, as rapid-function operating elements for frequent routine operations, using as example a first function of operating elements of simple operation, for example for moving the pages within a book document, and processing of not so frequently required functions via the display area, which are made available by touching a location on the display area and which are programmed for example by initialization of a coupled book document.

FIG. 20A through FIG. 20E, by way of the example of a corner function and a function in the middle of a lateral edge, show an embodiment of FIG. 19A through FIG. 19C, in which the lateral edge operations in the operations in the region of the gripping edge of the display unit are realized in addition in document edge and/or frame in order not to irritate or disturb a document on display.

FIG. 21A through FIG. 21H, by way of the example of two corner functions indicated in the display area, show an embodiment of FIG. 19A through FIG. 19C, in which the lateral edge operations in the region of the gripping edge of the display unit are realized in addition in a document edge and/or frame in order not to irritate or disturb a displayed document.

Figure 22B:
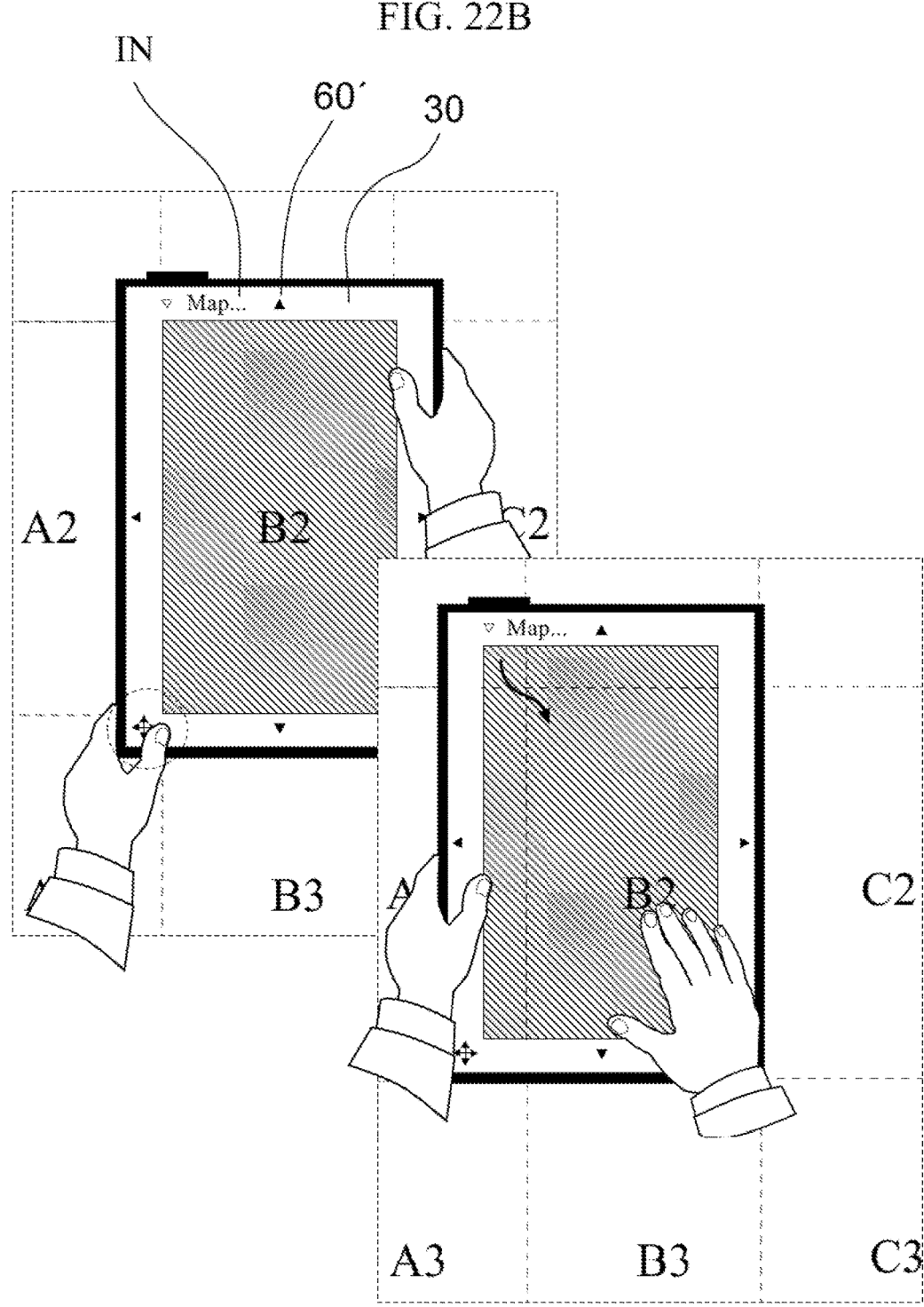
Figure 22C:
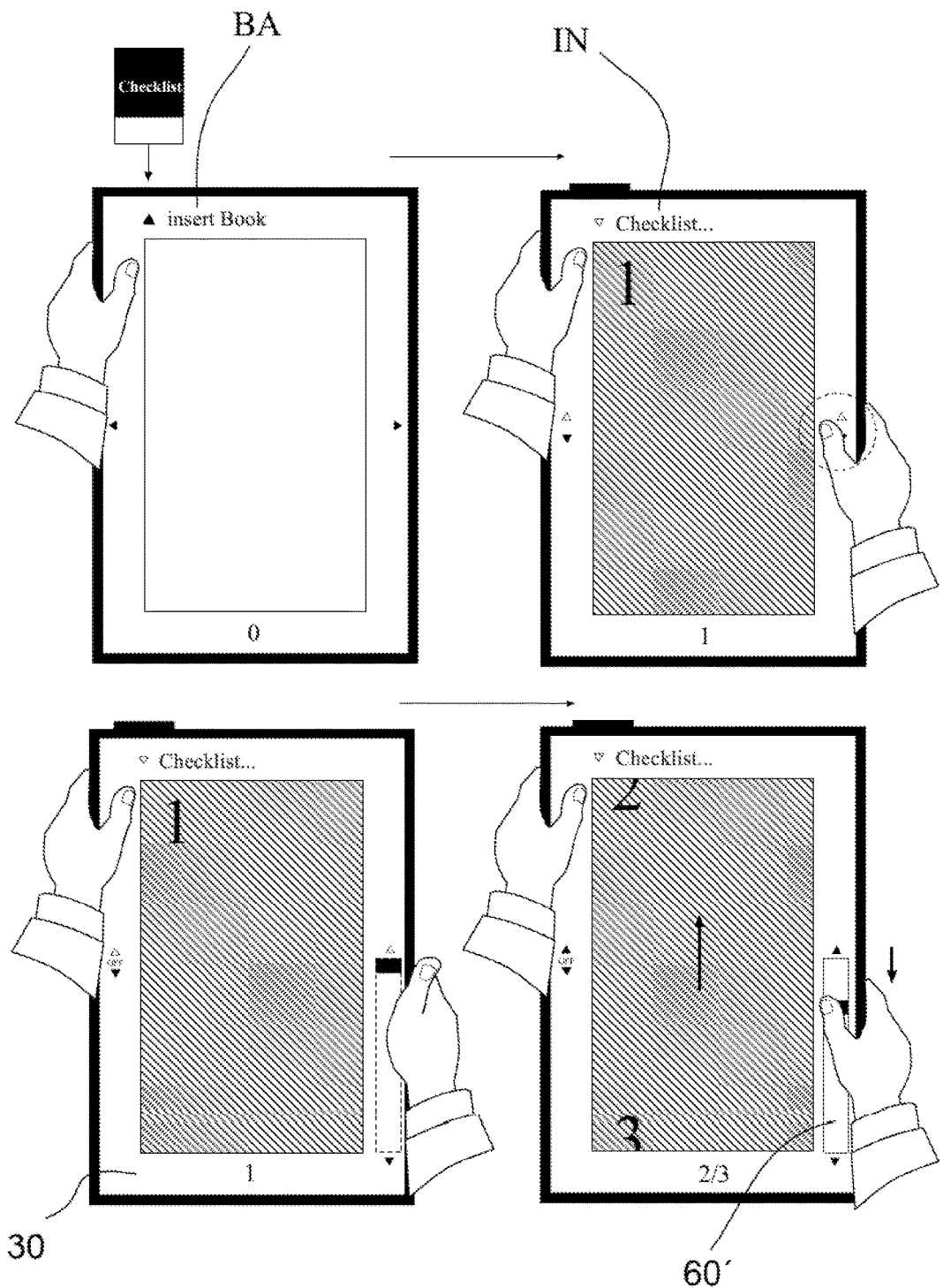

FIG. 22A through FIG. 22C, by way of the example of a one-part embodiment of the present invention, show the automatic and software-controlled programming of operating elements and the resulting change in the displayed operating information by a coupled memory medium or an initialized document.

FIG. 23A through FIG. 23C, by way of the example of a two-part embodiment of the present invention, show the automatic switching over of a combined-display operating mode, during coupling of a second book document with the digital book, to a separate-display operating mode with corresponding display of the document on the display area as well as automatic switching over from a separate-display operating mode to a combined-display operating mode associated with a reverse process.

FIG. 24A through FIG. 24F, by way of the example of a two-part embodiment of the digital book according to the invention, show the activation and/or deactivation process of the digital book associated with coupling of a solid-state memory, as well as the attempt of installing and/or displaying the contents of the solid-state memory, which is effected automatically by coupling said solid-state element.

Figure 25:
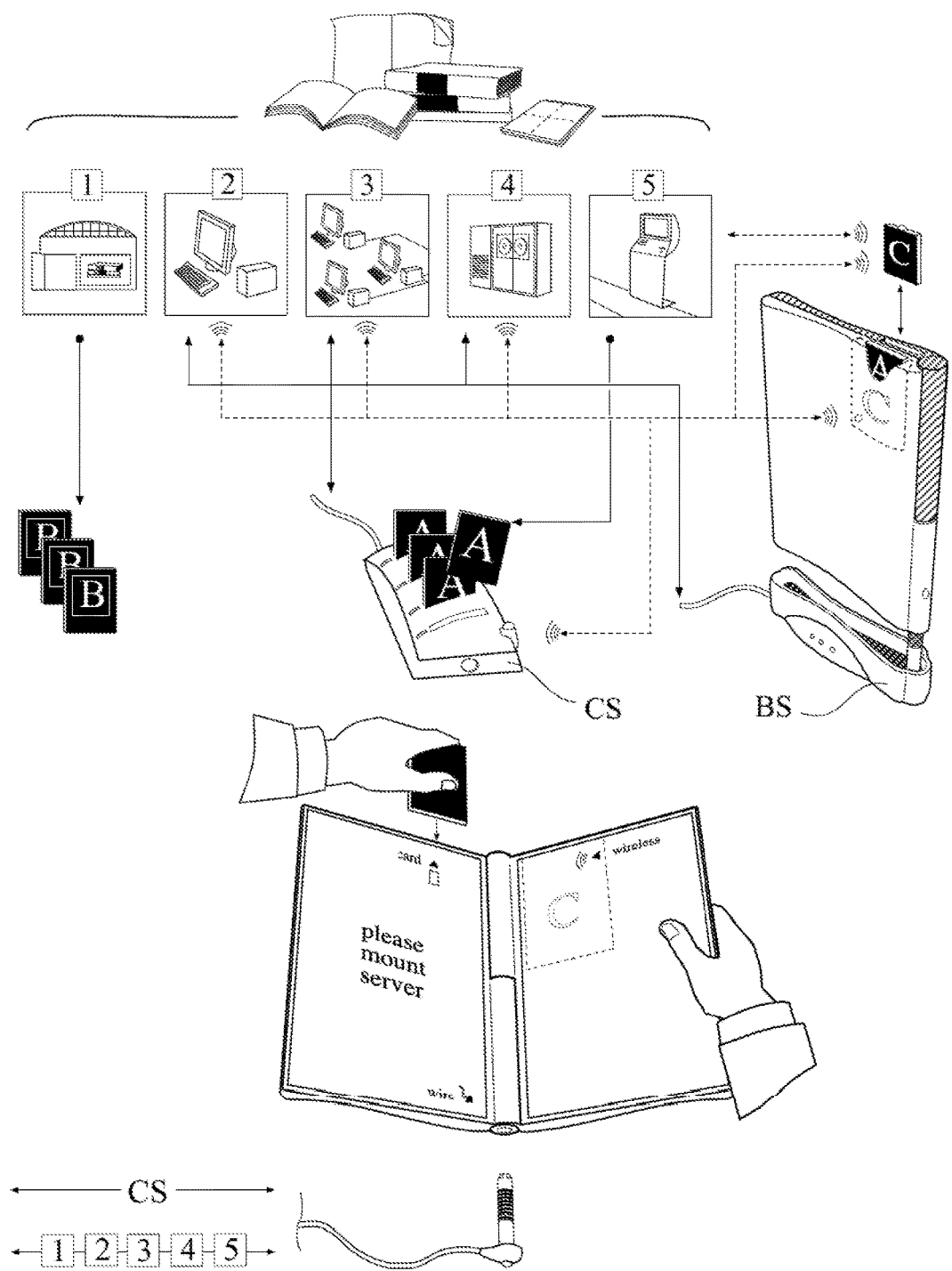
FIG. 25, by way of the example: of a two-part embodiment of the digital book according to the invention, shows the coupling possibility of different external apparatus or means via a multifunction interface arranged at the bottom side of the digital book and designed as interface for cable connectors and/or of the supply station.
Figure 27A:
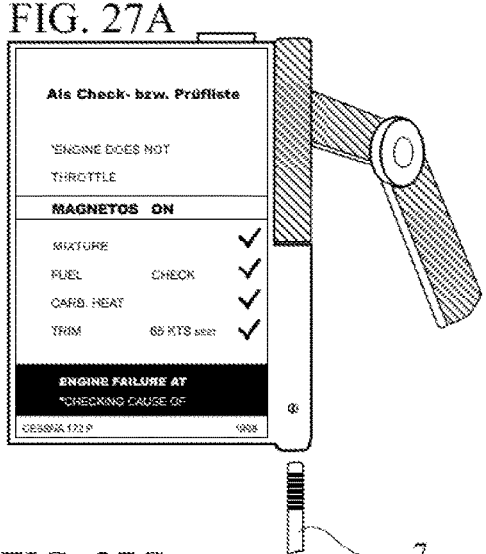
FIG. 27A, FIG. 27B, FIG. 27C, FIG. 27D, and FIG. 27E, by way of the example of a one-part starting basis, show the coupling of an exemplary gripping handle, as described in FIG. 26A through FIG. 26E, or of a book cover of an arbitrary material shown to be flexible in the example, or the coupling of a laptop keyboard.
Figure 27B:
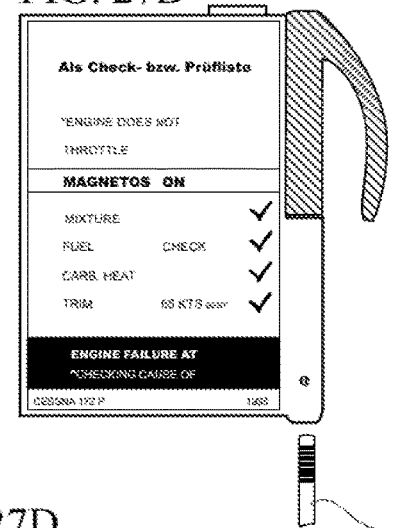
Figure 27C:
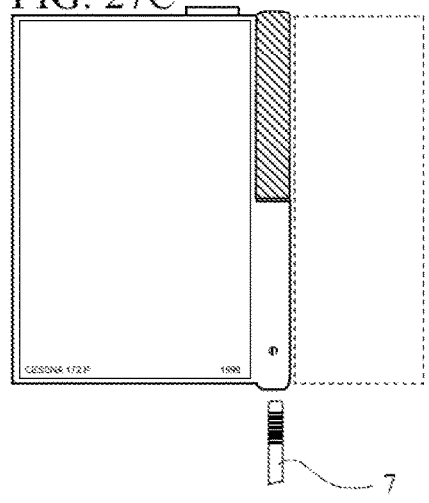
Figure 27D:
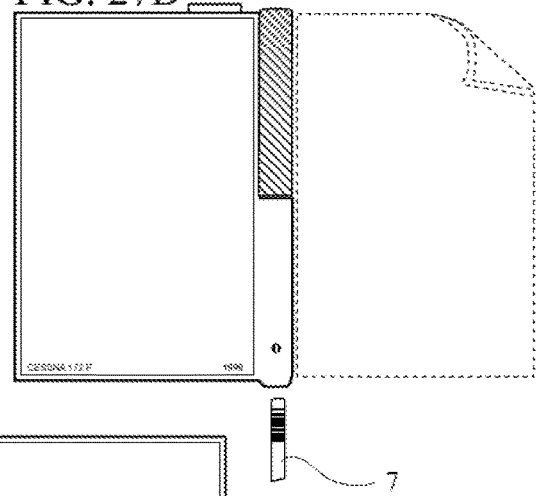
Figure 27E:
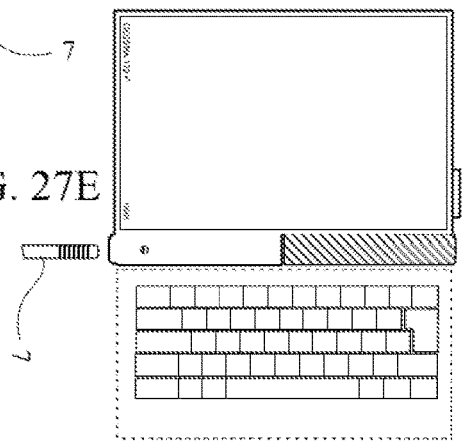
Figure 28A:
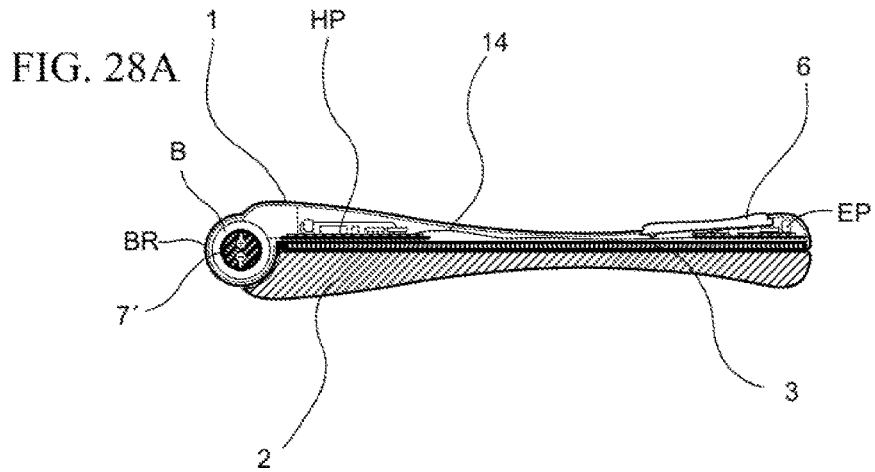
FIG. 28A, FIG. 28B, FIG. 28C, FIG. 28D, FIG. 28E, FIG. 28F, FIG. 28G, and FIG. 28H show the ergonomic design of the present invention along with the thus created compact construction and the improved holding and operating possibilities, both of a one-part and of a multi-part digital book.
Figure 28B:
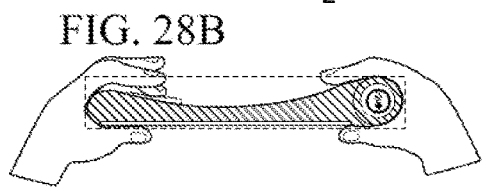
Figure 28F:
Figure 28G:
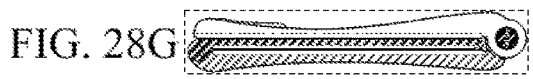
Figure 28C:
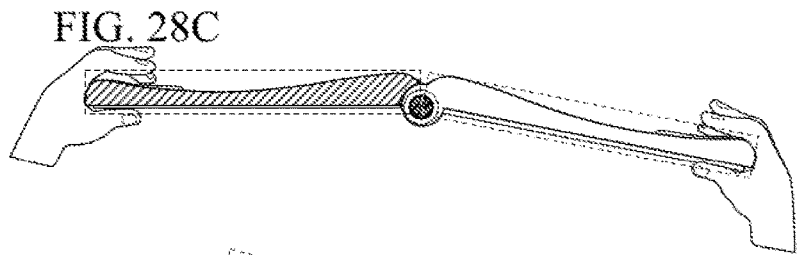
Figure 28H:
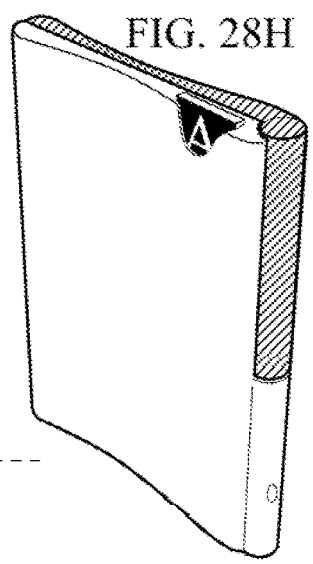
Figure 28D:
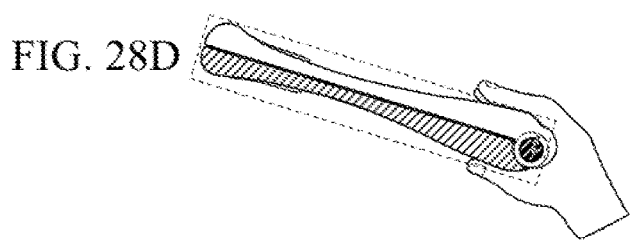
Figure 28E:
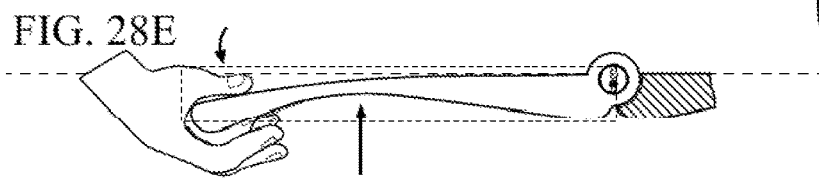

FIG. 25, by way of the example of a two-part embodiment of the digital book according to the invention, illustrates the coupling possibility of different external apparatus or means via a multifunction interface arranged at the bottom side of the digital book and designed as interface for cable connectors and/or of the supply station.

FIG. 26A through FIG. 26D show in exemplary manner a hardware coupling and decoupling possibility by attaching or removing different hardware parts via the pivot hinge of a two-part digital book, which upon removing a part is the gripping handle of a one-part digital book, in which electronics is accommodated.

FIG. 27A through FIG. 27E, by way of the example of a one-part starting basis, show the coupling of an exemplary gripping handle, as described in FIG. 26A through FIG.

26D, or of a book cover of an arbitrary material shown to be flexible in the example, or the coupling of a laptop keyboard or a card station.

FIG. 28A through 28H show the ergonomic design: of the present invention along with the thus created compact construction and the improved holding and operating possibilities, both of a one-part and of a multi-part digital book.

Figure 29A:
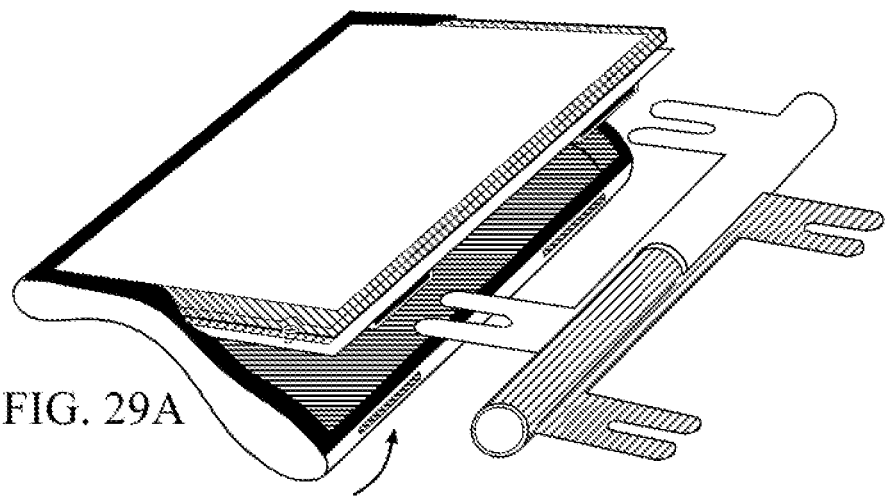
FIG. 29A, FIG. 29B, and FIG. 29C show a flexible digital book according to the invention by way of the example of a display part, and the flexible design at least of the body or casing comprising the display area, as an example of a pressure-sensitive design possibility e.g. by using an electronics-enclosing casing of foamed material.
Figure 29B:
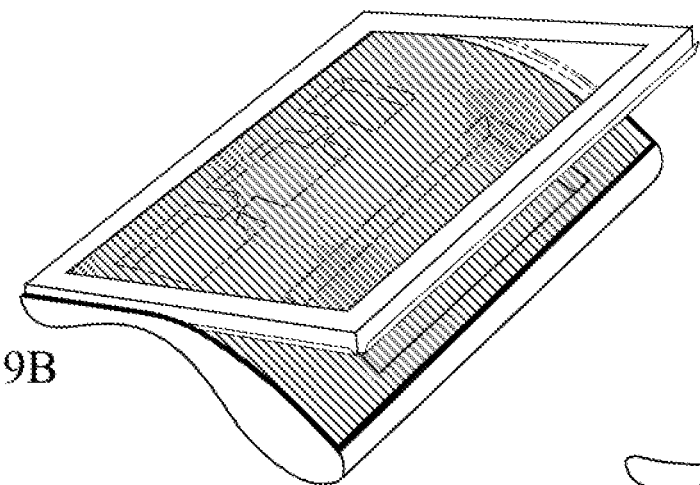
Figure 29C:
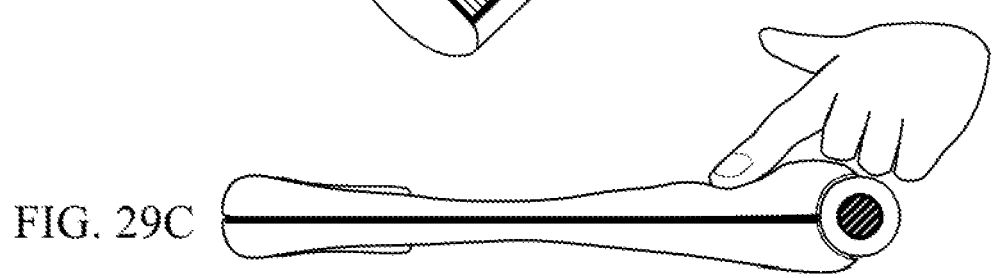

FIG. 29A through FIG. 29C show a: flexible digital book according to the invention by way of the example of a display part, and the flexible design at least of the body or casing comprising the display area, as an example of a pressure-sensitive design possibility e.g. by using an electronics-enclosing casing of foamed material.

Figure 30A:
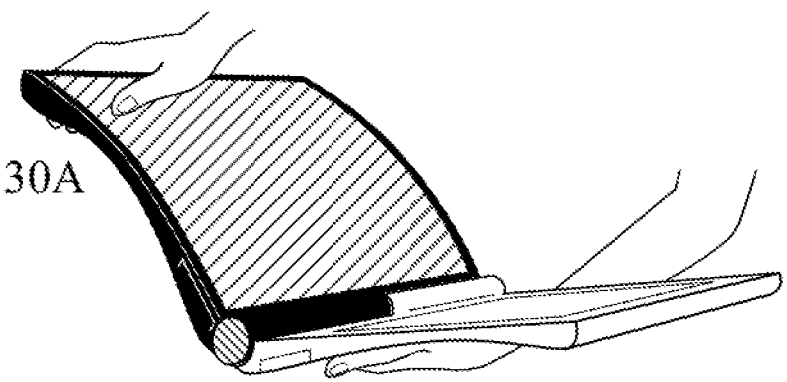
FIG. 30A, FIG. 30B, and FIG. 30C show a flexible digital book according to the invention, by way of the example of a display part, and the flexible design of display area and casing, as an example of an at least partly flexible design possibility by tightening e.g. a polymer display in a casing frame on two sides.
Figure 30B:
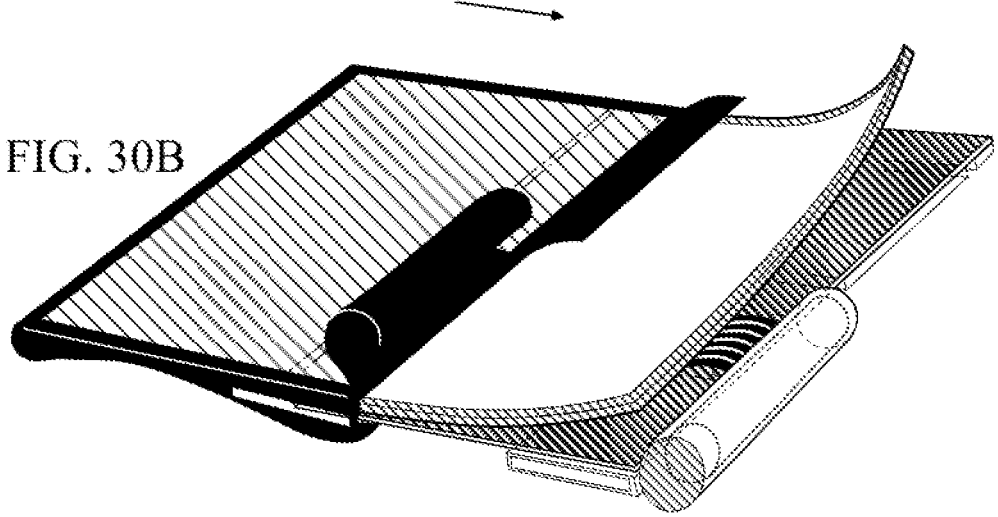
Figure 30C:

FIG. 30A through FIG. 30C show a flexible digital book according to the invention, by way of the example of display part, and the flexible design of display area and casing, as an example of an at least partly flexible design possibility by tightening e.g. a polymer display in a casing frame on two sides.

FIG. 31A through FIG. 31E show several flexible digital books according to the invention by way of the example of one-part or two-part display units with' operating possibility, in which for example one or several polymer displays are adhered in at least partly transparent plastics or plastics-similar material for strengthening.

As already described hereinbefore, the secondary part 2 or secondary parts 2*a*, 2*b* is/are designed to be electrically and/or mechanically separable from the main part 1, so that the main part 1 can be used alone. The at least one operating unit 6 contains as operating elements directional keys and function keys which can be operated individually or in combination for various functions.

Display unit D may advantageously have a function to indicate a power supply status, preferably on the screen of main part 1.

The screen 3 or screens 3, 4 of display unit D preferably is/are flexible, which holds also for the casing, so that the digital book can be carried along like a notebook, for example in the inside pocket of a jacket. The screen 3 or screens 3, 4 advantageously may be provided with an adjustable background illumination system. The display on the screen 3 or screens 3, 4 as well as the background illumination may be designed to be turned on or off automatically when the casing is folded open or shut.

The casing may be provided with a holding means (not shown) for receiving the screen pen 15 for use as operating, writing, drawing and/or processing tool.

Hint concerning the exemplary character of what has been described.

The present invention is not restricted to the embodiments described. Rather, the expert may carry out various modifications of the embodiments without having to leave the scope of protection as it is defined by the claims.

The invention claimed is:

1. A display device for displaying text or image information, comprising:
    a casing comprising a first part and at least one second part, wherein said first part and said at least one second part are arranged such that said casing can be folded open and shut about a folding axis like a book, wherein a spine part is formed by said first part and said at least one second part by a slidable coupling of said first part and said at least one second part, wherein said slidable coupling mechanically and electrically couples said first part and said at least one second part, and wherein said spine part is adapted to accommodate a battery for current supply, and
    a display unit with at least one display, wherein said first part comprises said display unit,
    wherein said at least one second part comprises an input unit for inputting or manipulating data, and wherein said input unit comprises an alphanumeric keyboard.

2. The display device of claim 1, wherein said display device further comprises a control unit for receiving, storing, processing, or reproducing information.

3. The display device of claim 1, wherein said display device further comprises at least one operator unit with operator elements for using said display device as an information receiving, processing, or reproducing device.

4. The display device of claim 1, wherein said casing comprises counter contacts in a guide and a supply opening for supplying power or for inputting and outputting information.

5. The display device of claim 4, further comprising a supply unit comprising a receiving opening and a pin, wherein said receiving open receives said casing and said guide and supply opening receives said pin.

6. The display device of claim 4, wherein said guide and supply opening comprises a cylindrical shape such that a longitudinal axis of said guide and supply opening lies coaxially to said folding axis.

7. The display device of claim 1, wherein said first part and said at least one second part are firmly connected to each other.

8. The display device of claim 1, wherein said display device displays text and image information.

9. The display device of claim 1, wherein said battery is a rechargeable battery.

10. The display device of claim 1, wherein said input unit is configured for inputting and manipulating data.

11. The display device of claim 10, wherein said guide and supply opening comprises a cylindrical shape such that a longitudinal axis of said guide and supply opening lies coaxially to said folding axis.

12. The display device of claim 1, wherein said input unit comprises a touch screen display.

13. The display device of claim 12, wherein said casing further comprises a holding means for receiving a screen pen configured for interacting with said touch screen.

14. The display device of claim 1, wherein said casing further comprises a third part, wherein said third part and said at least one second part are arranged such that said casing can be folded open and shut about a second folding axis.

15. The display device of claim 1, wherein said alphanumeric keyboard is a laptop keyboard.

16. The display device of claim 1, wherein said first part and said at least one second part are removably coupled together.

17. The display device of claim 16, wherein the first part can be used independently of at least one second part when said first part and said at least one second part.

18. The display device of claim 1, wherein said display unit is flexible.

19. A display device for displaying text or image information, comprising:
    a casing comprising a first part and at least one second part, wherein said first part and said at least one second part are arranged such that said casing can be folded open and shut about a folding axis like a book, wherein a spine part is formed by said first part and said at least one second part by a slidable coupling of said first part and said at least one second part, wherein said slidable coupling mechanically and electrically couples said first part and said at least one second part, and wherein said spine part is adapted to accommodate a battery for current supply, and a display unit with at least one display, wherein said first part comprises said display unit, wherein said at least one second part comprises an input unit for inputting or manipulating data, wherein said display unit and said input unit are arranged such that, in a folded open state of said casing, said display unit and said input unit are presented to a user like pages of a book, and wherein said input unit comprises an alphanumeric keyboard.

20. The display device of claim 19, wherein said display device further comprises a control unit for receiving, storing, processing, or reproducing information.

21. The display device of claim 19, wherein said display device further comprises at least one operator unit with operator elements for using said display device as an information receiving, processing, or reproducing device.

22. The display device of claim 19, wherein said casing comprises counter contacts in a guide and a supply opening for supplying power or for inputting and outputting information.

23. The display device of claim 19, wherein said first part and said at least one second part are firmly connected to each other.

24. The display device of claim 19, wherein said display device displays text and image information.

25. The display device of claim 19, wherein said battery is a rechargeable battery.

26. The display device of claim 19, wherein said input unit is configured for inputting and manipulating data.

27. The display device of claim 19, wherein said input unit comprises a touch screen display.

28. The display device of claim 19, wherein said alphanumeric keyboard is a laptop keyboard.

\* \* \* \* \*